US 12,554,569 B2

(12) United States Patent
Chen et al.

(10) Patent No.: US 12,554,569 B2
(45) Date of Patent: Feb. 17, 2026

(54) METHOD FOR PROCESSING WEBPAGE ACCESS EXCEPTION AND RELATED APPARATUS

(71) Applicant: Huawei Technologies Co., Ltd., Shenzhen (CN)

(72) Inventors: Ying Chen, Shenzhen (CN); Huipeng Zhang, Shenzhen (CN); Chao Li, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/711,428

(22) PCT Filed: Nov. 17, 2022

(86) PCT No.: PCT/CN2022/132427
§ 371 (c)(1),
(2) Date: May 17, 2024

(87) PCT Pub. No.: WO2023/088338
PCT Pub. Date: May 25, 2023

(65) Prior Publication Data
US 2025/0021418 A1    Jan. 16, 2025

(30) Foreign Application Priority Data
Nov. 18, 2021    (CN) .......................... 202111372511.2

(51) Int. Cl.
*G06F 11/00* (2006.01)
*G06F 3/048* (2013.01)
*G06F 11/07* (2006.01)

(52) U.S. Cl.
CPC .......... *G06F 11/0769* (2013.01); *G06F 3/048* (2013.01); *G06F 11/0709* (2013.01);
(Continued)

(58) Field of Classification Search
CPC .............. G06F 11/077; G06F 11/0766; G06F 11/0769; G06F 11/0709; G06F 11/0793;
(Continued)

(56) References Cited

U.S. PATENT DOCUMENTS 7,325,045 B1 * 1/2008 Manber ................... H04L 67/02
709/227
9,298,585 B1 * 3/2016 Sharp .................. G06F 11/0793
(Continued)

FOREIGN PATENT DOCUMENTS

CN    102711162 A    10/2012
CN    104539464 A    4/2015
(Continued)

OTHER PUBLICATIONS

"Fix Network Problems with a One-Click Reset (Windows 10)," OLTA, Oct. 2017 (Year: 2017).*
(Continued)

*Primary Examiner* — Bryce P Bonzo
*Assistant Examiner* — Gabriella Kanani Shelton
(74) *Attorney, Agent, or Firm* — Slater Matsil, LLP

(57) ABSTRACT

In the method, a terminal device receives a first input operation; the terminal device accesses, in response to the first input operation, a first webpage indicated by the first input operation; after failing to access the first webpage, the terminal device determines that an error cause of a webpage access failure includes a first error cause; and the terminal device displays a first error prompt interface; the error segment display area includes a browser identifier, a network identifier, and a webpage identifier, a display status of a first identifier indicates whether the first error cause is an error cause corresponding to the first identifier, and the first identifier is any one of the three identifiers; and the first
(Continued)

button is used to trigger the terminal device to perform a first operation corresponding to the first error cause.

20 Claims, 55 Drawing Sheets

(52) U.S. Cl.
CPC ........ G06F 11/0766 (2013.01); G06F 11/079 (2013.01); G06F 11/0793 (2013.01)

(58) Field of Classification Search
CPC .. G06F 11/079; G06F 16/958; G06F 16/9535; G06F 9/362; G06F 3/048
See application file for complete search history.

(56) References Cited

U.S. PATENT DOCUMENTS

| | | | |
|---|---|---|---|
| 2015/0006979 A1* | 1/2015 | Tran | G06F 11/0775 714/57 |
| 2016/0174081 A1* | 6/2016 | Lau | H04W 24/02 455/457 |
| 2016/0342457 A1 | 11/2016 | Ivanov et al. | |
| 2016/0364495 A1 | 12/2016 | Li | |
| 2020/0174874 A1 | 6/2020 | Yamada | |

FOREIGN PATENT DOCUMENTS

| | | |
|---|---|---|
| CN | 105760538 A | 7/2016 |
| CN | 107241228 A | 10/2017 |
| CN | 107992615 A | 5/2018 |
| CN | 108959296 A | 12/2018 |
| CN | 109144755 A | 1/2019 |

OTHER PUBLICATIONS

Bogdan Popa, "How Windows 10 Version 2004 Improves the Network Status Information UI," Softpedia, May 2020 (Year: 2020).*

"Disable Cloudflare Error Pages and Show the Actual Error Page," Stack Overflow, 2017 (Year: 2017).*

Mobile Development Collective, "Distinguish AirPlane Mode and No Internet Connection," 2014 (Year: 2014).*

* cited by examiner

S106A: Obtain an error cause indicated by an error code, and detect whether the error cause is a preset second-level error cause; and if the error cause is the preset second-level error cause, determine that an error cause 1 may include the error cause indicated by the error code, and perform S106F; or if the error cause is not the preset second-level error cause, perform a next step S106B: Detect whether there is a first setting item whose setting information is incorrect in first setting information; and if there is the first setting item whose setting information is incorrect in the first setting information, determine that the error cause 1 includes that the first setting item is incorrectly set, and perform S106F; or if there is no first setting item whose setting information is incorrect in the first setting information, perform a next step S106G: If there is the first setting item whose setting information is incorrect, an automatic repair module is invoked to correct a setting of the first setting item and a Browser app is triggered to access again a first website address indicated by a first input operation; and if access succeeds, the Browser app displays a webpage corresponding to the first website address; or if the access fails, an exception diagnosis module 1 performs a next step S106C: Detect whether network connectivity is abnormal; and if the network connectivity is abnormal, determine that the error cause 1 includes that the network connectivity is abnormal, and perform S106F; or if the network connectivity is not abnormal, perform a next step S106D: If a first domain name is a domain name of a search engine 1, detect whether the search engine 1 is a preset search engine; and if the search engine 1 is the preset search engine, determine that the error cause 1 may include that the search engine 1 is unavailable, and perform S106F; or if the search engine 1 is not the preset search engine, perform a next step S106E: Detect whether a website indicated by the first domain name can be accessed; and if the website cannot be accessed, determine that the error cause 1 may include a website access exception, and perform S106F; or if the website can be accessed, perform a next step S106F: When it is determined that the error cause 1 of a webpage exception is obtained through local diagnosis, generate a local diagnosis result based on the error cause 1, and perform S107; or when it is determined that the error cause 1 of the webpage exception cannot be obtained through local diagnosis, perform S108

FIG. 15

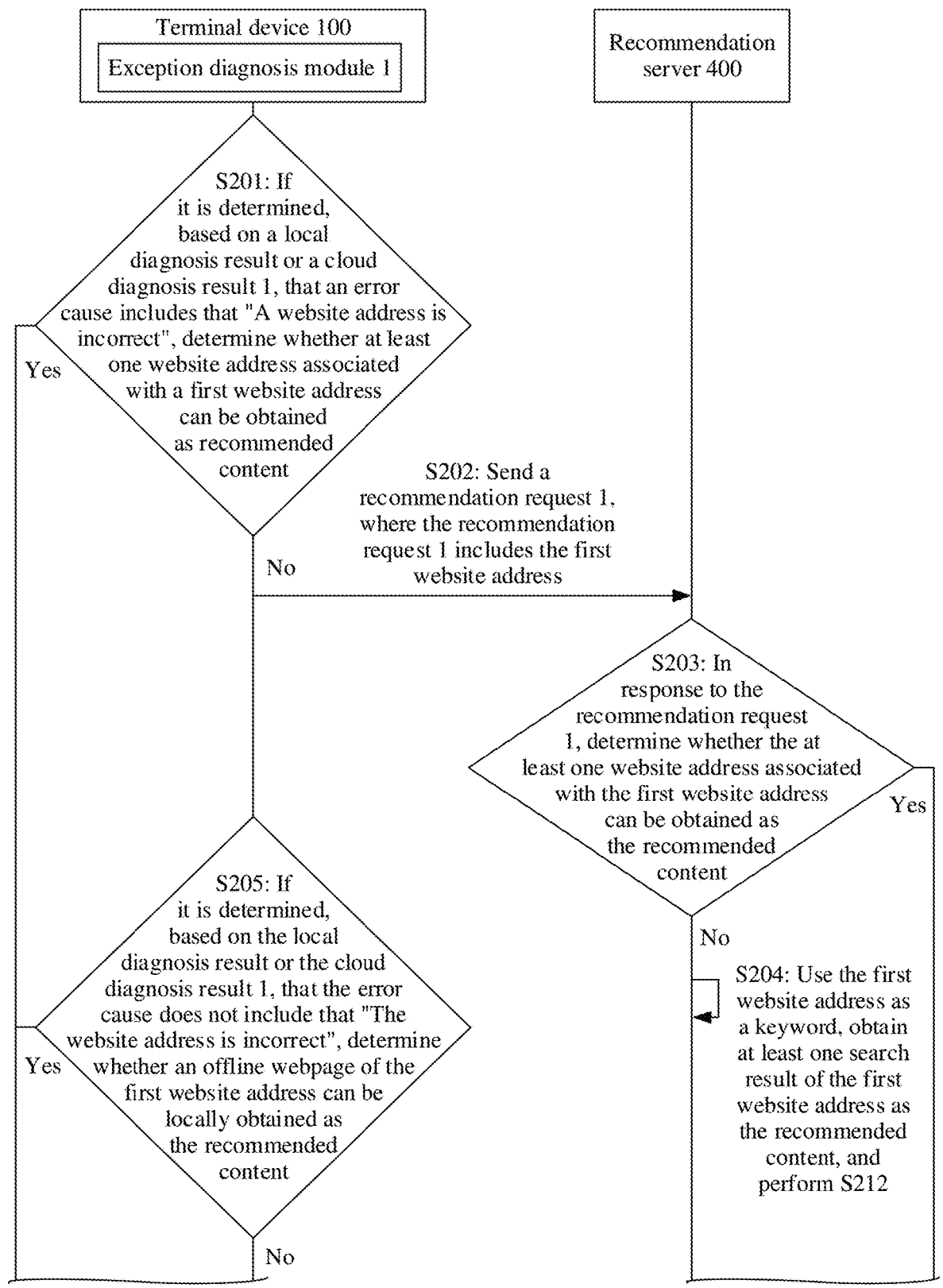

METHOD FOR PROCESSING WEBPAGE ACCESS EXCEPTION AND RELATED APPARATUS

CROSS-REFERENCE TO RELATED APPLICATIONS

This application is a national stage of International Application No. PCT/CN2022/132427, filed on Nov. 17, 2022, which claims priority to Chinese Patent Application No. 202111372511.2 filed on Nov. 18, 2021. Both of the aforementioned applications are hereby incorporated by reference in their entireties.

TECHNICAL FIELD

This application relates to the field of electronic technologies, and in particular, to a method for processing a webpage access exception and a related apparatus.

BACKGROUND

With development of information technologies, a user may retrieve and display information resources by using a browser. The information resources may be webpages, images, audios and videos, or other content, and are usually identified by a uniform resource identifier.

When the user surfs the internet by using the browser, a problem of a webpage access failure often occurs. For a similar problem, a common interaction method of the browser is to present an error prompt page, to prompt the user that a webpage cannot be opened. However, there are many error causes of webpage access exceptions, and the user cannot obtain a more accurate error cause, which causes confusion of the user and reduces user experience.

SUMMARY

This application provides a method for processing a webpage access exception and a related apparatus, to accurately locate an error cause of the webpage access exception, so as to improve user experience.

According to a first aspect, this application provides a method for processing a webpage access exception, including: A terminal device receives a first input operation; the terminal device accesses, in response to the first input operation, a first webpage indicated by the first input operation; after failing to access the first webpage, the terminal device determines that an error cause of a webpage access failure includes a first error cause; and the terminal device displays a first error prompt interface, where the first error prompt interface includes one or more of an error segment display area, an error description area, and a first button; the error segment display area includes a browser identifier, a network identifier, and a webpage identifier, a display status of a first identifier indicates whether the first error cause is an error cause corresponding to the first identifier, and the first identifier is any one of the browser identifier, the network identifier, and the webpage identifier; the error description area is used to describe related information of the first error cause; and the first button is used to trigger the terminal device to perform a first operation corresponding to the first error cause.

In this embodiment of this application, when the webpage access exception occurs, an error prompt page displayed by the terminal device may include one or more of the error segment display area, the error description area, and the first button. Based on display statuses of the browser identifier, the network identifier, and the webpage identifier in the error segment display area, that the error cause of the webpage access exception is an error cause corresponding to a specific identifier can be intuitively indicated to a user. Based on descriptions of the error cause in the error description area, the user can intuitively understand related information of the error cause of the webpage access exception. An input operation of the user is received by using the first button, to guide the user to further determine, avoid, and/or resolve the error cause. In this way, the user may learn a specific error cause of the webpage access exception, to avoid confusion caused by the webpage access exception to the user, and effectively improve user experience.

In an implementation, the error description area includes one or more of an error description, a response measure, and an error code that correspond to the first error cause, and the response measure for the first error cause includes performing the first operation. In this embodiment of this application, based on the error description in the error description area, the user can specifically understand the error cause of the webpage access exception. Based on the response measure in the error description area, the user can be guided to further determine, avoid, and/or resolve the error cause of the webpage access exception, for example, the user is guided to response the error cause by using the first operation performed by using the first button.

In an implementation, the first input operation indicates a first website address and/or a first keyword of the first webpage, the first error prompt interface further includes recommended content, the recommended content is determined based on related information of the first webpage, and the related information of the first webpage includes the first website address and/or the first keyword; and before the terminal device displays the first error prompt interface, the method further includes: The terminal device obtains the recommended content. In this embodiment of this application, the terminal device may further display, on the error prompt interface, the recommended content related to an access target of the user, to provide more choices for the user when the webpage access exception occurs.

In an implementation, first-level error causes corresponding to the browser identifier, the network identifier, and the webpage identifier are respectively a browser error, a network error, and a webpage error, the first-level error causes include at least one second-level error cause, and the first error cause includes at least one first-level error cause and/or at least one second-level error cause. In this embodiment of this application, the terminal device may determine that the error cause of the webpage access exception is a first-level error cause corresponding to a specific identifier in the browser identifier, the network identifier, and the webpage identifier, and may further specifically determine that the error cause is specific second-level error causes corresponding to the first-level error cause.

In an implementation, in a connection relationship between two adjacent identifiers in the browser identifier, the network identifier, and the webpage identifier, a display status of the connection relationship includes a normal state, an abnormal state, and a null state, and the display status of the connection relationship indicates that the first error cause is an error cause corresponding to a specific identifier. In this embodiment of this application, based on a connection relationship between adjacent identifiers in the error segment display area, that error causes of the webpage access exception are error causes corresponding to specific identifiers can also be intuitively indicated to the user.

In an implementation, when the first error cause is an error cause corresponding to the browser identifier, a display status of the browser identifier indicates the browser error, a connection relationship between the browser identifier and the network identifier is presented as a null state, and a connection relationship between the network identifier and the webpage identifier is presented as a null state; when the first error cause is an error cause corresponding to the network identifier, a display status of the network identifier indicates the network error, a connection relationship between the browser identifier and the network identifier is presented as an abnormal state, and a connection relationship between the network identifier and the webpage identifier is presented as a null state; or when the first error cause is an error cause corresponding to the webpage identifier, a display status of the webpage identifier indicates the webpage error, a connection relationship between the browser identifier and the network identifier is presented as a normal state, and a connection relationship between the network identifier and the webpage identifier is presented as an abnormal state.

In this embodiment of this application, based on the display statuses of the identifiers in the error segment display area and the display statuses of the connection relationships between the adjacent identifiers, that error causes of the webpage access exception are error causes corresponding to specific identifiers can be intuitively indicated to the user.

In an implementation, when the first error cause is the webpage error, the first button is used to test network connectivity, and the method further includes: The terminal device accesses a preset website address in response to an input operation on the first button, where the preset website address is different from a website address of the first webpage; and when successfully accessing the preset website address, the terminal device displays first prompt information, where the first prompt information prompts that the network connectivity is normal or that the preset website address is successfully accessed; or when failing to access the preset website address, the terminal device displays second prompt information, where the second prompt information prompts that the network connectivity is abnormal or that the preset website address fails to be accessed. In this embodiment of this application, when determining that there may be a network connectivity problem, the terminal device may guide, by using the first button, the user to perform a network connectivity test, to exclude that the network connectivity is abnormal or determine that the network connectivity is abnormal.

In an implementation, when successfully accessing the preset website address, the terminal device further displays a test website identifier, where a display status of the test website identifier is a normal state, and a connection relationship between the test website identifier and the network identifier is in a normal state; or when failing to access the preset website address, the terminal device further displays a test website identifier, where a display status of the test website identifier is an abnormal state, and a connection relationship between the test website identifier and the network identifier is in an abnormal state. In this embodiment of this application, after the network connectivity is tested, whether the network connectivity is abnormal may be indicated based on the display status of the test website identifier and the connection relationship between the test website identifier and the network identifier.

In an implementation, when a network is normal, a display form of the network identifier is determined by a network currently used by the terminal device to transmit a data service; or when the first error cause is an error cause corresponding to the network identifier, a display form of the network identifier is determined by a network state indicated by the first error cause. In this embodiment of this application, a current network state may be indicated based on the display form of the network identifier.

In an implementation, the error cause corresponding to the network identifier includes one or more of the following: An airplane mode is not turned off, Wi-Fi is not turned on, a Wi-Fi network is abnormal, and mobile data is not turned on; and when the first error cause is that the airplane mode is not turned off, the display form of the network identifier is an identifier of the airplane mode; when the first error cause is that Wi-Fi is not turned on or the Wi-Fi network is abnormal, the display form of the network identifier is an identifier of Wi-Fi; or when the first error cause is that the mobile data is not turned on, the display form of the network identifier is an identifier of the mobile data. In this embodiment of this application, the current network state may be indicated based on the display form of the network identifier.

In an implementation, when the first error cause is that the airplane mode is not turned off, the first button is used to trigger the terminal device to turn off the airplane mode; when the first error cause is that mobile data is not turned on, the first button is used to trigger the terminal device to turn on the mobile data; when the first error cause is that Wi-Fi is not turned on, the first button is used to trigger the terminal device to turn on Wi-Fi; or when the first error cause is that the Wi-Fi network is abnormal, the first button is used to trigger the terminal device to switch the network to the mobile data, switch a Wi-Fi signal source, turn on WLAN+, or display a network setting interface. In this embodiment of this application, when the first error cause is various error causes corresponding to the network identifier, the user may be guided to perform, by using the first button, response measures corresponding to the various error causes, to resolve the network error.

In an implementation, an error cause corresponding to the webpage identifier includes one or more of the following: a website address is incorrect, a search engine is unavailable, and a website responds slowly; and when the first error cause is that the website address is incorrect, the first button is used to trigger the terminal device to access a second website address, where the second website address is a correct website address determined based on a website address of the first webpage; when the first error cause is that the search engine is unavailable, the first button is used to trigger the terminal device to switch the search engine; or when the first error cause is that the website responds slowly, the first button is used to trigger the terminal device to access the first webpage again. In this embodiment of this application, when the first error cause is various error causes corresponding to the webpage identifier, the user may be guided to perform, by using the first button, response measures corresponding to the various error causes, to resolve the webpage error.

In an implementation, that the terminal device determines that the error cause of the webpage access failure includes the first error cause includes: the terminal device collects related information of webpage access, and obtains a first domain name corresponding to a website address of the first webpage, where the related information of the webpage access includes first setting information, and the first setting information includes setting information of at least one setting item related to the webpage access; performs local diagnosis on a webpage access exception based on one or more of the following: the related information of the webpage access, the website address of the first webpage, the first domain name, and an error code of the webpage access exception of the first webpage; and when an error cause of the webpage access exception is determined through the local diagnosis, determines display content of the first error prompt interface based on the error cause determined through the local diagnosis; or when an error cause of the webpage access exception is not determined through the local diagnosis, sends a diagnosis request to a diagnosis server, to enable the diagnosis server to invoke an exception mode library to perform cloud diagnosis, where an input of the exception mode library is diagnosis information carried in the diagnosis request, an output of the exception mode library is the error cause of the webpage access exception, and the diagnosis information includes one or more of the following: the related information of the webpage access, the website address of the first webpage, the first domain name, the error code, and a detection result in a local diagnosis process. In this embodiment of this application, the terminal device may perform local diagnosis on the webpage access exception; and when the error cause cannot be obtained through local diagnosis, the terminal device may further request the diagnosis server to invoke the exception mode library to perform cloud diagnosis. In this way, the terminal device may determine the error cause of the webpage exception through local diagnosis or cloud diagnosis.

In an implementation, that the terminal device performs local diagnosis on a webpage access exception based on one or more of the following: the related information of the webpage access, the website address of the first webpage, the first domain name, and the error code of the webpage access exception of the first webpage includes one or more of the following detections: The terminal device detects whether there is a first setting item whose setting information is incorrect in the first setting information; and if there is the first setting item whose setting information is incorrect in the first setting information, determines that the first error cause includes that the first setting item is incorrectly set, where that the first setting item is incorrectly set means that current setting information of the first setting item may cause a webpage access failure; the terminal device detects whether network connectivity is abnormal; and if the network connectivity is abnormal, determines that the first error cause includes that the network connectivity is abnormal; the terminal device detects whether a search engine corresponding to the first domain name is a preset search engine; and if the search engine corresponding to the first domain name is the preset search engine, determines that the first error cause includes that the search engine is unavailable; and the terminal device detects whether a website indicated by the first domain name can be accessed; and if the website indicated by the first domain name cannot be accessed, determines that the first error cause includes that the website cannot be accessed. In this embodiment of this application, the terminal device may perform local diagnosis on the webpage access exception.

In an implementation, the recommended content includes one or more of the following: at least one website address associated with the first website address, an offline webpage of the first website address, at least one search result of the first website address, at least one piece of information associated with the first keyword, at least one application associated with the first keyword, at least one website associated with the first keyword, and at least one search result of the first keyword.

In an implementation, that the terminal device obtains the recommended content includes: if the first error cause is that a website address is incorrect, determining whether the at least one website address associated with the first website address can be obtained as the recommended content; and if the at least one website address associated with the first website address cannot be obtained as the recommended content, obtaining the at least one search result of the first website address as the recommended content; or if the first error cause is not that a website address is incorrect, determining whether the offline webpage of the first website address can be obtained as the recommended content; and if the offline webpage of the first website address cannot be obtained as the recommended content, obtaining, as the recommended content, the information, the application, the website, and the search result that are associated with the first keyword.

In an implementation, that the terminal device obtains the recommended content includes: The terminal device sends a recommendation request to a recommendation server, where the recommendation request carries the related information of the first webpage, and the recommendation request is used to request the recommendation server to obtain, as the recommended content, content associated with the related information of the first webpage; and receives the recommended content sent by the recommendation server. In this embodiment of this application, the terminal device may request the recommendation server to obtain the recommended content of the first webpage.

According to a second aspect, this application provides an electronic device. The electronic device may include a plurality of functional modules or units, configured to correspondingly perform the display method provided in the first aspect.

For example, a detection unit and a display unit are included.

The electronic device may further include a receiving unit, configured to receive a first input operation;
an access unit, configured to access, in response to the first input operation, a first webpage indicated by the first input operation;
a determining unit, configured to: after failing to access the first webpage, determine that an error cause of a webpage access failure includes a first error cause; and
a display unit, configured to be used by a terminal device to display a first error prompt interface, where the first error prompt interface includes one or more of an error segment display area, an error description area, and a first button; the error segment display area includes a browser identifier, a network identifier, and a webpage identifier, a display status of a first identifier indicates whether the first error cause is an error cause corresponding to the first identifier, and the first identifier is any one of the browser identifier, the network identifier, and the webpage identifier; the error description area is used to describe related information of the first error cause; and the first button is used to trigger the terminal device to perform a first operation corresponding to the first error cause.

According to a third aspect, this application provides a terminal device, including one or more processors and one or more memories. The one or more memories are coupled to the one or more processors. The one or more memories are configured to store computer program code, where the computer program code includes computer instructions. When the one or more processors execute the computer instructions, an electronic device is enabled to perform the method for processing a webpage access exception in any possible implementation of any foregoing aspect.

According to a fourth aspect, an embodiment of this application provides a computer storage medium, including computer instructions. When the computer instructions are run on an electronic device, the electronic device is enabled to perform the method for processing a webpage access exception in any possible implementation of any foregoing aspect.

According to a fifth aspect, an embodiment of this application provides a computer program product. When the computer program product runs on a computer, a computer is enabled to perform the method for processing a webpage access exception in any possible implementation of any foregoing aspect.

BRIEF DESCRIPTION OF THE DRAWINGS

FIG. 15 is a flowchart of an error cause diagnosis method according to an embodiment of this application;

FIG. 17A-1 to FIG. 17C-2 are flowcharts of several methods for obtaining recommended content according to an embodiment of this application.

DETAILED DESCRIPTION OF ILLUSTRATIVE EMBODIMENTS

The technical solutions according to embodiments of this application are clearly and described in the following with reference to the accompanying drawings. In descriptions of embodiments of this application, unless otherwise specified, "/" indicates "or". For example, A/B may indicate A or B. The term "and/or" in this specification merely describes an association relationship between associated objects, and indicates that three relationships may exist. For example, A and/or B may indicate the following three cases: Only A exists, both A and B exist, and only B exists. In addition, in the descriptions of embodiments of this application, "a plurality of" means two or more.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

A term "user interface (user interface, UI)" in the following embodiments of this application is a medium interface for interaction and information exchange between an application or an operating system and a user, and implements conversion between an internal form of information and a form that can be accepted by the user. The user interface is source code written in a specific computer language such as Java or an extensible markup language (extensible markup language, XML). Interface source code is parsed and rendered on a terminal device, and is finally presented as content that can be identified by the user. A common representation form of the user interface is a graphical user interface (graphic user interface, GUI), which refers to a user interface that is displayed in a graphical manner and that is related to a computer operation. The user interface may be a visual interface element like a text, an icon, a button, a menu, a tab, a text box, a dialog box, a status bar, a navigation bar, or a Widget that is displayed on a display of the terminal device.

The following describes a communication system 10 provided in an embodiment of this application.

Figure 1:
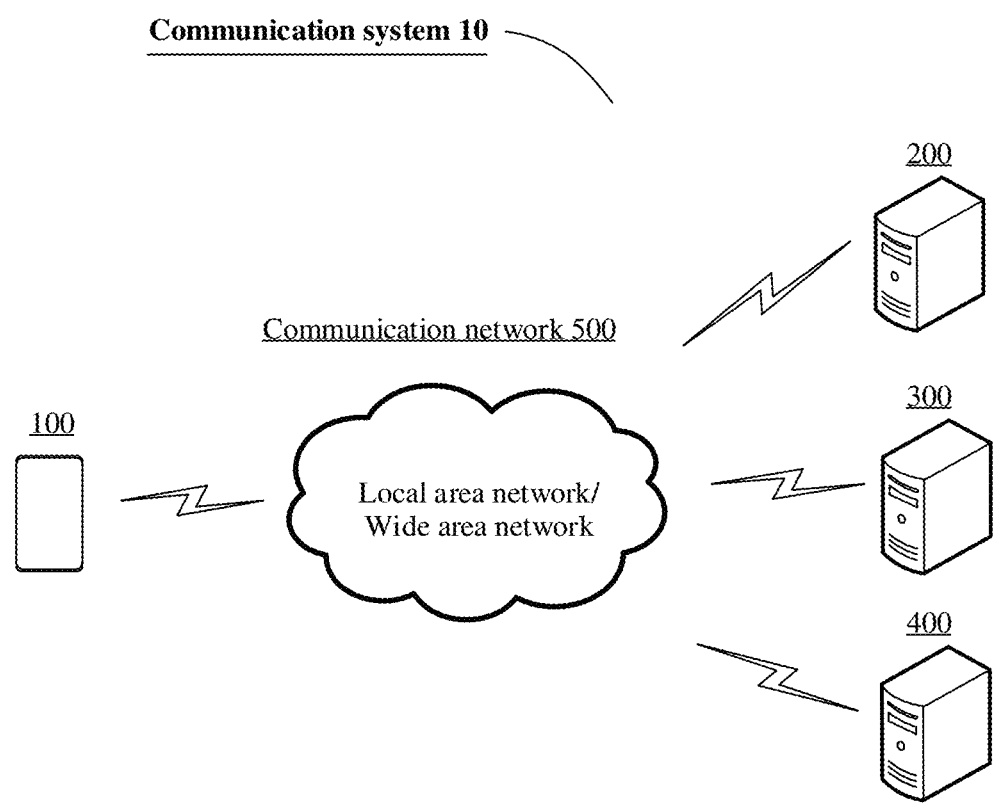
FIG. 1 is a system architecture diagram of a communication system according to an embodiment of this application.

FIG. 1 is an example of a system architecture diagram of a communication system 10 according to an embodiment of this application. As shown in FIG. 1, the communication system 10 includes at least one terminal device, for example, a terminal device 100, and at least one service server, for example, a service server 200.

The terminal device 100 is configured with a display, and is installed with a preset application (application, app), for example, a Browser app. The user may browse a webpage (for example, a first webpage) on the display by using the Browser app, to obtain a required information resource. The service server 200 corresponding to the first webpage may be a server, a server cluster including a plurality of servers, or a cloud computing center. The service server 200 may provide, for the terminal device 100, a webpage resource of the first webpage accessed by a user.

In this embodiment of this application, the communication system 10 further includes a diagnosis server 300. When failing to access the first webpage by using the Browser app, the terminal device 100 may request the diagnosis server 300 to diagnose an error cause of a webpage access exception. In some embodiments, the communication system 10 further includes a recommendation server 400. Based on information (for example, a website address and a keyword) entered by the user when the user accesses the first webpage, the terminal device 100 may further request the recommendation server 300 to obtain recommended content associated with the first webpage. The recommended content may be one or more of a website address link, an online webpage, an offline webpage, information, a quick application, an application, and the like. This is not specifically limited herein. The diagnosis server 300 and the recommendation server 400 each may be a server, a server cluster including a plurality of servers, or a cloud computing center. The diagnosis server 300 and the recommendation server 400 may be a same server, or may be different servers, which is not specifically limited herein.

In this embodiment of this application, the terminal device 100 may communicate with the server through one or more communication networks 500, to cache and transmit data pointing to the server (for example, a webpage access request pointing to the service server 200, a diagnosis request pointing to the diagnosis server 300, and a recommendation request pointing to the recommendation server 400), and may further receive and cache data from the server (for example, webpage data from the service server 200, a cloud diagnosis result from the diagnosis server 300, and recommended content from the recommendation server 400).

The communication network 500 may be a local area network (local area network, LAN), or may be a wide area network (wide area network, WAN), for example, an internet. The communication network 500 may be implemented by using any known network communication protocol. The network communication protocol may be various wired or wireless communication protocols, for example, Ethernet, a universal serial bus (universal serial bus, USB), firewire (FIREWIRE), a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), Bluetooth, wireless fidelity (wireless fidelity, Wi-Fi), NFC, voice over Internet protocol (voice over Internet protocol, VOIP), a communication protocol supporting a network slice architecture, or any other suitable communication protocol.

The terminal device 100 and the server may be deployed on land, including an indoor device, an outdoor device, a handheld device, or a vehicle-mounted device, or may be deployed on a water surface, or may be deployed on an aircraft or an artificial satellite in the air. This is not limited in embodiments of this application.

It should be understood that FIG. 1 is merely a schematic diagram of a structure of a communication system according to an embodiment of this application, and does not constitute a specific limitation on the communication system 10. The communication system 10 may include more or fewer devices than those shown in the figure, for example, may further include a wireless relay device and a wireless backhaul device (not shown in FIG. 1). This is not limited herein.

The following describes a structure of a terminal device 100 according to an embodiment of this application.

In this embodiment of this application, the terminal device 100 may be a terminal carrying an IOS, Android, Microsoft, or another operating system. For example, the terminal device 100 may be a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR) device, a virtual reality (virtual reality, VR) device, an artificial intelligence (artificial intelligence, AI) device, a wearable device, a vehicle-mounted device, a smart home device, a smart city device, and/or the like. A specific type of the terminal device 100 is not limited in embodiments of this application.

Figure 2:
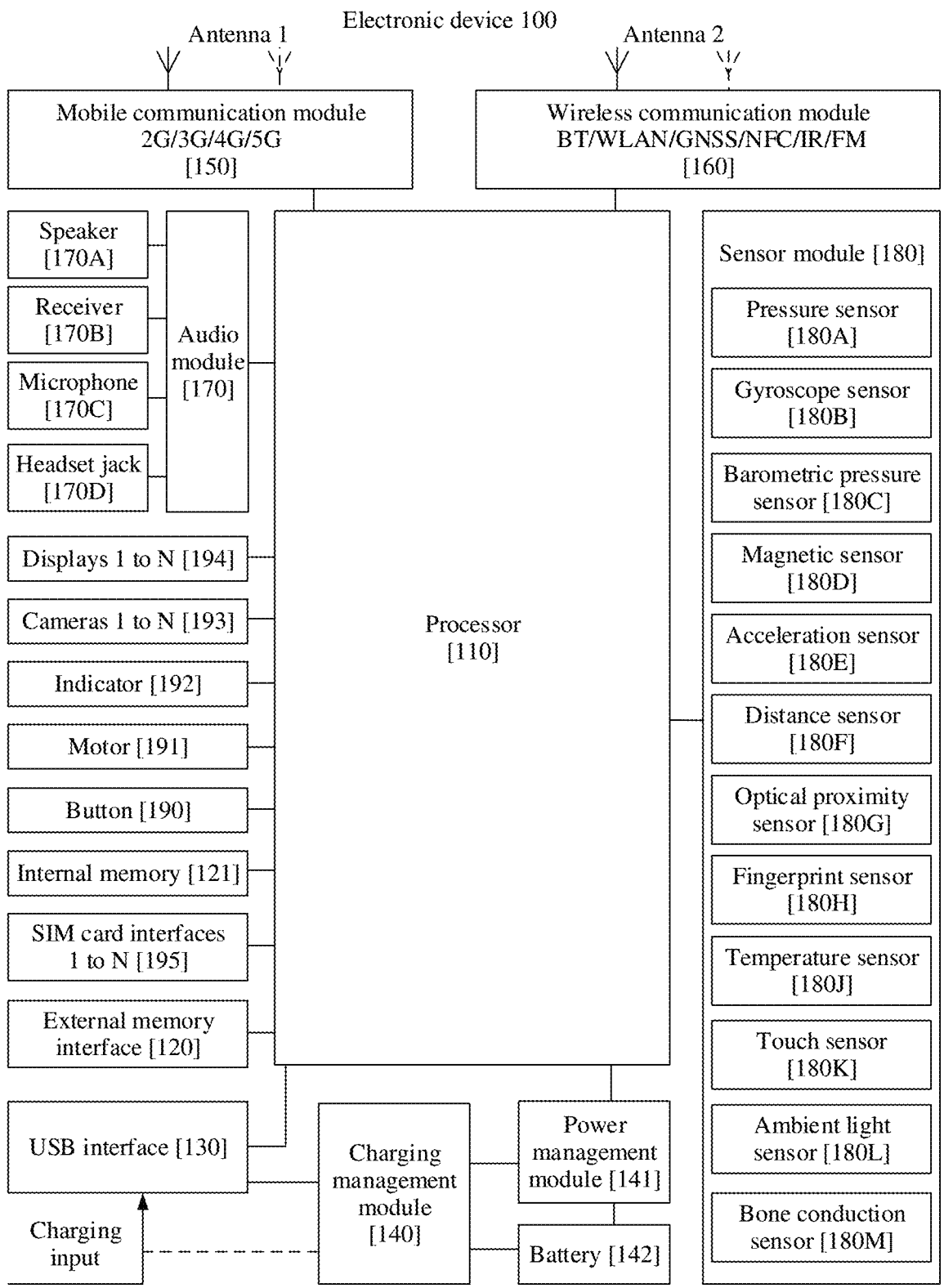
FIG. 2 is a schematic diagram of a structure of a terminal device according to an embodiment of this application.

FIG. 2 is a schematic diagram of a structure of a terminal device 100. The terminal device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present embodiment does not constitute a specific limitation on the terminal device 100. In some other embodiments of this application, the terminal device 100 may include more or fewer components than those shown in the figure, or a combination of a part of the components, or splits from a part of the components, or an arrangement of different components. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may generate an operation control signal based on an instruction operation code and a time sequence signal, to control of instruction reading and instruction execution.

A memory may be further disposed in the processor 110, and is configured to store instructions and data. In some embodiments, the memory in the processor 110 is a cache memory. The memory may store the instructions or the data that have/has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the terminal device 100. While charging the battery 142, the charging management module 140 may further supply power to the terminal device by using the power management module 141.

The power management module 141 is configured to connect the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the terminal device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the terminal device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that includes 2G/3G/4G/5G or the like and that is applied to the terminal device 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit a processed electromagnetic wave to the modem processor for demodulation. The mobile communication module 150 may further amplify a signal modulated by the modem processor, and convert an amplified signal into an electromagnetic wave for radiation through the antenna 1. In some embodiments, at least some functional modules of the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video on the display 194. In some embodiments, the modem processor may be an independent component. In some other embodiments, the modem processor may be independent of the processor 110, and is disposed in a same device as the mobile communication module 150 or another functional module.

The wireless communication module 160 may provide a solution applied to the terminal device 100 for wireless communication including a wireless local area network (wireless local area network, WLAN) (like a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communication module 160 may be one or more components integrating at least one communication processor module. The wireless communication module 160 receives an electromagnetic wave through the antenna 2, performs demodulation and filtering processing on the electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2.

In some embodiments, the antenna 1 and the mobile communication module 150 in the terminal device 100 are coupled, and the antenna 2 and the wireless communication module 160 in the terminal device 100 are coupled, so that the terminal device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation system, SBAS).

The terminal device 100 implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light emitting-diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the terminal device 100 may include 1 or N displays 194, where N is a positive integer greater than 1.

The terminal device 100 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, and brightness of the image. The ISP may further optimize parameters such as exposure and a color temperature of a photographing scene. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (charge-coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format like RGB or YUV. In some embodiments, the terminal device 100 may include one or N cameras 193, where N is a positive integer greater than 1.

The digital signal processor is configured to process a digital signal, and may process another digital signal in addition to the digital image signal. For example, when the terminal device 100 selects a frequency, the digital signal processor is configured to perform Fourier transformation on frequency energy.

The video codec is configured to compress or decompress a digital video. The terminal device 100 may support one or more video codecs. Therefore, the terminal device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a transmission mode between human brain neurons, and may further continuously perform self-learning. The NPU may be used to implement applications such as intelligent cognition of the terminal device 100, for example, image recognition, facial recognition, speech recognition, and text understanding.

The internal memory 121 may include one or more random access memories (random access memory, RAM) and one or more non-volatile memories (non-volatile memory, NVM).

The random access memory may include a static random access memory (static random access memory, SRAM), a dynamic random access memory (dynamic random access memory, DRAM), a synchronous dynamic random access memory (synchronous dynamic random access memory, SDRAM), a double data rate synchronous dynamic random access memory (double data rate synchronous dynamic random access memory, DDR SDRAM, for example, a fifth generation DDR SDRAM is generally referred to as a DDR5 SDRAM), and the like. The nonvolatile memory may include a magnetic disk storage device, a flash memory (flash memory), and the like.

The flash memory may be classified into an NOR flash, an NAND flash, a 3D NAND flash, and the like according to an operation principle; may be classified into a single-level cell (single-level cell, SLC), a multi-level cell (multi-level cell, MLC), a triple-level cell (triple-level cell, TLC), a quad-level cell (quad-level cell, QLC), and the like based on a quantity of electric potential levels of a cell; or may be classified into a universal flash storage (English: universal flash storage, UFS), an embedded multi media card (embedded multi media Card, eMMC), and the like according to storage specifications.

The random access memory may be directly read and written by using the processor 110. The random access memory may be configured to store an executable program (for example, machine instructions) in an operating system or another running program, and may be further configured to store data of a user, data of an application, and the like.

The nonvolatile memory may also store an executable program, data of a user, data of an application, and the like, which may be loaded into the random access memory in advance for directly reading and writing by using the processor 110.

The external memory interface 120 may be configured to connect to an external non-volatile memory, to expand a storage capability of the terminal device 100. The external non-volatile memory communicates with the processor 110 through the external memory interface 120, to implement a data storage function. For example, files such as music and videos are stored in the external non-volatile memory.

The terminal device 100 may implement an audio function such as music playing or recording through the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to code and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal.

The receiver 170B, also referred to as an "earpiece", is configured to convert an audio electrical signal into a sound signal.

The microphone 170C, also referred to as a "mike" or a "mic", is configured to convert a sound signal into an electrical signal.

The headset jack 170D is configured to connect to a wired headset.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor.

The gyroscope sensor 180B may be configured to determine a moving posture of the terminal device 100. In some embodiments, an angular velocity of the terminal device 100 around three axes (axes x, y, and z) may be determined by using the gyroscope sensor 180B.

The barometric pressure sensor 180C is configured to measure barometric pressure.

The magnetic sensor 180D includes a Hall effect sensor.

The acceleration sensor 180E may detect an acceleration value of the terminal device 100 in various directions (usually on three axes). When the terminal device 100 is still, a magnitude and a direction of gravity may be detected. The acceleration sensor 180E may be further configured to identify a posture of the terminal device.

The distance sensor 180F is configured to measure a distance. The terminal device 100 may measure the distance in an infrared manner or a laser manner.

The optical proximity sensor 180G may include, for example, a light emitting diode (LED) and an optical detector, for example, a photodiode.

The ambient light sensor 180L is configured to sense ambient light brightness. The terminal device 100 may adaptively adjust brightness of the display 194 based on the sensed ambient light brightness.

The fingerprint sensor 180H is configured to collect a fingerprint.

The temperature sensor 180J is configured to detect a temperature. In some embodiments, the terminal device 100 executes a temperature processing policy based on the temperature detected by the temperature sensor 180J.

The touch sensor 180K is also referred to as a "touch component". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided on the display 194. In some other embodiments, the touch sensor 180K may also be disposed on a surface of the terminal device 100 at a location different from that of the display 194.

The bone conduction sensor 180M may obtain a vibration signal. In some embodiments, the bone conduction sensor 180M may obtain a vibration signal of a vibration bone of a human vocal-cord part.

The button 190 includes a power button, a volume button, and the like. The button 190 may be a mechanical button, or may be a touch button. The terminal device 100 may receive a key input, and generate a key signal input related to a user setting and function control of the terminal device 100.

The following describes a structure of a diagnosis server 300 according to an embodiment of this application.

Figure 3:
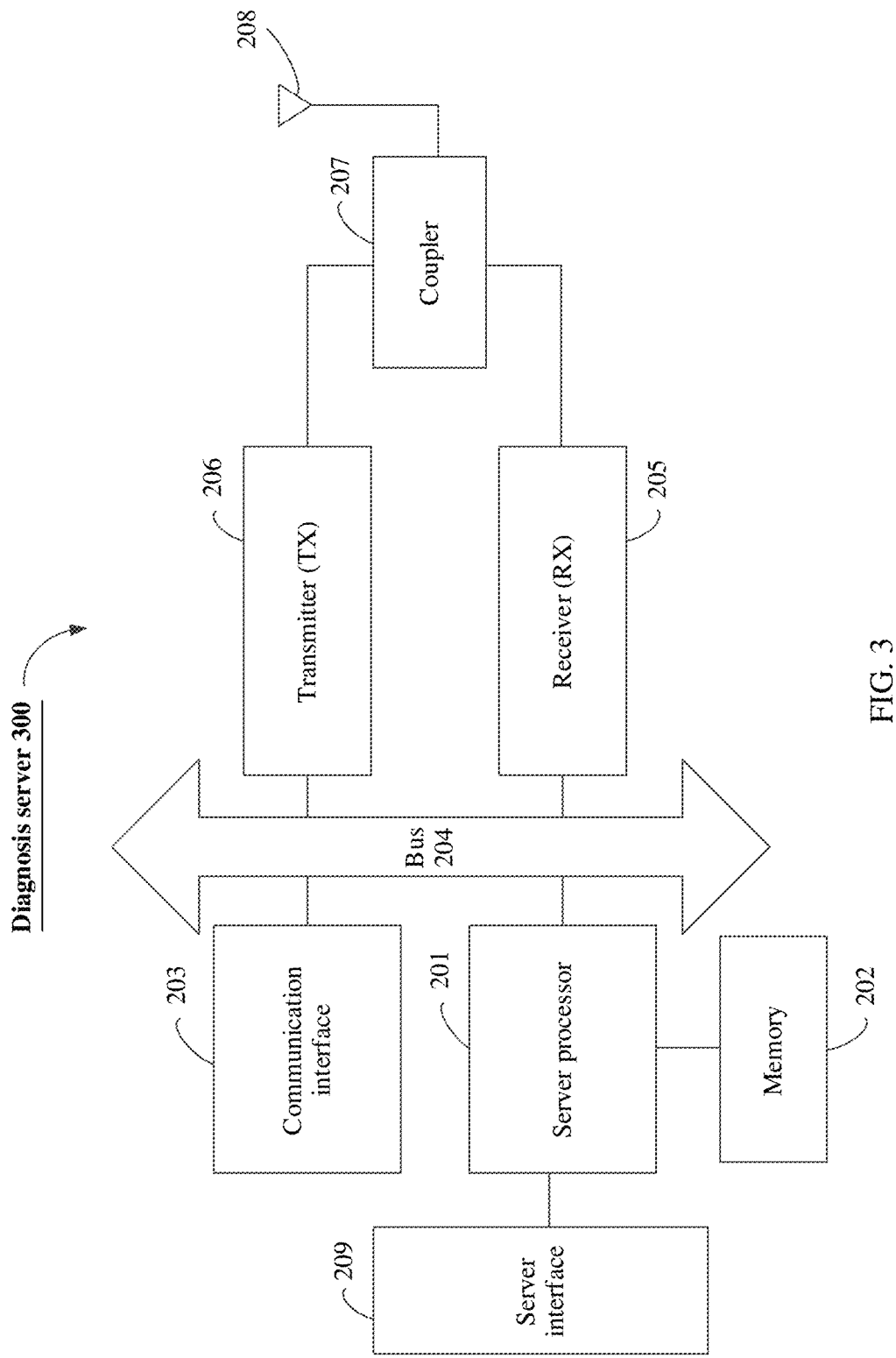
FIG. 3 is a schematic diagram of a structure of a service server according to an embodiment of this application.

FIG. 3 shows an example of a structure of a diagnosis server 300 according to an embodiment of this application. As shown in FIG. 3, the diagnosis server 300 may include one or more server processors 201, a memory 202, a communication interface 203, a receiver 205, a transmitter 206, a coupler 207, an antenna 208, and a server interface 209. These components may be connected through a bus 204 or in another manner. In FIG. 3, for example, the components are connected through the bus.

The communication interface 203 may be configured for communication between the diagnosis server 300 and another communication device, for example, a terminal device. Specifically, the terminal device may be the terminal device 100 shown in FIG. 2. Specifically, the communication interface 203 may be a 5G communication interface, or may be a future new radio communication interface. In addition to a wireless communication interface, the wired communication interface 203, for example, a local access network (local access network, LAN) interface may be further configured on the diagnosis server 300. The transmitter 206 may be configured to perform transmission processing on a signal output by the server processor 201. The receiver 205 may be configured to perform reception processing on a mobile communication signal received through the antenna 208.

In some embodiments of this application, the transmitter 206 and the receiver 205 may be considered as a wireless modem. In the diagnosis server 300, there may be one or more transmitters 206 and receivers 205. The antenna 208 may be configured to convert electromagnetic energy in a transmission line into an electromagnetic wave in free space, or convert an electromagnetic wave in free space into electromagnetic energy in a transmission line. The coupler 207 is configured to: divide a mobile communication signal received through the antenna 208 into a plurality of signals, and allocate the plurality of signals to a plurality of receivers 205.

The memory 202 is coupled to the server processor 201 and configured to store various software programs and/or a plurality of groups of instructions. Specifically, the memory 202 may include a high-speed random access memory, or a non-volatile memory, for example, one or more disk storage devices, a flash memory device, or another non-volatile solid-state storage device. The memory 202 may store a network communication program, and the network communication program may be configured to communicate with one or more additional devices, one or more terminal devices, and one or more network devices.

In some embodiments of this application, the memory 202 may be configured to store an implementation program, on the side of the diagnosis server 300, of a method for processing a webpage access exception provided in one or more embodiments of this application.

The server processor 201 may be configured to read and perform computer-readable instructions. Specifically, the server processor 201 may be configured to: invoke the program stored in the memory 202, for example, the implementation program, on the side of diagnosis server 300, of the method for processing a webpage access exception provided in one or more embodiments of this application, and execute instructions included in the program.

It should be noted that the diagnosis server 300 shown in FIG. 3 is merely an implementation of this embodiment of this application. In actual application, the diagnosis server 300 may further include more or fewer components. This is not limited herein. For structures of the service server 200 and the recommendation server 400, refer to the diagnosis server 300 shown in FIG. 3, and details are not described herein again.

Figure 4:
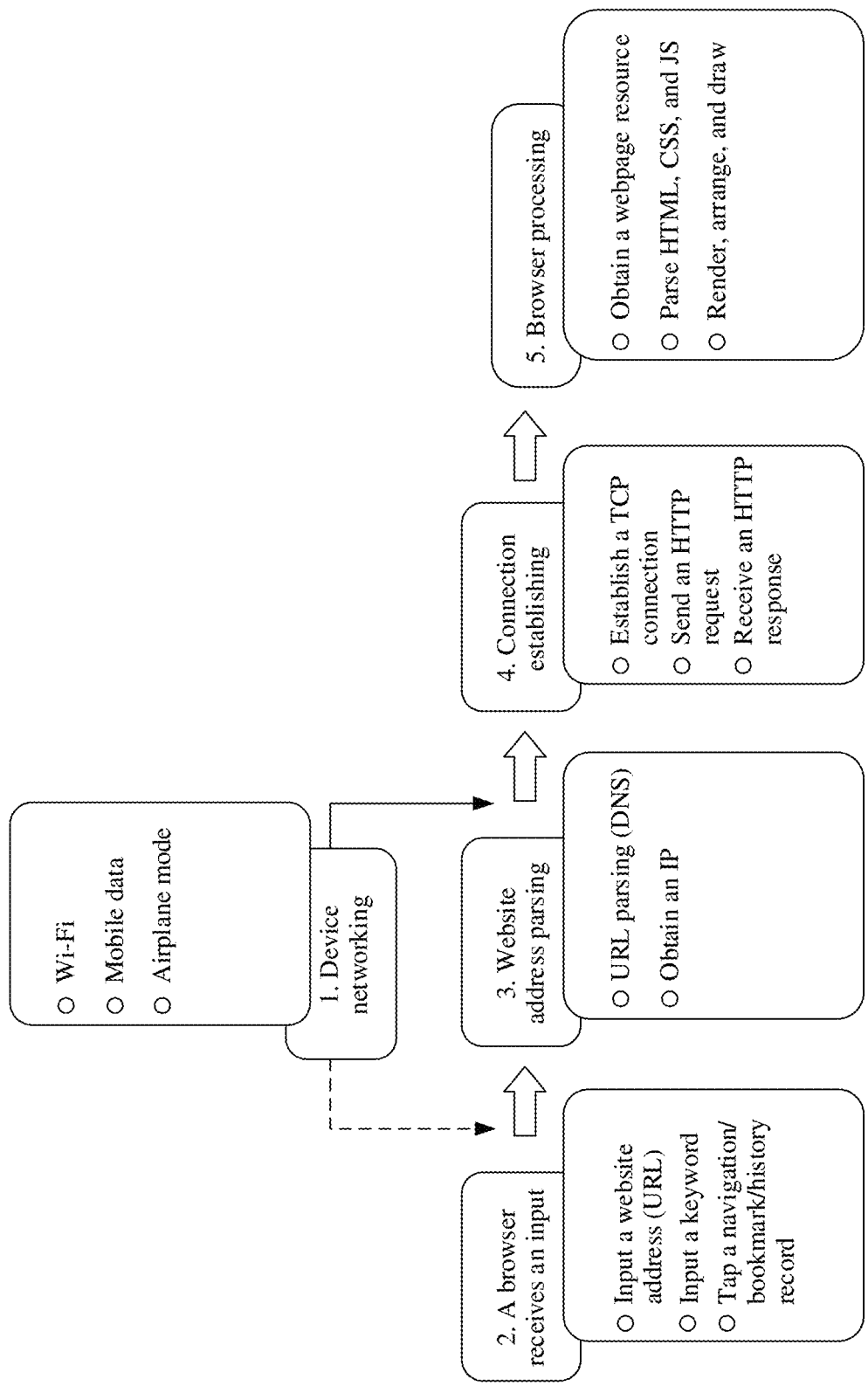
FIG. 4 is a schematic flowchart of browsing a webpage according to an embodiment of this application.

The following uses a schematic flowchart shown in FIG. 4 as an example to describe a specific implementation in which a user accesses a webpage by using a Browser app.

1. First, a terminal device 100 is connected to a network.

In some embodiments, that a terminal device 100 is connected to a network means that the terminal device 100 accesses the communication network 500. After the terminal device 100 is connected to the network, the terminal device 100 may establish a communication connection to a service server 200 through the communication network 500, and request to obtain a webpage resource in the service server 200.

In this embodiment of this application, the terminal device 100 may be connected to the network in at least one wireless communication manner like Wi-Fi or cellular mobile communication. The terminal device 100 is usually provided with on/off controls of various wireless communication manners, for example, a WLAN on/off control and a cellular mobile communication (namely, mobile data) on/off control. The WLAN on/off control is used as an example. The on/off control has an on (ON) state and an off (OFF) state. When the WLAN on/off control is in an on state, the terminal device 100 can be connected to the network through Wi-Fi. When the WLAN on/off control is in an off state, the terminal device 100 cannot be connected to the network through Wi-Fi. The user may control switching between the two states of the on/off control. In addition, the terminal device 100 is further provided with an airplane mode on/off control. When the airplane mode on/off control is in an on state, the terminal device 100 disables a communication module, and the terminal device 100 cannot be connected to the network in any wireless communication manner. When the airplane mode on/off control is in an off state, the terminal device 100 does not disable the communication module.

2. The terminal device 100 receives a first input operation performed by the user on the Browser app, where the first input operation indicates a first website address and/or a first keyword.

The first website address indicates an IP address of the service server 200. In response to the first input operation, the terminal device 100 may request, from the service server 200, to obtain a webpage resource of a first webpage indicated by the first website address, and display the first webpage based on the webpage resource. Specifically, the following embodiment is described in detail by performing step 3 to step 5.

In some embodiments, the first input operation may include one or more of the following: inputting the first website address in a website address search bar, inputting the first keyword in a keyword search bar, tapping a text link (for example, tapping a favorite bookmark, tapping a historical search record, tapping a historical access record, or tapping an information link), tapping an image link (for example, tapping a website icon), and the like. The text link and the image link are associated with the first website address of an information resource (for example, the first webpage). In an implementation, when the first input operation includes inputting a website address or inputting a keyword, the first input operation may further include tapping an enter button, a search button, or an access button.

Figure 5A:
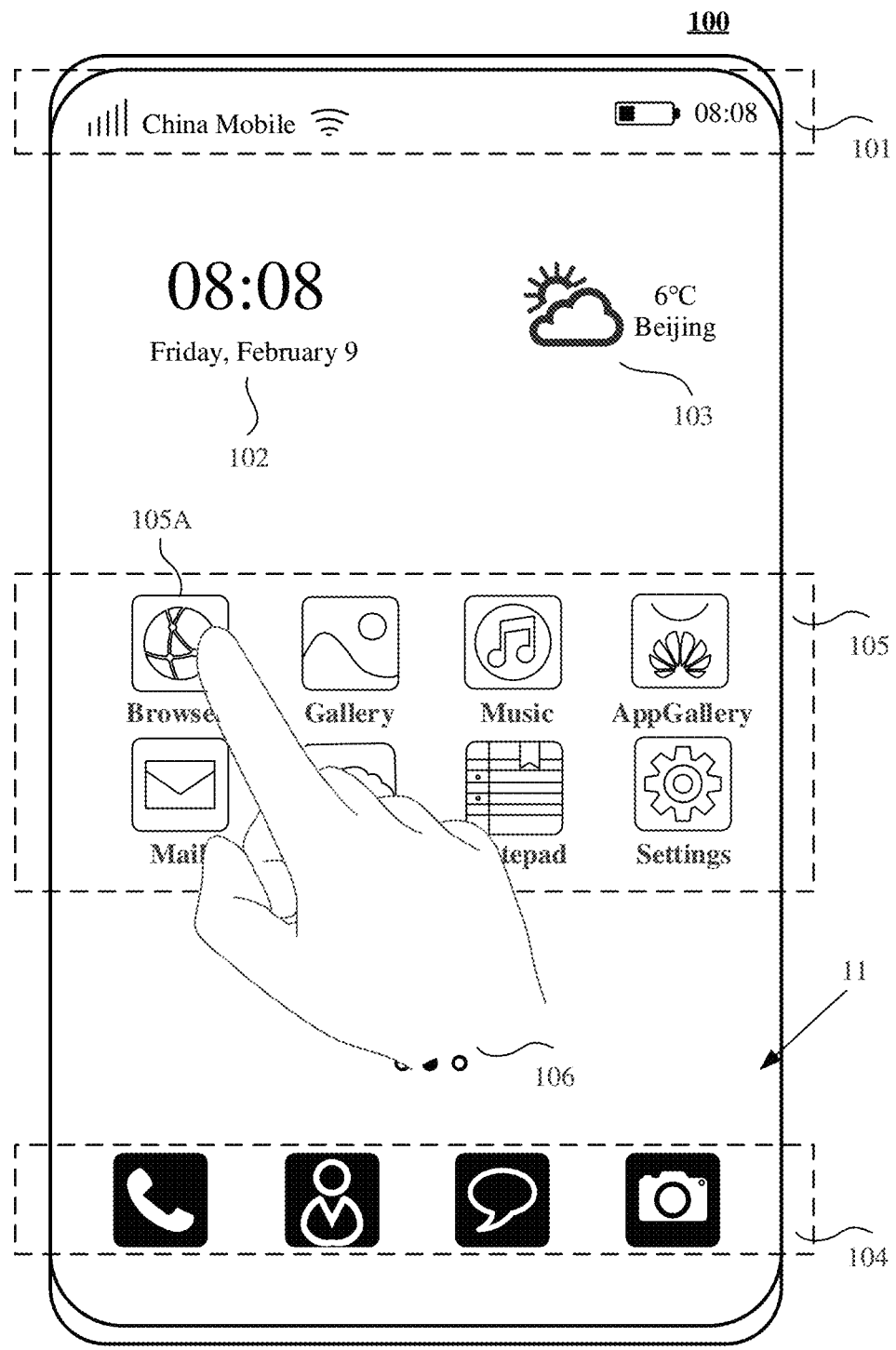
FIG. 5A to FIG. 5E show browser-related user interfaces according to an embodiment of this application.
Figure 5B:
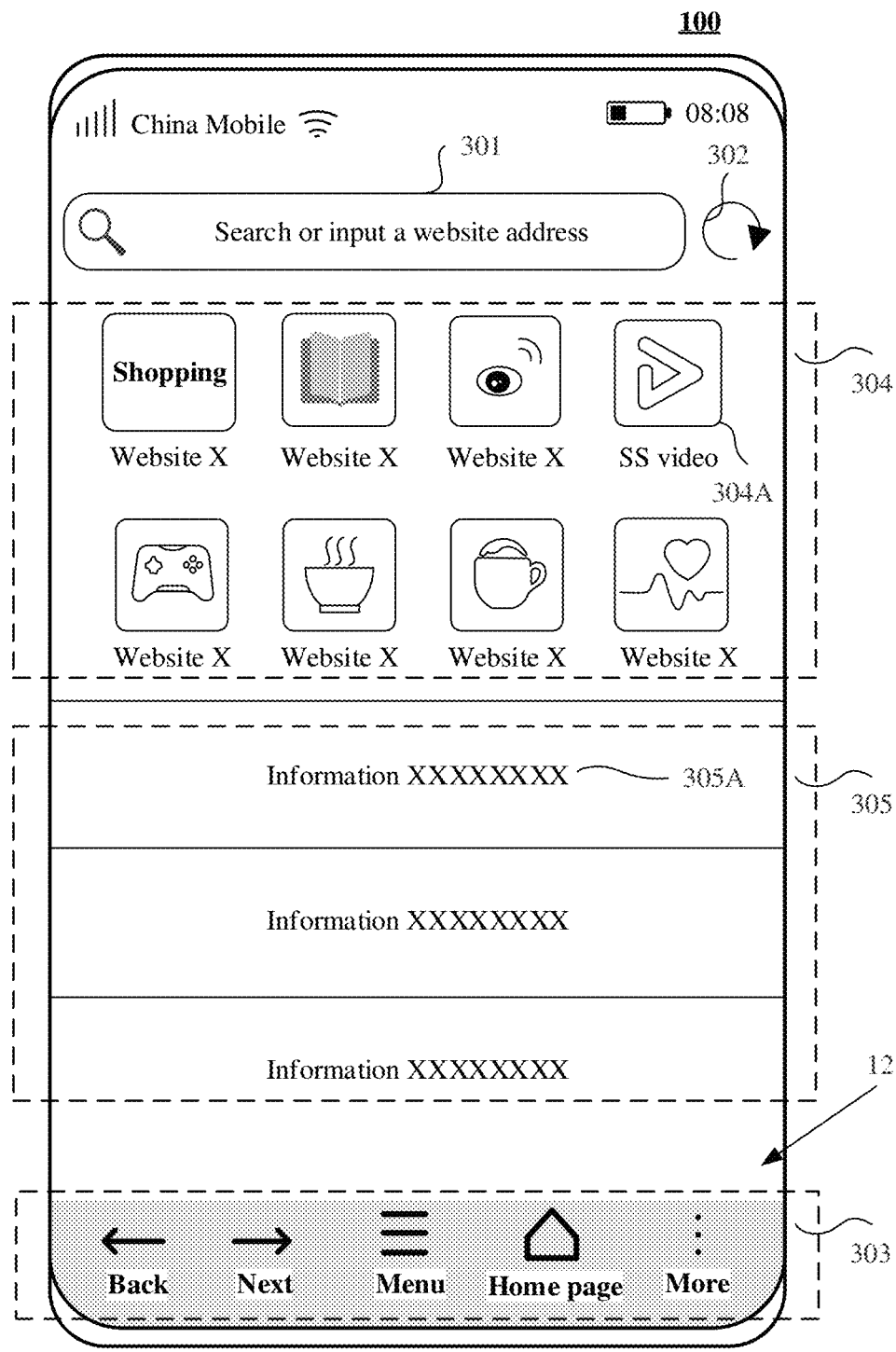

As shown in FIG. 5A and FIG. 5B, the following describes an example of the first input operation.

For example, FIG. 5A shows a home screen 11 that is on the terminal device 100 and that is used to display an application installed on the terminal device 100. The home screen 11 may include: a status bar 101, a calendar indicator 102, a weather indicator 103, a tray 104 including icons of commonly used applications, and other application icons 105.

The tray 104 including the icons of the commonly used applications may display a Phone icon, a Contacts icon, a Messages icon, and a Camera icon. The other application icons 105 may display: a Browser app icon 105A, an Album icon, a Music icon, an Email icon, a Notes icon, a Settings icon, and the like. The home screen 11 may further include a page indicator 106. The other application icons may be distributed on a plurality of pages, and the page indicator 106 may indicate a specific page on which an application currently viewed by the user is located. The user may flick to the left or to the right in areas of the other application icons, to view an application icon on another page.

For example, the Browser app icon 105A may receive an input operation (for example, a touch operation) of the user, and in response to the input operation, the terminal device 100 may display a browser home page 12 shown in FIG. 5B. As shown in FIG. 5B, the browser home page 12 may include a search bar 301, a refresh button 302, a function bar 303, an icon 304 of a commonly used website (for example, an icon 304A of an SS video website), and at least one information link 305 (for example, an Information link 305A). The function bar 303 includes at least one function button, for example, a Next button, a Back button, a Menu button, and a More button.

In an implementation, the first input operation includes inputting the first website address in the search bar 301, and the first input operation is used to access the first webpage indicated by the first website address. It should be noted that, if the first website address entered by the user is an incorrect website address, the first webpage indicated by the first website address does not exist, and the first webpage cannot be accessed.

In an implementation, the first input operation includes inputting the first keyword in the search bar 301, a search engine corresponding to the search bar 301 is a search engine 1, the first website address indicated by the first input operation is a website address of the search engine 1, the first input operation is used to obtain a search webpage of the keyword by using the search engine 1, and the search webpage may include at least one search result associated with the first keyword. Generally, the search engine corresponding to the search bar 301 is a search engine that is set by the Browser app by default, and the user may also change the search engine corresponding to the search bar 301.

In an implementation, the first input operation is tapping the icon 304A of the SS video website, the first website address indicated by the first input operation is a website address of the SS video website associated with the icon 304A, the first keyword indicated by the first input operation may be a name of the SS video website, a website type (for example, a video website, a social website, or a music website) of the SS video website, and/or the website address of the SS video website, and the first input operation is used to obtain a webpage of the SS video website.

In an implementation, the first input operation is tapping the Information link 305A, the first website address indicated by the first input operation is a website address associated with the Information link 305A, the first keyword indicated by the first input operation may be a title of the Information link 305A and/or a website address associated with the Information link 305A, and the first input operation is used to obtain a webpage corresponding to the Information link 305A.

This is not limited to the first input operation described in the embodiment related to FIG. 5B. The first input operation may alternatively be an input operation that is triggered in another app and that is used to access a specified link, or may be a voice search command received by the terminal device 100. This is not specifically limited herein.

3. The terminal device 100 parses the first website address, to obtain an internet protocol (Internet Protocol, IP) address of the service server 200 corresponding to the first website address.

In this embodiment of this application, the first website address may be a URL link, or may be an IP address.

It should be noted that the URL link generally includes a part or all of the following: a protocol (scheme), a domain (domain) name, a resource path (Path), a file name (filename), and a parameter.

The protocol indicates a resource obtaining manner, and different protocols correspond to different communication content formats, for example, protocols such as Http, Https, File, Telnet, Ftp, and News. The domain name indicates the service server 200, or the IP address of the service server 200 may be used as a domain name of the server. The domain name may be followed by a port number. If the URL link does not contain a port number, a default port number corresponding to the protocol in the URL is used. The resource path indicates a hierarchical organization path of a target resource (for example, the first webpage) in the service server 200. When the URL link does not include the resource path, the service server 200 locates a root directory by default. The file name indicates a file name of the target resource. When the URL link does not include the file name, the service server 200 uses a default file in the last directory in the resource path as a file of the target resource. The parameter indicates all parameters required for accessing the target resource.

For example, the URL link is https://www.zju.edu/masterfile/86886699/notice/996682256/index.html. The protocol is https, the domain name is www.zju.edu, the resource path is masterfile/86886699/notice/996682256, and the file name is index.html.

When the terminal device 100 parses the URL link, if the domain name in the URL link is not an IP address, the domain name is parsed into an IP address by using a DNS (domain name system), where the IP address is the IP address of the service server 200. In an implementation, the terminal device 100 parses the URL link by using local domain name system (Domain Name System, DNS) cache data. If the terminal device 100 successfully parses the URL link by using the local DNS cache data, and obtains the IP address corresponding to the domain name, the terminal device 100 performs step 4. If the terminal device 100 fails to parse the URL link, the terminal device 100 requests the DNS server to parse the URL connection by using cloud DNS cache data, so as to obtain the IP address of the service server 200.

It should be noted that a case in which the IP address corresponding to the URL link cannot be obtained through parsing may include: The user enters an incorrect URL link, an error occurs in the local DNS cache data, the terminal device 100 is not connected to the network, and an error occurs in the DNS server. It may be understood that, when the terminal device 100 is not connected to the network, the terminal device 100 cannot establish a connection to the DNS server, and cannot request the DNS server to parse the website address.

4. The terminal device 100 establishes, based on the IP address of the service server 200, a connection to the service server 200, and requests to obtain the webpage resource of the first webpage indicated by the first website address.

In some embodiments, the terminal device 100 establishes a communication connection to the service server 200 based on the TCP/IP protocol. After the communication connection is established, the terminal device 100 sends an Http request to the service server 200, where the Http request is used to request to obtain the webpage resource of the first webpage indicated by the first website address; and the service server 200 sends an Http response to the terminal device 100 based on the Http request, where the Http response carries the webpage resource of the first webpage.

It should be noted that, if the terminal device 100 fails to establish a communication connection to the service server 200, a file indicated by the URL link in the service server 200 is abnormal, or the service server 200 responds slowly, the terminal device 100 may fail to access the first website address.

5. The webpage resource of the first webpage sent by the service server 200 is received, and the Browser app displays the first webpage based on the webpage resource.

In some embodiments, the terminal device 100 obtains the webpage resource of the first webpage sent by the service server 200, constructs a DOM tree of the first webpage by parsing a hypertext markup language (hypertext markup language, HTML) file, a cascading style sheet (cascading style sheets, CSS) file, and a JS (Javascript) file that are in the webpage resource, then arranges, draws, and renders the first webpage based on the DOM tree of the first webpage, and finally displays the first webpage by using the Browser app.

Figure 5C:
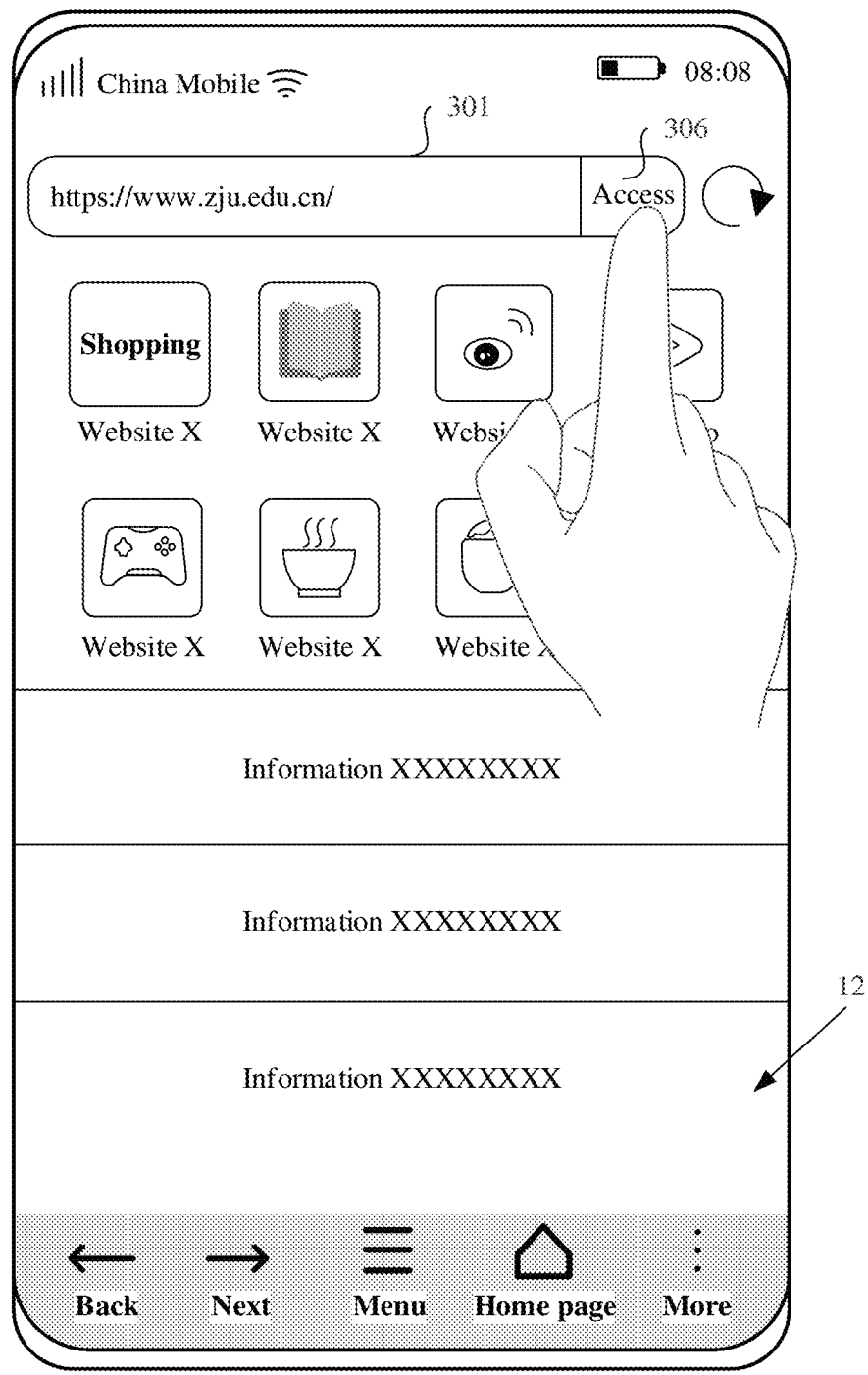
Figure 5D:
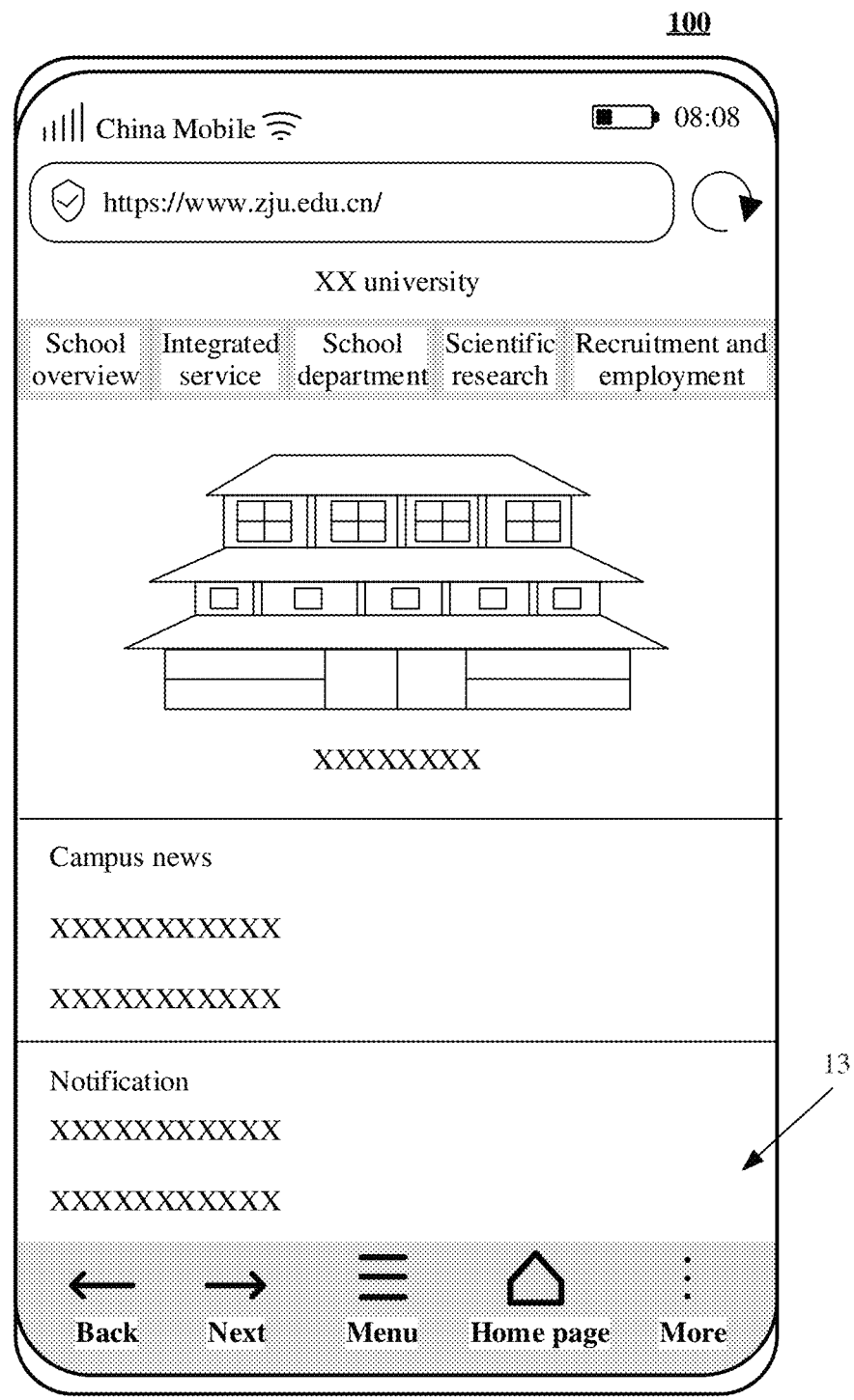

For example, as shown in FIG. 5C, after the user enters a website address https://www.zju.edu.cn/in the search bar 301, the terminal device 100 displays an access control 306, where the website address is a website address of an XX University official website. The access control 306 may receive an input operation (for example, a touch operation) of the user, and in response to the input operation of the user, the terminal device 100 parses the website address, to obtain an IP address 1 corresponding to a domain name "www.zju.edu.cn" of the website address. The terminal device 100 requests a server corresponding to the IP address 1, to obtain a webpage resource of the XX University official website indicated by the website address, and displays, based on the webpage resource fed back by the server, a user interface 13 shown in FIG. 5D. The user interface 13 includes a webpage of the XX University official website.

It should be noted that a webpage resource exception fed back by the service server may also cause the terminal device 100 to fail to access the webpage indicated by the first website address. In conclusion, it can be learned that in the access procedure shown in FIG. 4, an error in any phase may cause the terminal device 100 to fail to access the first website address, and the Browser app displays an error prompt interface. In this embodiment of this application, accessing the first website address means accessing the webpage indicated by the first website address, accessing a website address means accessing a webpage (the webpage indicated by the website address), and failing to access the first website address means failing to access the webpage corresponding to the first website address.

An embodiment of this application provides a method for processing a webpage access exception. For example, FIG. 5E to FIG. 5H show user interfaces of several webpage access exceptions involved in the method.

Figure 5E:
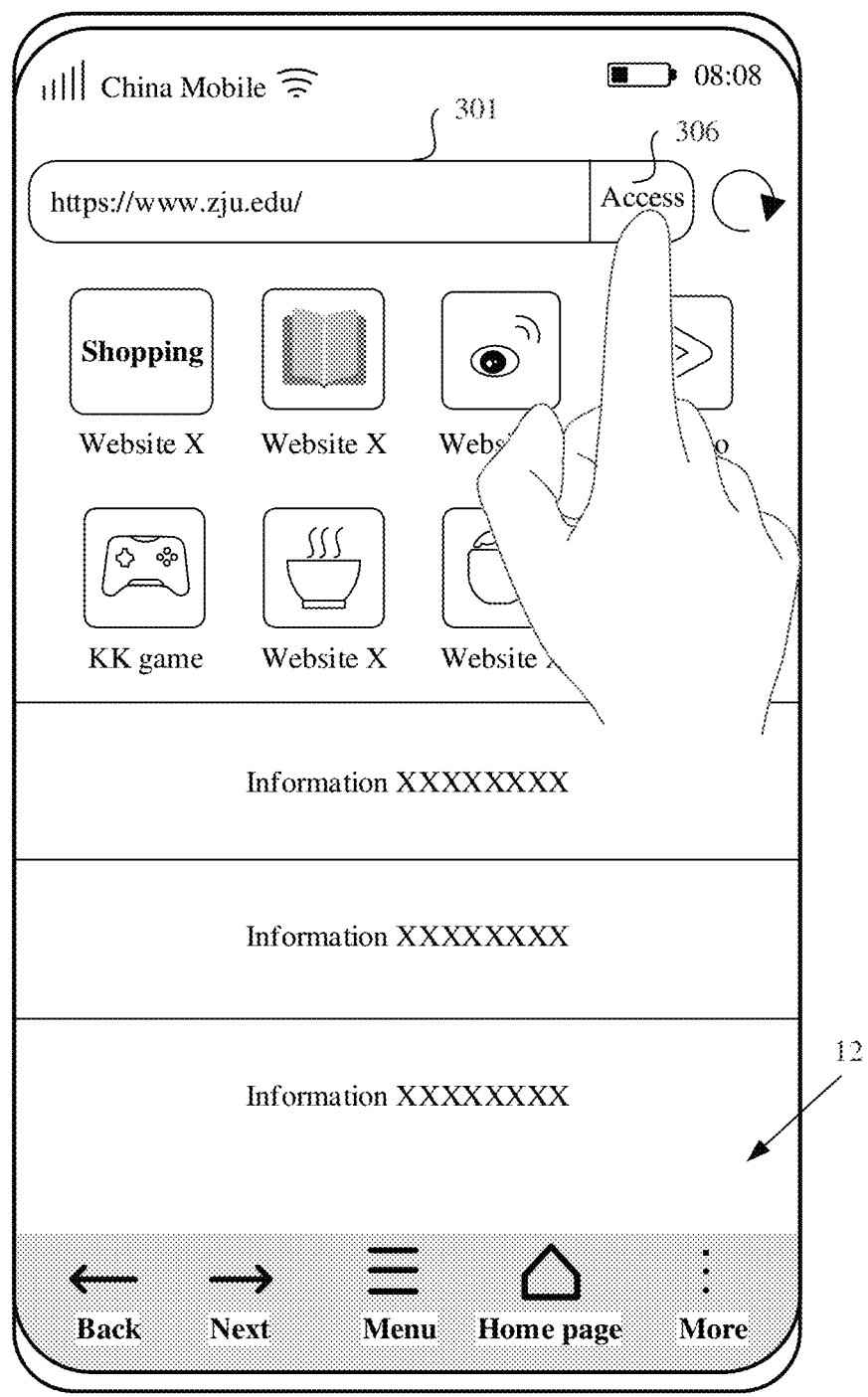
Figure 5F:
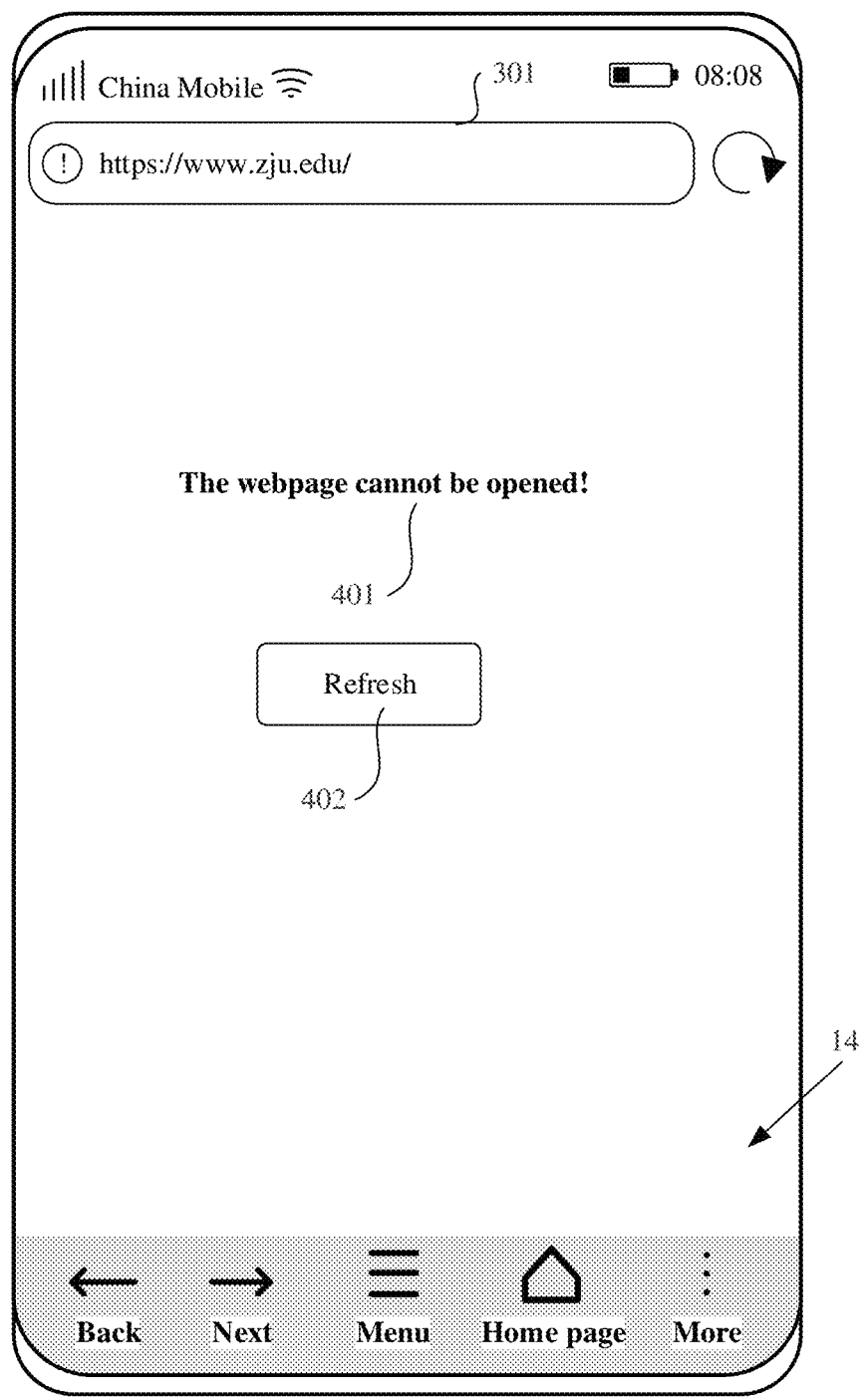
FIG. 5F to FIG. 5H show several error prompt interfaces according to an embodiment of this application.

In a case, as shown in FIG. 5E, a website address entered by a user in a search bar 301 is an incorrect website address. After receiving the website address entered by the user, the terminal device 100 accesses the incorrect website address in response to the input operation of the user on an access control 306, that is, performs the foregoing step 3 to step 5 based on the incorrect website address. Because an IP address corresponding to the incorrect website address cannot be obtained through parsing, a Browser app fails to access the website address, and the terminal device 100 displays an error prompt interface 14 shown in FIG. 5F. The error prompt interface 14 may include exception prompt information 401, where the exception prompt information 401 prompts the user "The webpage cannot be opened!" Optionally, the error prompt interface 14 further includes a refresh button 402. The refresh button 402 may receive an input operation (for example, a touch operation) of the user, and in response to the input operation of the user, the terminal device 100 tries to access again the website address entered by the user.

Figure 5G:
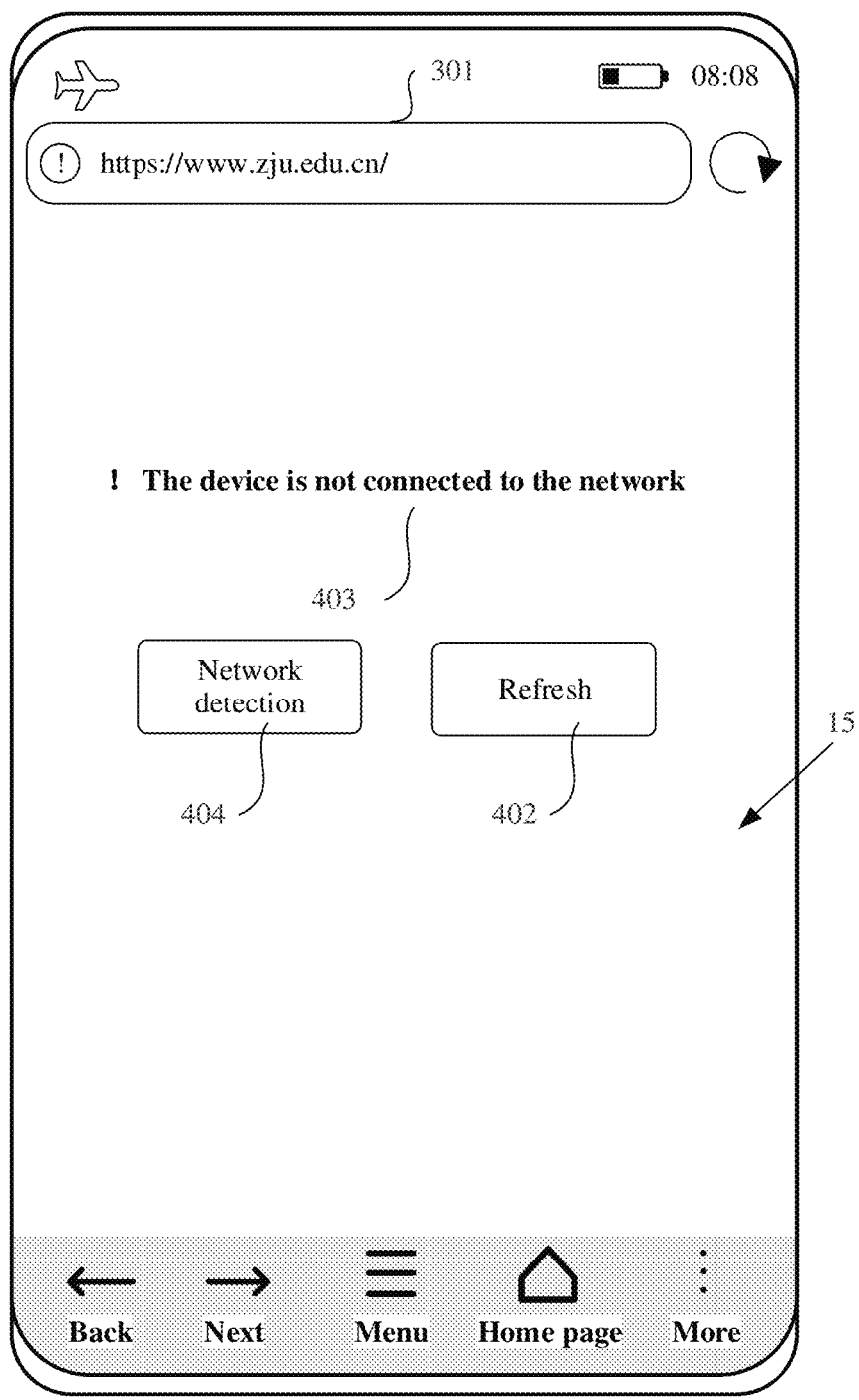
Figure 5H:
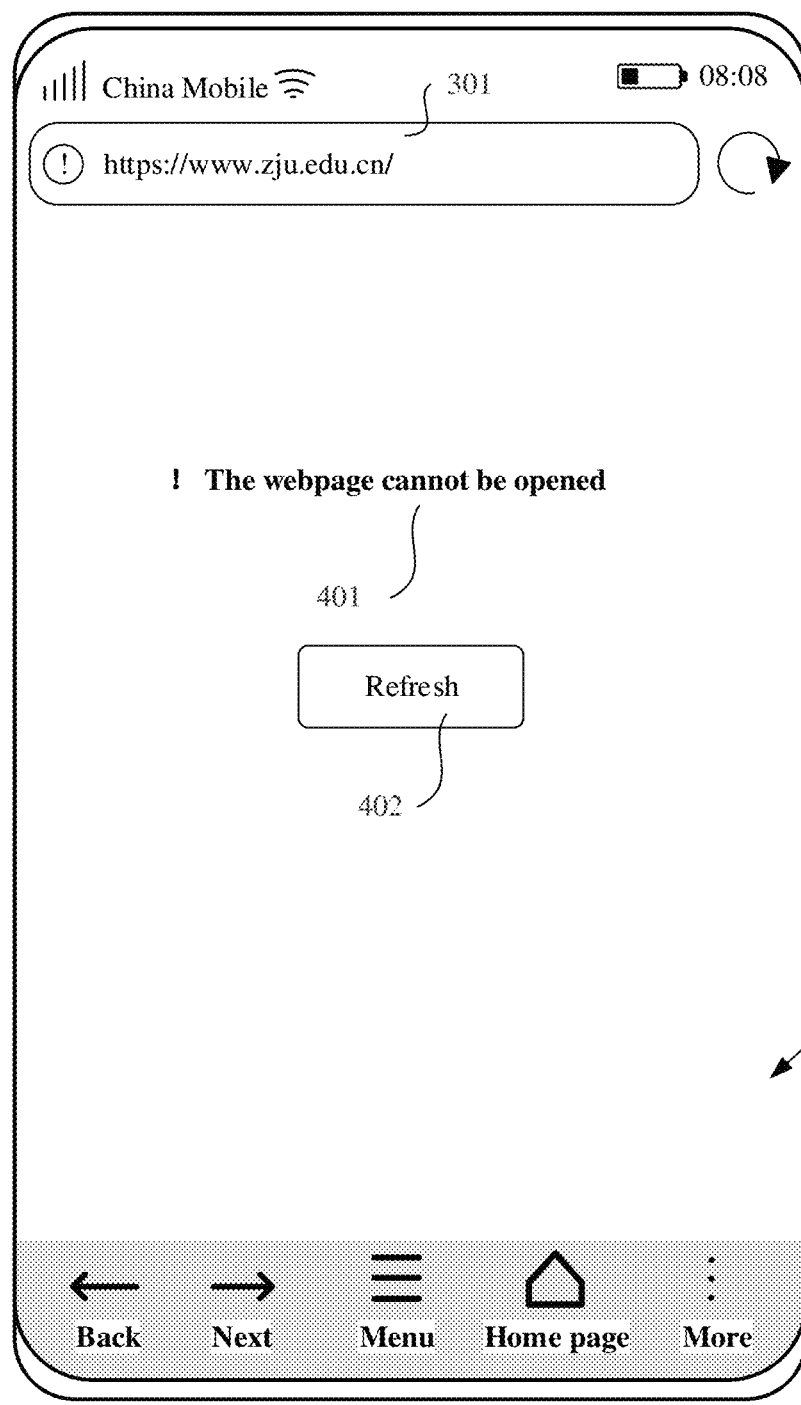

In another case, as shown in FIG. 5G, an airplane mode of the terminal device 100 is turned on, and the terminal device 100 disables a communication module. After receiving, by using the search bar 301, a correct first website address entered by the user, the terminal device 100 accesses the first website address in response to the input operation performed by the user on the access control 306. Because the terminal device 100 is not connected to the network, the terminal device 100 fails to access the first website address, and the terminal device 100 displays an error prompt interface 15 shown in FIG. 5G. The error prompt interface 15 includes prompt information 403, where the prompt information 403 prompts the user that the terminal device 100 is not connected to the network. Optionally, the error prompt interface 15 further includes a network detection button 404. The network detection button 404 may receive an input operation (for example, a touch operation) of the user, and in response to the input operation of the user, the terminal device 100 may detect a network problem of the terminal device 100.

In another case, the terminal device 100 is connected to the network. After receiving, by using the search bar 301, a correct first website address entered by the user, the terminal device 100 accesses the first website address in response to the input operation performed by the user on the access control 306. Due to another reason (for example, the service server indicated by the first website address is heavily loaded, and does not respond to an Http request of the terminal device 100 for a long time), the terminal device 100 fails to access the first website address, and the terminal device 100 displays an error prompt interface 16 shown in FIG. 5H. The error prompt interface 16 includes prompt information 401 and a refresh button 402. It may be understood that, even if the terminal device 100 is connected to the network and the website address entered by the user is correct, various error causes may still exist in the foregoing step 3 to step 5, which may cause a webpage access exception.

The prompt information on the error prompt interfaces shown in FIG. 5E to FIG. 5H has little valid information content, and can only prompt the user that the webpage cannot be opened or there is no network connection. There are many error causes of webpage access exceptions. The user cannot determine whether the problem is caused by the browser, network, or target webpage (website). Therefore, the user cannot select an effective solution to quickly resolve the webpage access exception.

An embodiment of this application further provides a method for processing a webpage access exception. In the method, when a Browser app fails to access a first website address indicated by a first input operation, the terminal device 100 can directly or indirectly diagnose a specific error cause of the webpage access exception; and then display the error cause and a corresponding response measure to a user on an error prompt interface, so that the user intuitively learns the error cause of the webpage access exception, and further determines, avoids, and/or resolves the error cause of the webpage access exception by implementing the response measure. In this embodiment of this application, the error cause of the webpage access exception that is directly or indirectly obtained through diagnosis performed by the terminal device 100 may be referred to as a first error cause.

The following describes, by using an example with reference to the accompanying drawings, an application scenario of the method for processing a webpage access exception.

Figure 6:
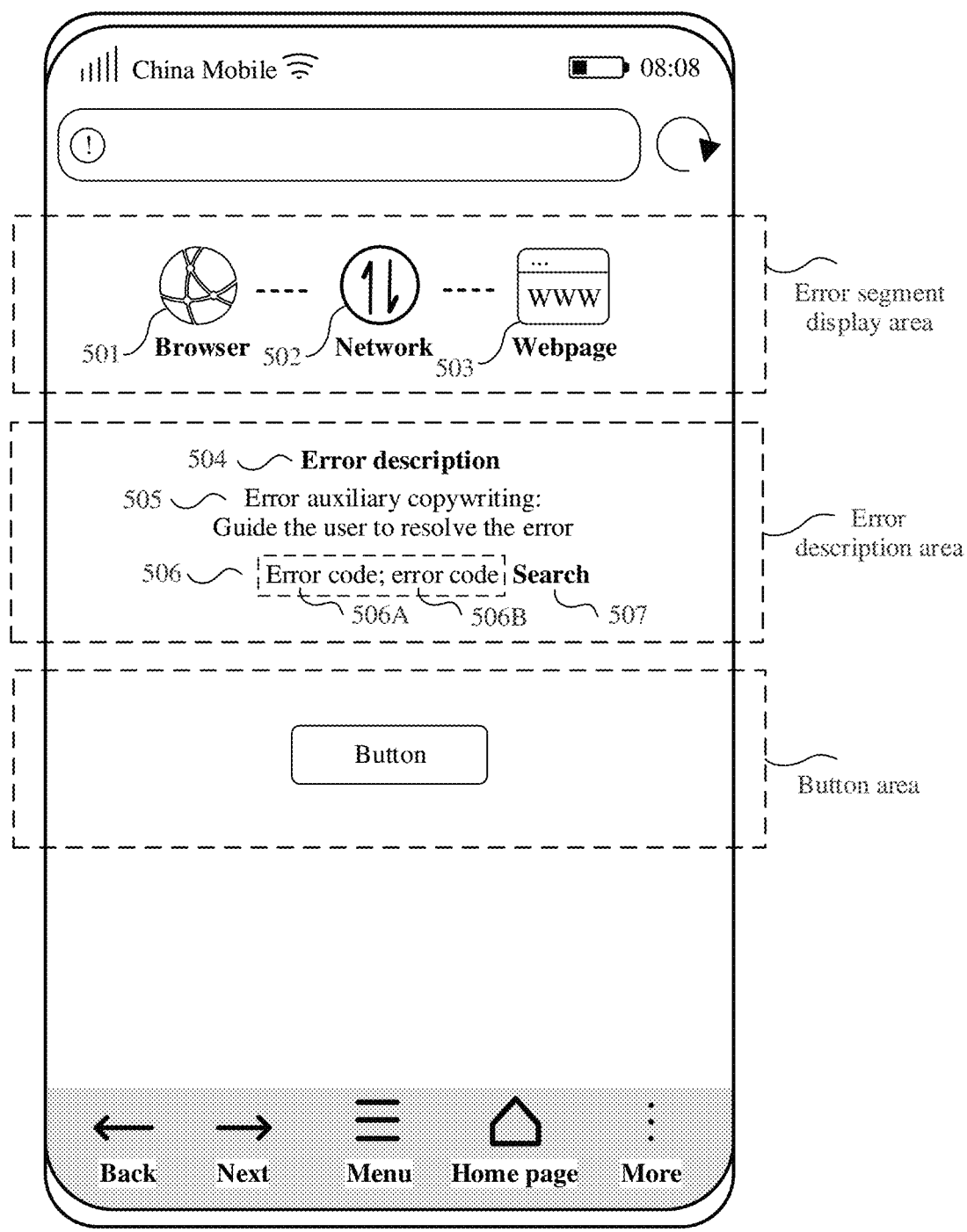
FIG. 6 shows an error prompt interface according to an embodiment of this application.

For example, the terminal device 100 receives the first input operation, and in response to the first input operation, the terminal device 100 accesses the first website address indicated by the first input operation. When failing to access the first website address, the terminal device 100 displays an error prompt interface shown in FIG. 6. As shown in FIG. 6, the error prompt interface may include one or more of the following: an error segment display area, an error description area, and a button area.

In this embodiment of this application, a procedure of accessing a specified website address includes three phases: browser processing, device networking, and webpage processing. Correspondingly, the error cause of the webpage access exception may include three types: a browser error, a network error, and a webpage error.

In some embodiments, the error segment display area of the error prompt interface includes a browser identifier, a network identifier, and a webpage identifier. Based on a display status of the first identifier and/or a connection relationship between adjacent identifiers, that the error cause of the webpage access exception is an error cause corresponding to a specific identifier in the three identifiers can be intuitively indicated to the user. The first identifier is any one of the three identifiers.

In this embodiment of this application, the browser error, the network error, and the webpage error are first-level error causes respectively corresponding to the three identifiers, and each first-level error cause may further specifically include a plurality of preset second-level error causes. The network error is used as an example. A plurality of second-level error causes corresponding to the network error are a plurality of different error causes that may cause a webpage access failure and that occur in a device networking, for example, an airplane mode is not turned off, mobile data is not turned on, and Wi-Fi is not turned on. In this embodiment of this application, the error cause of the webpage access exception obtained through diagnosis performed by the terminal device 100 may include at least one first-level error cause and/or at least one second-level error cause.

In this embodiment of this application, the first identifier may be presented in a form of icon, character (for example, text or number), or the like. In the following embodiment, an example in which the first identifier is presented as an icon is used for description.

In some embodiments, a Browser icon 501, a Network icon 502, and a Webpage icon 503 are displayed in the error segment display area of the error prompt interface, and a connection relationship among the three may be further displayed. Based on the display status and/or connection relationship of each icon, that an error of the webpage access exception occurs at specific phases in the three phases may be intuitively indicated to the user.

In some embodiments, a display form of the Network icon 502 is determined by a current network state of the terminal device 100. In an implementation, when the network is normal, the display form of the network icon is determined by a network currently used by the terminal device 100 to transmit a data service; or when a network is faulty, the display form of the network icon is determined by a network state indicated by the error cause of the webpage access exception. For example, if the network of the terminal device 100 is normal, and the terminal device 100 currently transmits the data service through the mobile data, the display form of the Network icon 502 is a mobile data icon shown in FIG. 6. For example, if the terminal device 100 determines that the error cause of the webpage access exception is that Wi-Fi is not turned on, the display form of the Network icon 502 is a Wi-Fi icon.

Figure 7:
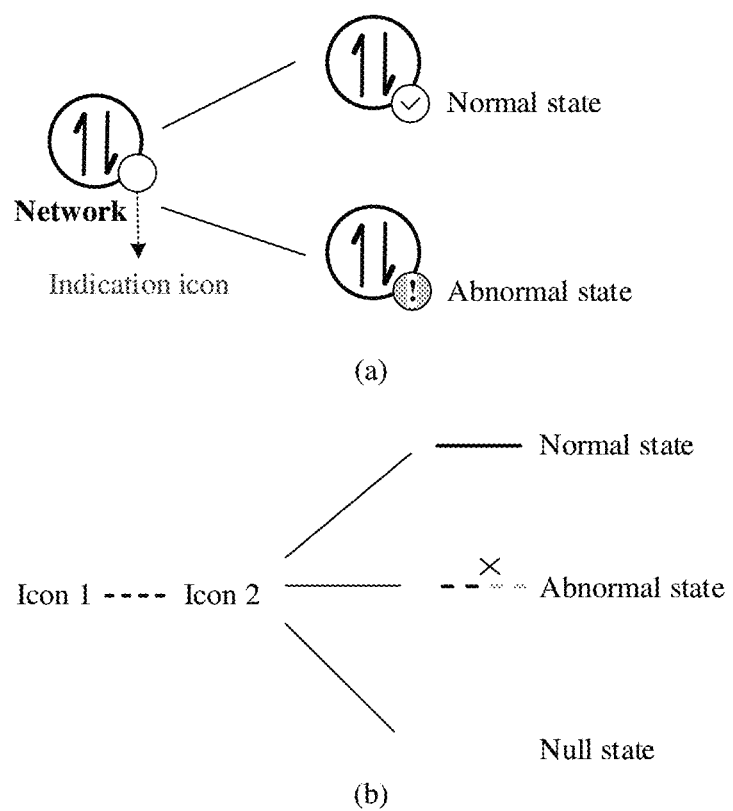
FIG. 7 is a related schematic diagram of an error segment display area according to an embodiment of this application.

In some embodiments, whether an error occurs in a phase corresponding to an icon is indicated based on an indication icon attached to each icon. As shown in (a) in FIG. 7, the Network icon 502 is used as an example, a normal state of an indication icon attached to the Network icon 502 indicates that the network is normal (the device is connected to the network), and an abnormal state of the indication icon indicates that a network error occurs (the device is not connected to the network).

In some embodiments, whether an error occurs in a phase corresponding to two icons may also be indicated based on a connection relationship between the two icons. As shown in (b) in FIG. 7, a connection relationship between an icon 1 and an icon 2 may include at least one of a normal state, an abnormal state, and a null state. For example, for a connection relationship between the Browser icon 501 and the Network icon 502, the normal state may represent that the browser is normal and the network is normal; the abnormal state represents that there is a network error (for example, when the browser is normal, but the terminal device 100 is not connected to the network, the browser cannot transmit a data service through the network, and the connection relationship is represented as an abnormal state); and the null state represents a browser error (for example, the Browser app is infected by a virus and cannot work normally). For example, for a connection relationship between the Network icon 502 and the Webpage icon 503, the abnormal state represents that there is a webpage error (for example, when the network is normal, but a service server corresponding to the webpage encounters a problem, the service server cannot respond to an access request of the terminal device 100, or there is no the webpage indicated by the first website address, and the connection relationship is represented as an abnormal state); and the null state represents that there is one of a browser error and a network error (for example, the terminal device 100 is not connected to the network).

In an implementation, when the first error cause is an error cause corresponding to the browser icon, a display status of the browser identifier indicates a browser error, a connection relationship between the browser icon and the network icon is presented as a null state, and a connection relationship between the network icon and the webpage icon is presented as a null state. When the first error cause is an error cause corresponding to the network icon, a display status of the network icon indicates a network error, a connection relationship between the browser icon and the network icon is presented as an abnormal state, and a connection relationship between the network icon and the webpage icon is presented as a null state. When the first error cause is an error cause corresponding to the webpage icon, a display status of the webpage icon indicates a webpage error, a connection relationship between the browser icon and the network icon is presented as a normal state, and a connection relationship between the network identifier and the webpage identifier is presented as an abnormal state.

In some embodiments, related information of the error cause is described in the error description area of the error prompt interface, and the error description area may include an error description 504, an error auxiliary copywriting 505, and an error code 506. The error description 504 is used to describe an error cause of a webpage access exception. The error auxiliary copywriting 505 is used to describe a response measure corresponding to the error cause. The error code 506 may include an English identifier 506A of the error code and/or an error code 506B.

It may be understood that, because there are many error causes of webpage access exceptions, to distinguish errors, the system sets error codes corresponding to various error causes. When a webpage access exception occurs, the terminal device 100 may display the error code corresponding to the error cause of the webpage access exception to the user, so that the user can quickly determine the error cause of the webpage access exception based on the error code. However, for a common user who is not familiar with the error code, the error cause of the webpage access exception cannot be obtained by viewing only the error code. In addition, error causes indicated by many error codes are sweeping, that is, one error code corresponds to a plurality of possible error causes. Even if the user can understand the error code, the user still cannot know a specific error cause of the webpage exception. In this embodiment of this application, with reference to the error description 504, the user can learn the specific error cause of the webpage access exception. With reference to the error auxiliary copywriting 505, the user can be further guided to understand, avoid, and/or resolve the error cause.

In some embodiments, the error description area further includes a search control 507. The search control 507 may receive an input operation of the user, and in response to the input operation, the terminal device 100 searches and displays detailed descriptions of the error code.

The button area of the error prompt interface includes at least one button, and the button in the button area may receive an input operation of the user. In response to the input operation, the terminal device 100 performs a specified operation corresponding to the error cause, where the specified operation is used to further determine, avoid, and/or resolve the error cause of the webpage access exception. In this embodiment of this application, the button in the button area may be used to trigger the terminal device to perform the operation corresponding to the error cause of the webpage access exception, and the operation may also be referred to as a first operation. The response measure corresponding to the error cause in the error auxiliary copywriting 505 includes performing the first operation, and the button in the button area may also be referred to as a first button.

In some embodiments, the button area may include a refresh button. The refresh button may receive an input operation (for example, a touch operation) of the user. In response to the input operation of the user, the terminal device 100 tries to access again the first website address indicated by the first input operation. It should be noted that the button in the button area may also be represented as a control like a text link or an image link, which is not specifically limited herein.

For various error causes, the following specifically describes an error prompt interface provided in embodiments of this application.

For example, FIG. 8A to FIG. 8F show some error prompt interfaces caused by network errors.

In some embodiments, the terminal device 100 is not connected to a network, and the terminal device 100 turns on an airplane mode. The terminal device 100 receives a first input operation, and in response to the first input operation, the terminal device 100 accesses a first website address indicated by the first input operation. The terminal device 100 fails to access the first website address. After determining that an error cause of a webpage access exception includes that "The airplane mode is not turned off", the terminal device 100 displays, based on the error cause, an error prompt interface 17 shown in FIG. 8A.

Figure 8A:
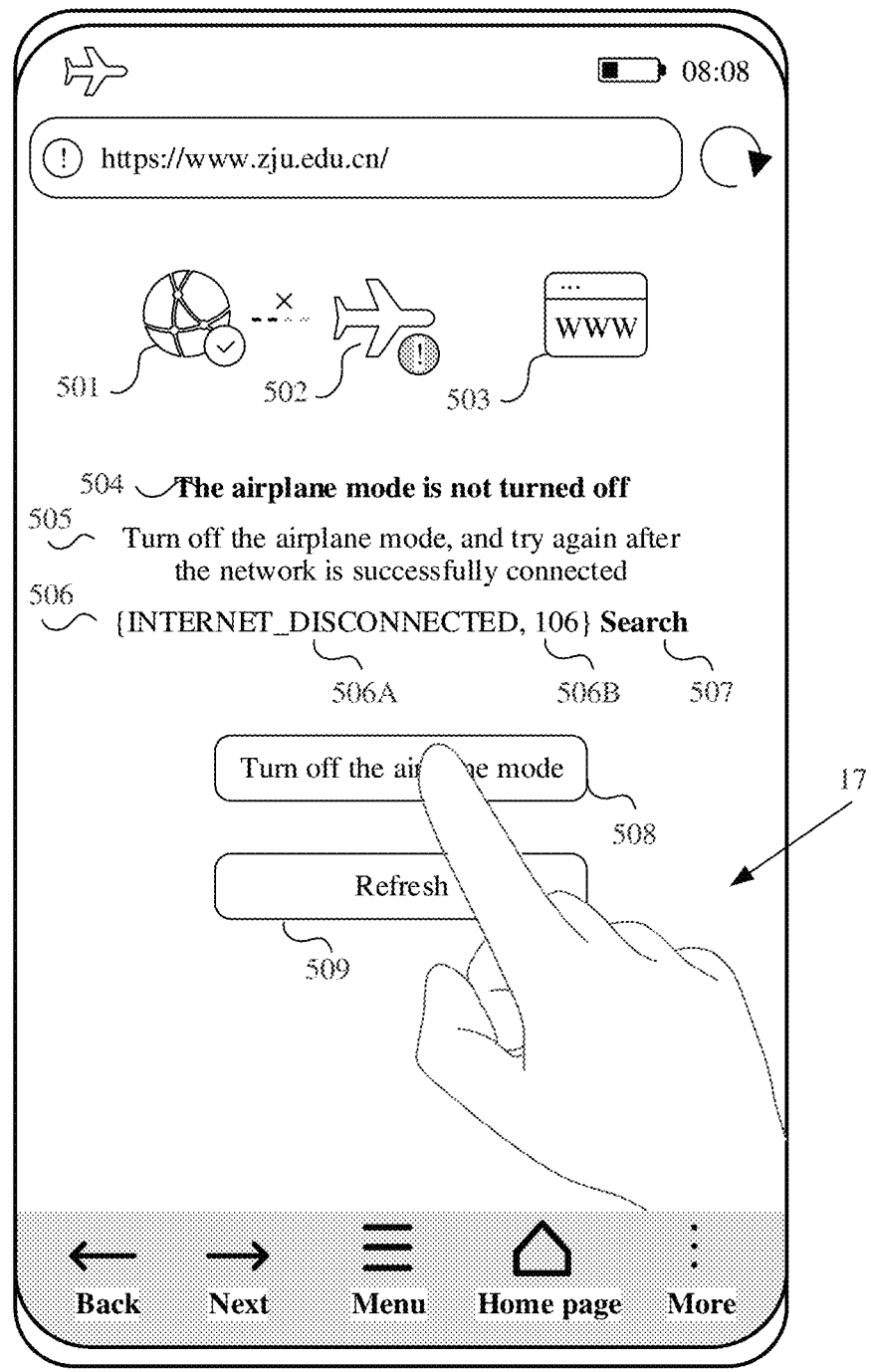
FIG. 8A to FIG. 8J show user interfaces of webpage access exceptions according to an embodiment of this application.
Figure 8B:
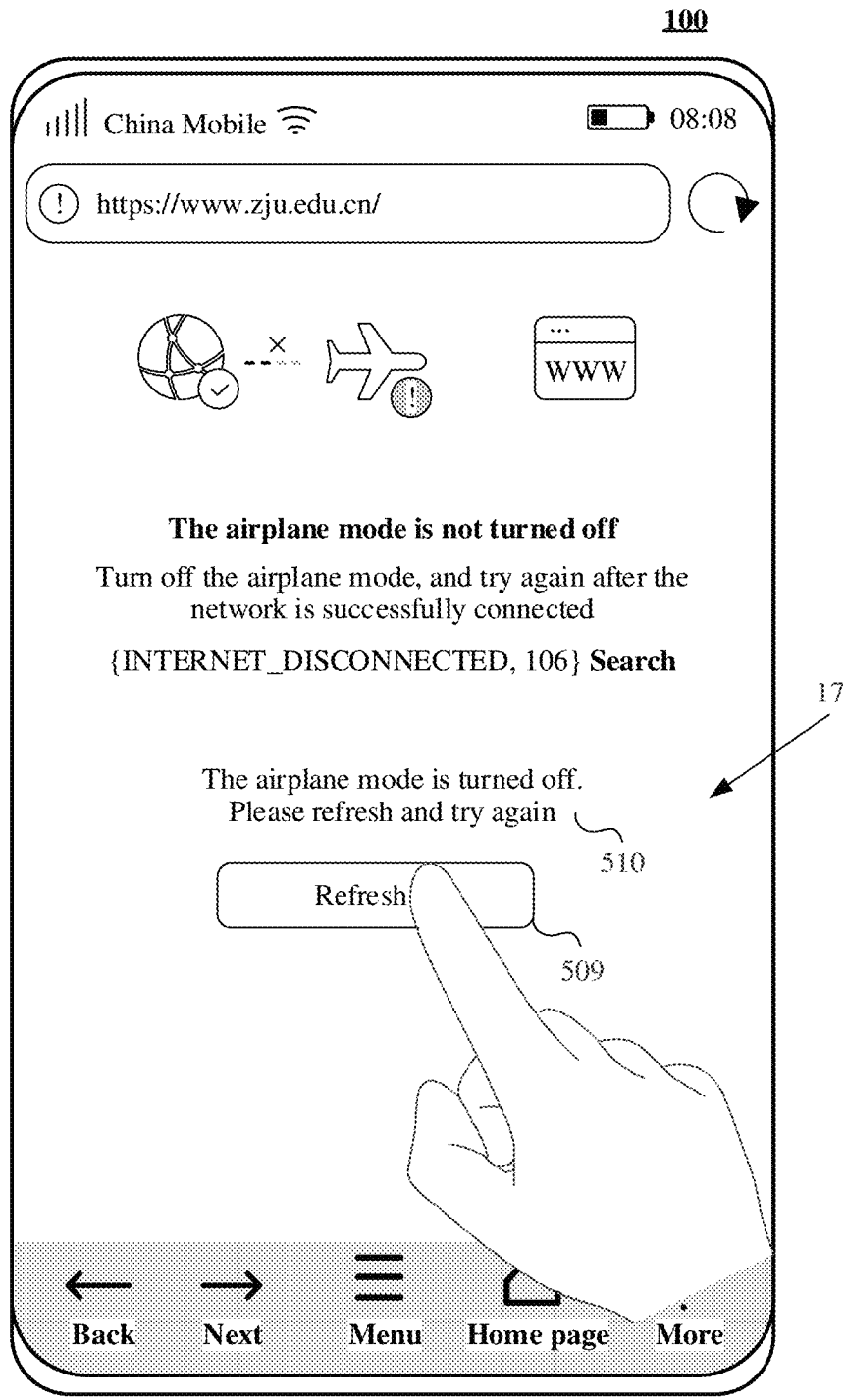

As shown in FIG. 8A, on the error prompt interface 17, a Network icon 502 in an error segment display area is presented as an airplane mode icon, an abnormal state of an indication icon attached to the Network icon 502 indicates a network error, a normal state of an indication icon attached to a Browser icon 501 indicates that the browser is normal, a connection relationship between the Browser icon 501 and the Network icon 502 is presented as an abnormal state, and a connection relationship between the Network icon 502 and a Webpage icon 503 is presented as a null state. In an error description area, an error description 504 may be presented as that "The airplane mode is not turned off", an error auxiliary copywriting 505 may be presented as that "Turn off the airplane mode, and try again after the network is successfully connected", and an error code 506 may be presented as "{INTERNET_DISCONNECTED, 106}". In this case, a search control 507 is used to obtain specific descriptions of the error code 106, and 106 indicates that the terminal device is not connected to the network. A button area may include a button 508 for turning off the airplane mode.

It may be understood that, based on the display status and/or connection relationship of each icon in the error segment display area, a user may intuitively determine that the webpage access exception is caused by the network error. Further, based on the error description 504 and the error code 506 in the error description area, the user may determine that a specific cause of the network error is that the airplane mode is not turned off; and based on the error auxiliary copywriting 505, the user may further determine that the network error can be resolved by turning off the airplane mode. The user touches the button 508 for turning off the airplane mode. In response to a touch operation on the button 508, the terminal device 100 turns off the airplane mode.

In some embodiments, after turning off the airplane mode, the terminal device 100 accesses the first website address again, which includes the following two implementations. Implementation 1: In response to the touch operation on the button 508, the terminal device 100 automatically accesses the first website address again after turning off the airplane mode. Implementation 2: The button area further includes a refresh button 509. After turning off the airplane mode, the terminal device 100 displays prompt information 510 shown in FIG. 8B, where the prompt information 510 prompts that "The airplane mode is turned off. Please refresh and try again". Under guidance of the prompt information, the user may touch the refresh button 509. In response to the input operation on the refresh button 509, the terminal device 100 accesses the first website address again.

In some embodiments, the terminal device 100 is not connected to the network, the airplane mode is not turned on, and the mobile data and the WLAN are not turned on. The terminal device 100 receives the first input operation, and in response to the first input operation, the terminal device 100 accesses the first website address indicated by the first input operation. The terminal device 100 fails to access the first website address. After determining that an error cause of a webpage access exception includes that "The mobile data and Wi-Fi are not turned on", the terminal device 100 displays, based on the error cause, an error prompt interface 18 shown in FIG. 8C or an error prompt interface 19 shown in FIG. 8E.

Figure 8C:
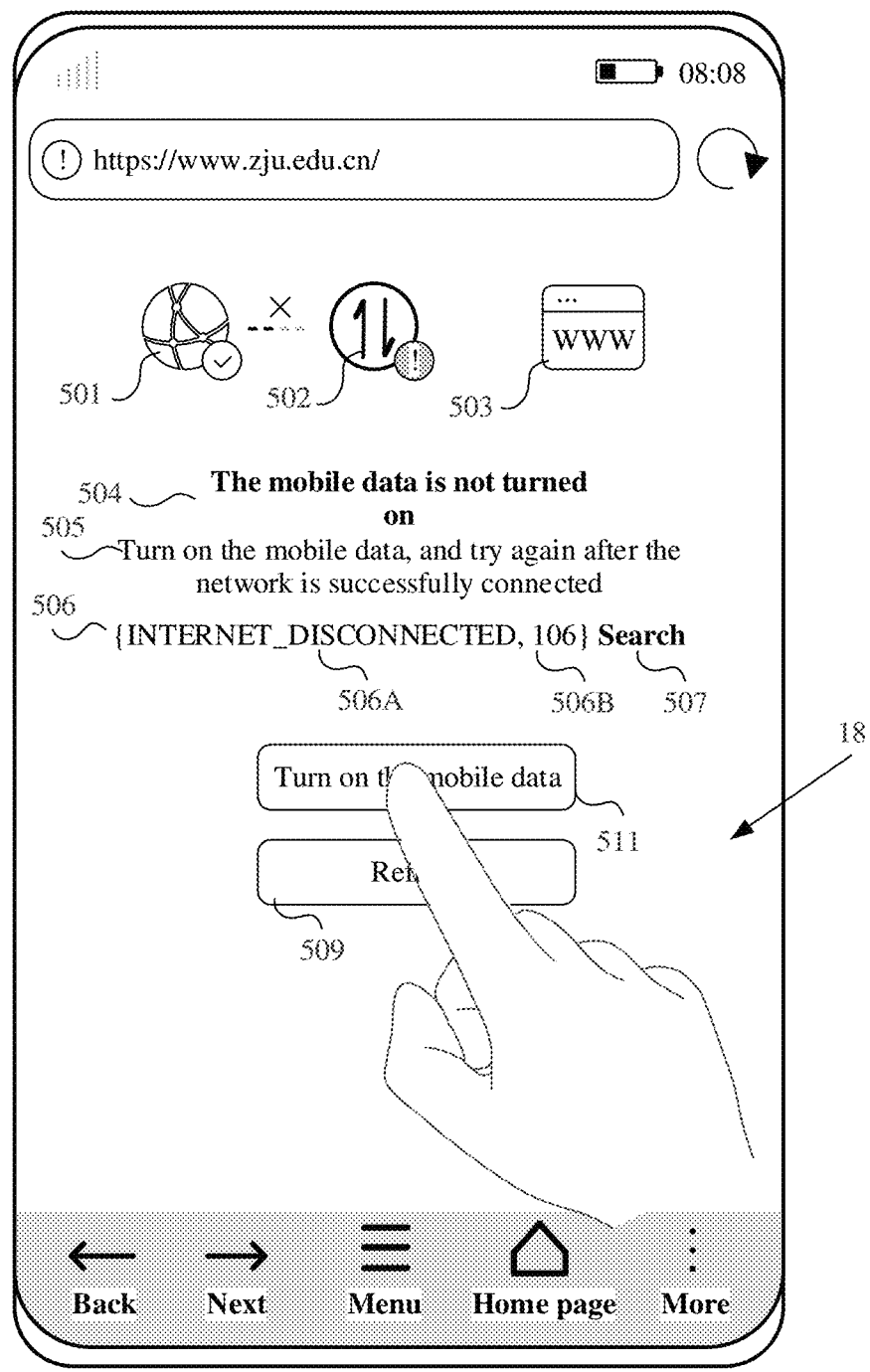
Figure 8D:
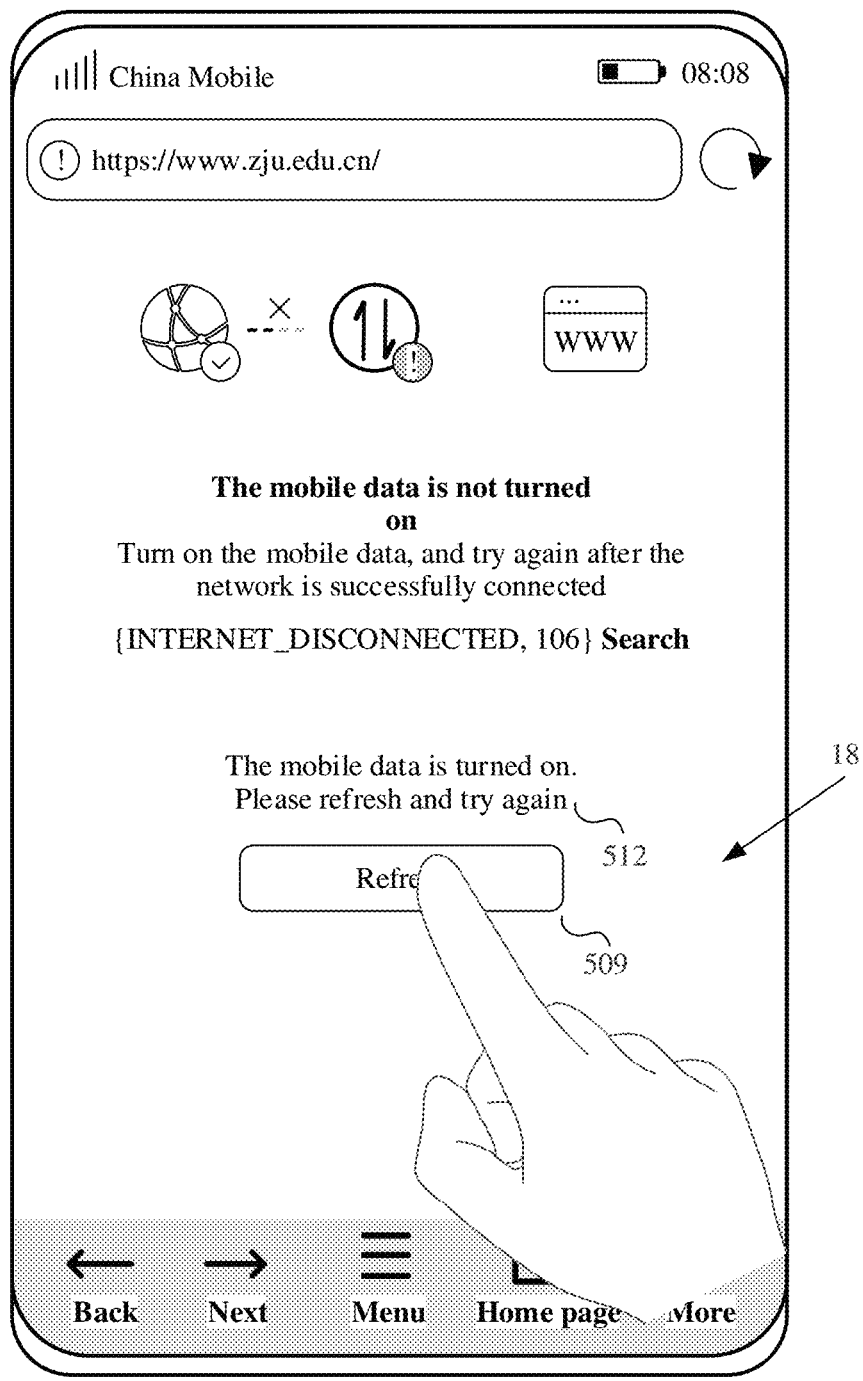

As shown in FIG. 8C, on the error prompt interface 18, different from that on the error prompt interface 17, a Network icon 502 in the error segment display area is presented as a mobile data icon, an error description 504 in an error description area may be presented as that "The mobile data is not turned on", an error auxiliary copywriting 505 may be presented as that "Turn on the mobile data, and try again after the network is successfully connected", and a button area may include a button 511 for turning on the mobile data.

It may be understood that, similar to that on the error prompt interface 17, the user may intuitively determine the error cause of the webpage access exception based on a display status and/or connection relationship of each icon, the error description 504, and the error code 506 on the error prompt interface 18. Further, under guidance of the error auxiliary copywriting 505, the user touches the button 511 for turning on the mobile data; and in response to the touch operation on the button 511, the terminal device 100 turns on the mobile data.

In some embodiments, after turning on the mobile data, the terminal device 100 accesses the first website address again, which includes the following two implementations. Implementation 1: In response to the touch operation on the button 511, the terminal device 100 automatically accesses the first website address again after turning on the mobile data. Implementation 2: The button area further includes a refresh button 509. After turning on the mobile data, the terminal device 100 displays prompt information 512 shown in FIG. 8D, where the prompt information 512 prompts that "The mobile data is turned on. Please refresh and try again". Under guidance of the prompt information 512, the user may touch the refresh button 509. In response to the touch operation on the refresh button 509, the terminal device 100 accesses the first website address again.

Figure 8E:
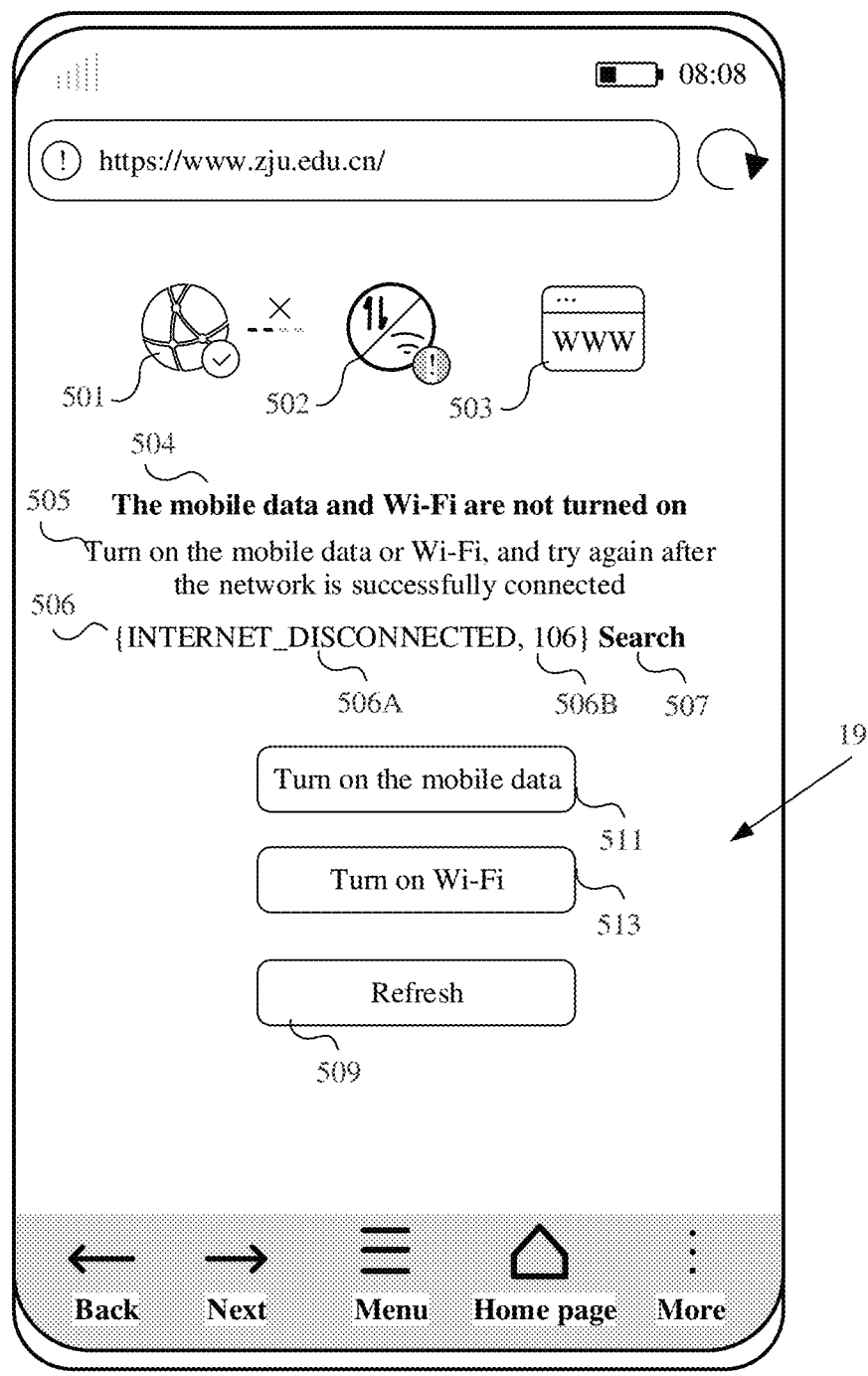
Figure 8F:
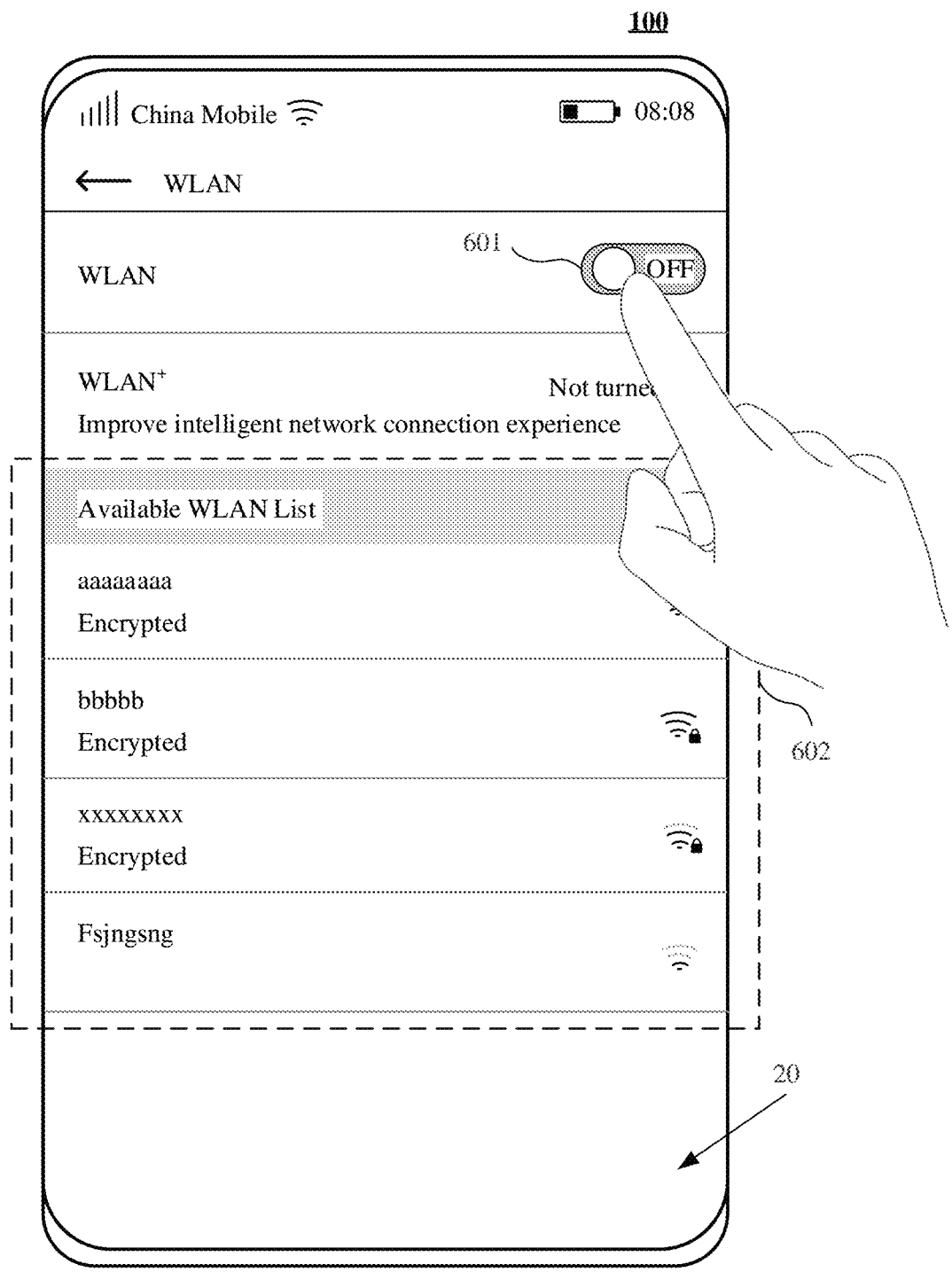

As shown in FIG. 8E, on the error prompt interface 19, different from that on the error prompt interface 18, a Network icon 502 in the error segment display area may be presented as a mixed icon of the mobile data and Wi-Fi, an error description 504 in the error description area may be presented as that "Both the mobile data and Wi-Fi are not turned on", an error auxiliary copywriting 505 may be presented as that "Turn on the mobile data or connect to Wi-Fi, and try again after the network is successfully connected", and a button area may include a button 511 for turning on the mobile data and a button 513 for turning on Wi-Fi.

It may be understood that, under guidance of the error auxiliary copywriting 505, the user touches the button 511 for turning on the mobile data or the button 513 for turning on Wi-Fi. In some embodiments, in response to the touch operation on the button 511, the terminal device 100 may turn on the mobile data. In some embodiments, in response to the touch operation on the button 513, the terminal device 100 may turn on Wi-Fi, and automatically connect to Wi-Fi that is connected by default. In some embodiments, in response to the touch operation on the button 513, the terminal device 100 may display a Wi-Fi setting interface 20 shown in FIG. 8F.

The Wi-Fi setting interface 20 may include a WLAN on/off control 601 and an available WLAN list 602. The available WLAN list 602 includes zero, one, or more Wi-Fi signal sources. The WLAN on/off control 601 is currently in an off state, and the user may switch a state of the on/off control 601 to be an on state. After the WLAN is turned on (Wi-Fi is turned on), the terminal device 100 may automatically connect to a Wi-Fi signal source that is connected by default, or the user may select a Wi-Fi signal source in the WLAN list 602 to perform Wi-Fi connection.

In some embodiments, after turning on the mobile data or Wi-Fi, the terminal device 100 accesses the first website address again, which includes two implementations. For details, refer to the foregoing Implementation 1 and Implementation 2. Details are not described herein again.

In some embodiments, the terminal device 100 is connected to a Wi-Fi signal source 1, and a signal of the Wi-Fi signal source 1 is abnormal (for example, signal quality is very poor). The terminal device 100 receives the first input operation, and in response to the first input operation, the terminal device 100 accesses the first website address indicated by the first input operation. The terminal device 100 fails to access the first website address. After determining that an error cause of a webpage access exception includes that "The Wi-Fi signal is abnormal", the terminal device 100 displays, based on the error cause, an error prompt interface 21 shown in FIG. 8G or FIG. 8I.

Figure 8G:
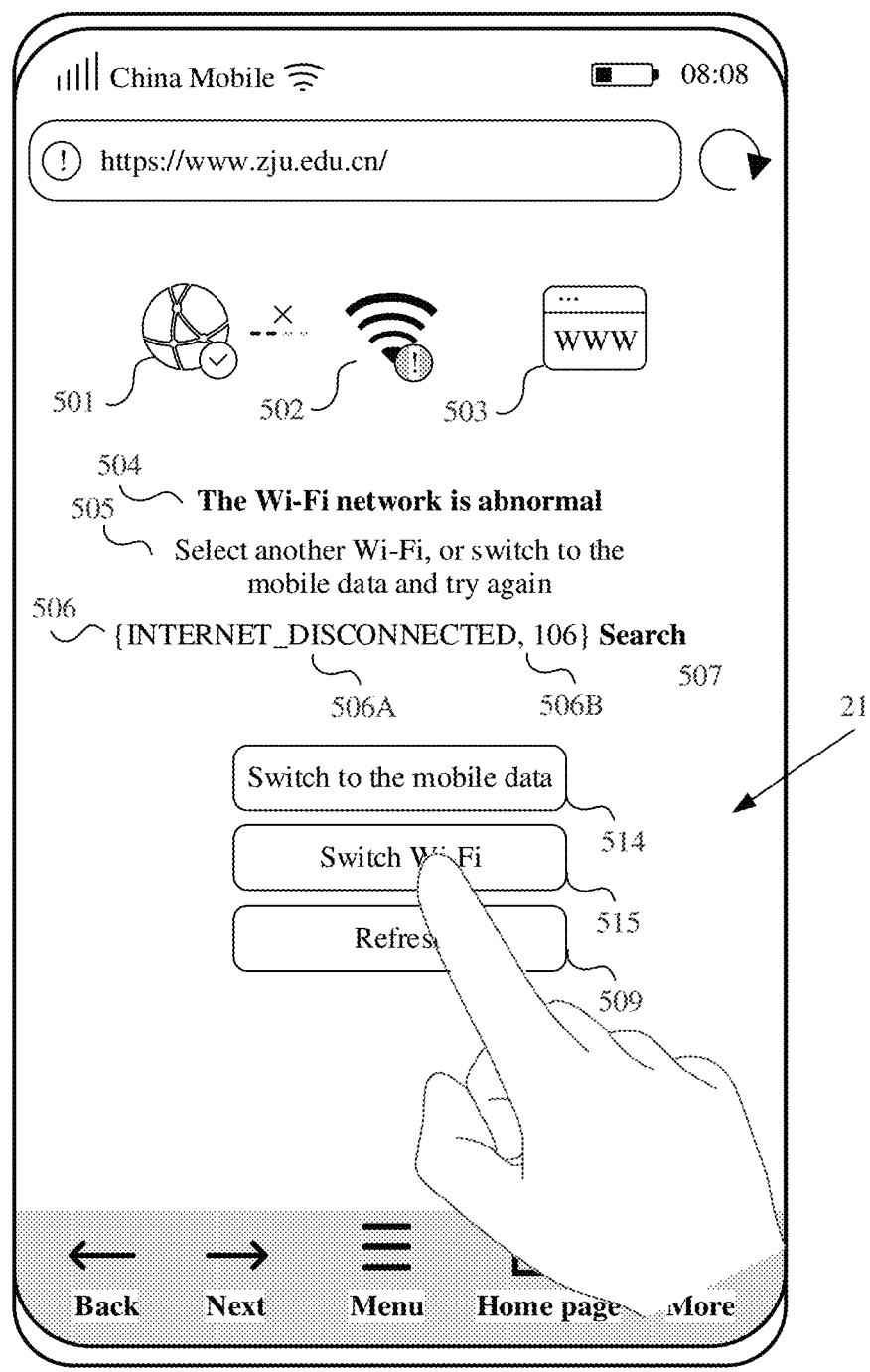
Figure 8H:
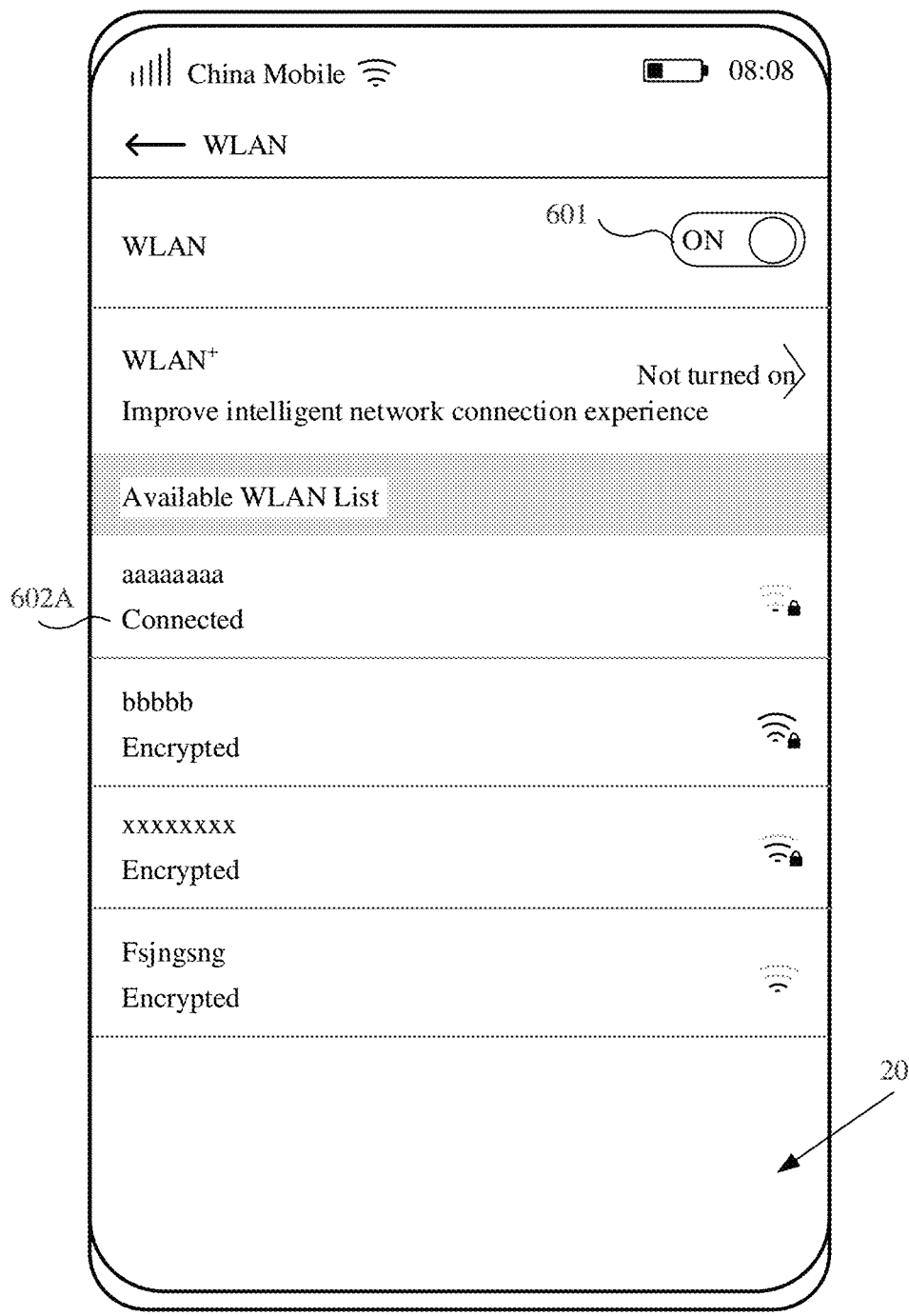
Figure 8I:
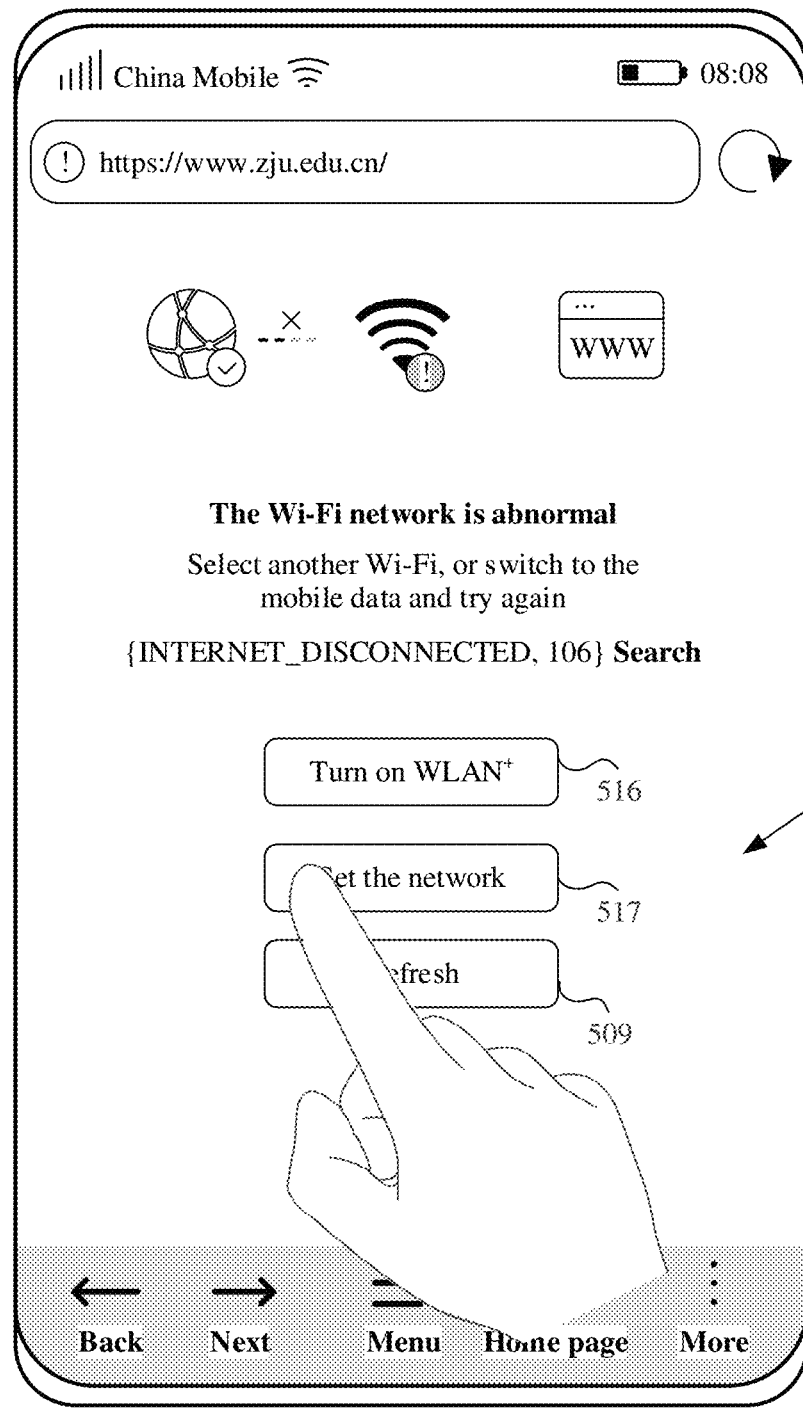

As shown in FIG. 8G and FIG. 8I, on the error prompt interface 21, different from that on the error prompt interface 17, a Network icon 502 in the error segment display area is presented as a Wi-Fi icon, and an error description 504 in the error description area may be presented as that "The Wi-Fi network is abnormal". An error auxiliary copywriting 505 may be presented as that "Select another Wi-Fi, or switch to the mobile data and try again", and a button area may include at least one of a button 514 for switching to the mobile data, a button 515 for switching Wi-Fi, a button 516 for turning on WLAN$^+$, and a button 517 for setting the network.

For example, the terminal device 100 may be connected to the network through the mobile data, and the error prompt interface 21 of the terminal device 100 may include the button 514 for switching to the mobile data and the button 515 for switching Wi-Fi that are shown in FIG. 8G.

It may be understood that, the user may intuitively determine the error cause of the webpage access exception based on a display status and/or connection relationship of each icon, the error description 504, and the error code 506 on the error prompt interface 21. Under guidance of the error auxiliary copywriting 505 shown in FIG. 8G, the user touches the button 514 for switching to the mobile data or the button 515 for switching Wi-Fi. In response to the touch operation on the button 514, the terminal device 100 switches, to the mobile data, the network for transmitting a data service. In response to the touch operation on the button 515, the terminal device 100 displays the Wi-Fi setting interface 20 shown in FIG. 8H. As shown in FIG. 8H, the WLAN on/off control 601 is currently in an on state, and the terminal device 100 is currently connected to a Wi-Fi signal source 602A. Because a signal of the Wi-Fi signal source 602A is abnormal, the user may select to connect to another Wi-Fi signal source in the WLAN list, and after the another Wi-Fi signal source is connected, try to access the first website address again.

For example, the terminal device 100 has a WLAN$^+$ function. After WLAN$^+$ is turned on, the terminal device 100 may automatically turn on the WLAN, and may intelligently select, based on signal quality of the WLAN and signal quality of the mobile data, to transmit the data service through Wi-Fi and/or the mobile data. The error prompt interface 21 of the terminal device 100 may include the button 516 for turning on WLAN$^+$ shown in FIG. 8I, and may further include the button 517 for setting the network.

It may be understood that, under guidance of the error auxiliary copywriting 505 shown in FIG. 8I, the user may touch the button 516 for turning on WLAN$^+$ or the button 517 for setting the network. In response to the touch operation on the button 516, the terminal device 100 turns on WLAN$^+$. After WLAN$^+$ is turned on, when a signal of a currently connected Wi-Fi signal source is abnormal, the terminal device 100 may automatically switch to another Wi-Fi signal source, or automatically switch, to the mobile data, a communication network for transmitting the data service. In response to the touch operation on the button 517, the terminal device 100 displays a network setting interface 22 shown in FIG. 8J. The network setting interface 22 is used to set various parameters of communication modules such as a mobile data network, Wi-Fi, and Bluetooth of the terminal device 100. The user may switch the Wi-Fi signal source on the network setting interface 22, or switch the communication network of the data service to the mobile data network, or may modify parameters of communication modules by using another operation, to ensure normal access to the first website address.

Figure 8J:
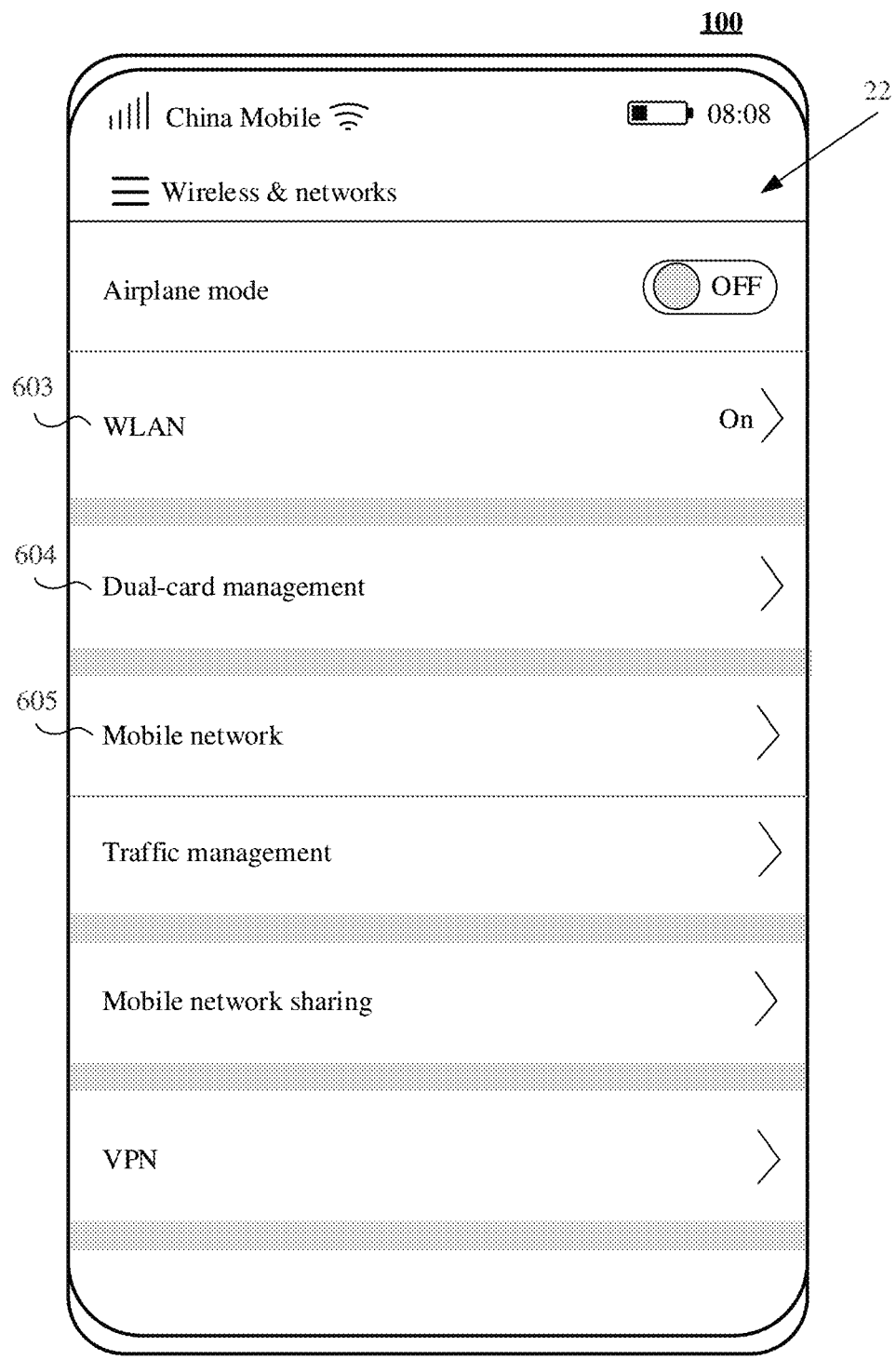

For example, as shown in FIG. 8J, the network setting interface 22 may include a WLAN setting entry 603, a dual-card management entry 604, and a mobile data setting entry 605. In response to an input operation on the WLAN setting entry 603, the terminal device 100 may display the Wi-Fi setting interface 20 shown in FIG. 8H, and the Wi-Fi signal source may be switched on the setting interface 20. In response to an input operation on the dual-card management entry 604, the terminal device 100 may display a SIM card setting interface. When two SIM cards (for example, a SIM card 1 and a SIM card 2) are mounted on the terminal device, on the SIM card setting interface, the mobile data may be switched to mobile data corresponding to the SIM card 1 or mobile data corresponding to the SIM card 2. In response to an input operation on the mobile data setting entry 605, the terminal device 100 may display a mobile data setting interface, and on the mobile data setting interface, the mobile data may be switched to a 3G, 4G, or 5G network.

In some embodiments, after turning on WLAN$^+$, the terminal device 100 accesses the first website address again in two implementations. For details, refer to the foregoing Implementation 1 and Implementation 2. Details are not described herein again.

It should be noted that, this is not limited to turning on Wi-Fi, switching Wi-Fi, turning on the mobile data, and turning on WLAN+ by using the buttons provided in the button area. The user may perform the operations in another manner, which is not specifically limited herein. For example, the user triggers the terminal device 100 to return to a home screen of the terminal device 100, opens a system setting interface of the terminal device 100 by using a setting icon displayed on the home screen, and then opens a network setting interface 22 by using a control on the system setting interface, to find an entry of the foregoing operations on the network setting interface 22, and perform the operations.

As shown in related descriptions in FIG. 8A to FIG. 8I, the error cause corresponding to the network icon includes one or more of the following: The airplane mode is not turned off, Wi-Fi is not turned on, the Wi-Fi network is abnormal, and the mobile data is not turned on. When the error cause is that the airplane mode is not turned off, the display form of the network identifier may be an identifier of the airplane mode, and a first button in the button area may be used to trigger the terminal device to turn off the airplane mode. When the error cause is that Wi-Fi is not turned on, the display form of the network identifier may be an identifier of Wi-Fi, and a first button in the button area may be used to trigger the terminal device to turn on Wi-Fi. When the error cause is that Wi-Fi is not turned on, the display form of the network identifier may be an identifier of Wi-Fi, and a first button in the button area may be used to trigger the terminal device to switch the network to the mobile data, switch the Wi-Fi signal source, turn on WLAN+, or display the network setting interface. When the error cause is that the mobile data is not turned on, the display form of the network identifier may be an identifier of the mobile data, and a first button in the button area may be used to trigger the terminal device to turn on the mobile data.

For example, FIG. 9A to FIG. 9E show some error prompt interfaces caused by webpage errors.

In some embodiments, a first website address entered by the user is an incorrect website address. The terminal device 100 receives a first input operation, and in response to the first input operation, the terminal device 100 accesses the first website address indicated by the first input operation. The terminal device 100 fails to access the first website address. After determining that an error cause of a webpage access exception includes that "The website address is incorrect", the terminal device 100 displays, based on the error cause, an error prompt interface 23 shown in FIG. 9A. That the first website address is incorrect may mean that the first website address cannot be successfully parsed, an IP address corresponding to the first website address cannot be obtained, or the like.

Figure 9A:
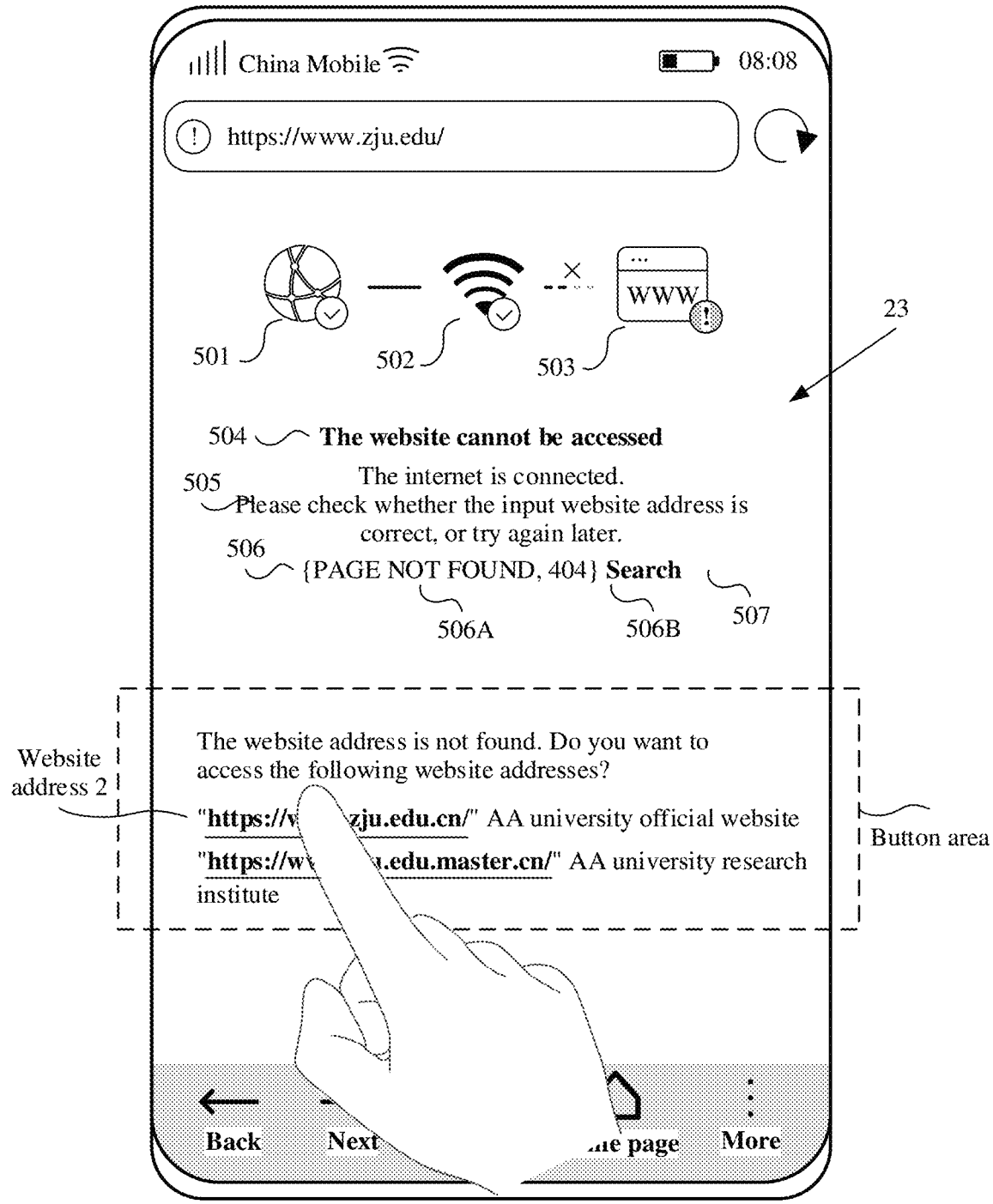
FIG. 9A to FIG. 9E show user interfaces of webpage access exceptions according to an embodiment of this application.

As shown in FIG. 9A, an indication icon of a Browser icon 501 in an error segment display area indicates that the browser is normal, an indication icon of a Network icon 502 indicates that the network is normal, an indication icon of a Webpage icon 503 indicates a webpage access exception, a connection relationship between the Browser icon 501 and the Network icon 502 is presented as a normal state, and a connection relationship between the Network icon 502 and the Webpage icon 503 is presented as an abnormal state. An error description 504 in an error description area may be presented as that "The website cannot be accessed", an error auxiliary copywriting 505 may be presented as that "The internet is connected. Please check whether the input website address is correct, or try again later", and an error code 506 may be presented as "{PAGE NOT FOUND, 404}". In this case, a search control 507 is configured to obtain specific descriptions of an error code 106, and 404 indicates that a webpage corresponding to the first website address is not found. A button area may include at least one website address link associated with the first website address, for example, a website address link of a website address 2.

It may be understood that, based on the display status and/or connection relationship of each icon in the error segment display area, the user may intuitively determine that the webpage access exception is caused by the webpage error. Further, based on the error description 504 and the error code 506 in the error description area, the user may determine that a specific cause of the network error may be that the website address is incorrect; based on the error auxiliary copywriting 505, the user may determine whether the website address is correct; and when it is determined that the first website address is incorrect and the button area includes a correct website address (for example, the website address 2) that the user intends to access, the user may select to access the website address. The website address link of the website address 2 may receive an input operation of the user; and in response to the input operation, the terminal device 100 accesses the website address 2.

As shown in FIG. 9A, "https://www.zju.edu/" entered by the user is an incorrect website address, and the terminal device 100 may obtain, based on the incorrect website address, at least one website address with a highest association degree to the incorrect website address, and display the at least one website address in the button area.

In some embodiments, as shown in FIG. 5B, the search engine currently corresponding to the search bar 301 is the Google search engine, and the first input operation includes inputting the first keyword in the search bar 301. In response to the first input operation, the terminal device 100 accesses a first website address (a website address of the Google search engine) indicated by the first input operation; the terminal device detects that the Google search engine is a foreign search engine, and the terminal device determines that an error cause of the webpage access exception includes that "The search engine cannot be used"; and based on the error cause, the terminal device 100 displays an error prompt interface 24 shown in FIG. 9B.

As shown in FIG. 9A, on the error prompt interface 24, different from that on the error prompt interface 23, an error description 504 in an error description area may be presented as that "The Google search engine cannot be used", an error auxiliary copywriting 505 may be presented as that "Switch to another search engine, or try again later", and an error code 506 may be presented as "{ERR_CONNECTION_REFUSED; 102}". In this case, a search control 507 is used to obtain specific descriptions of an error code 102, and 102 indicates that the access is rejected. A button area may include a button 520 for switching the search engine.

Figure 9B:
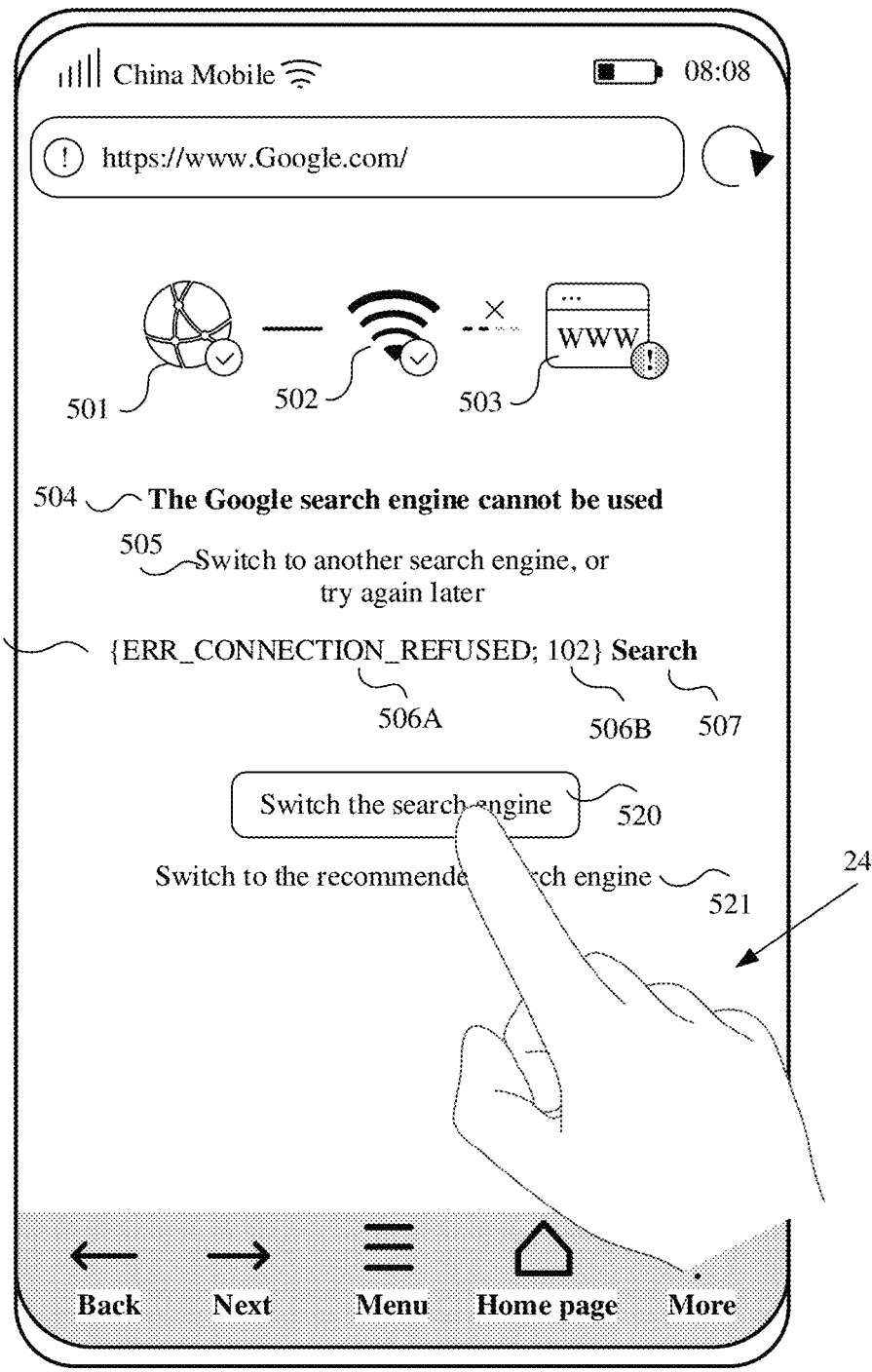
Figure 9C:
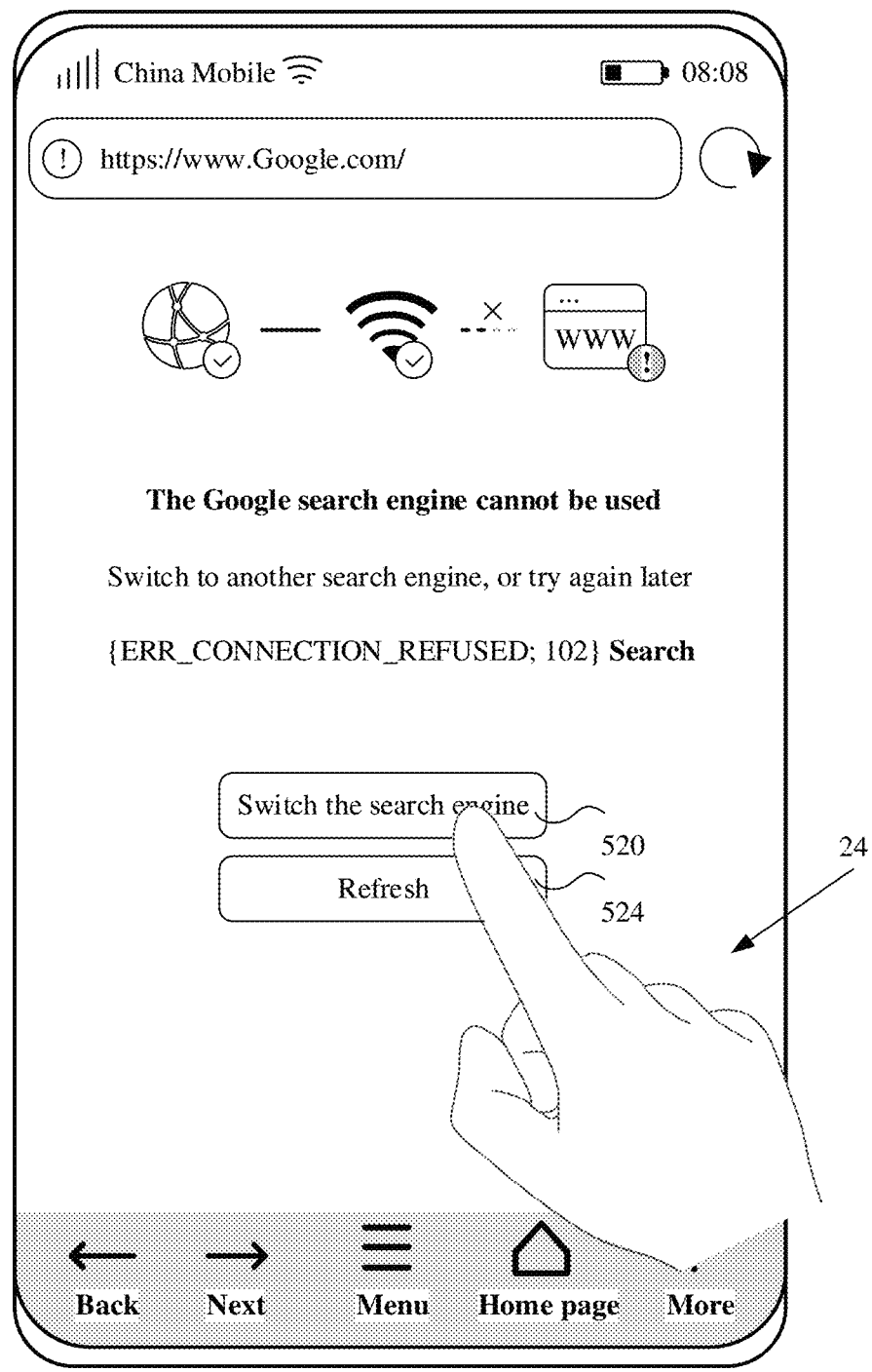
Figure 9D:
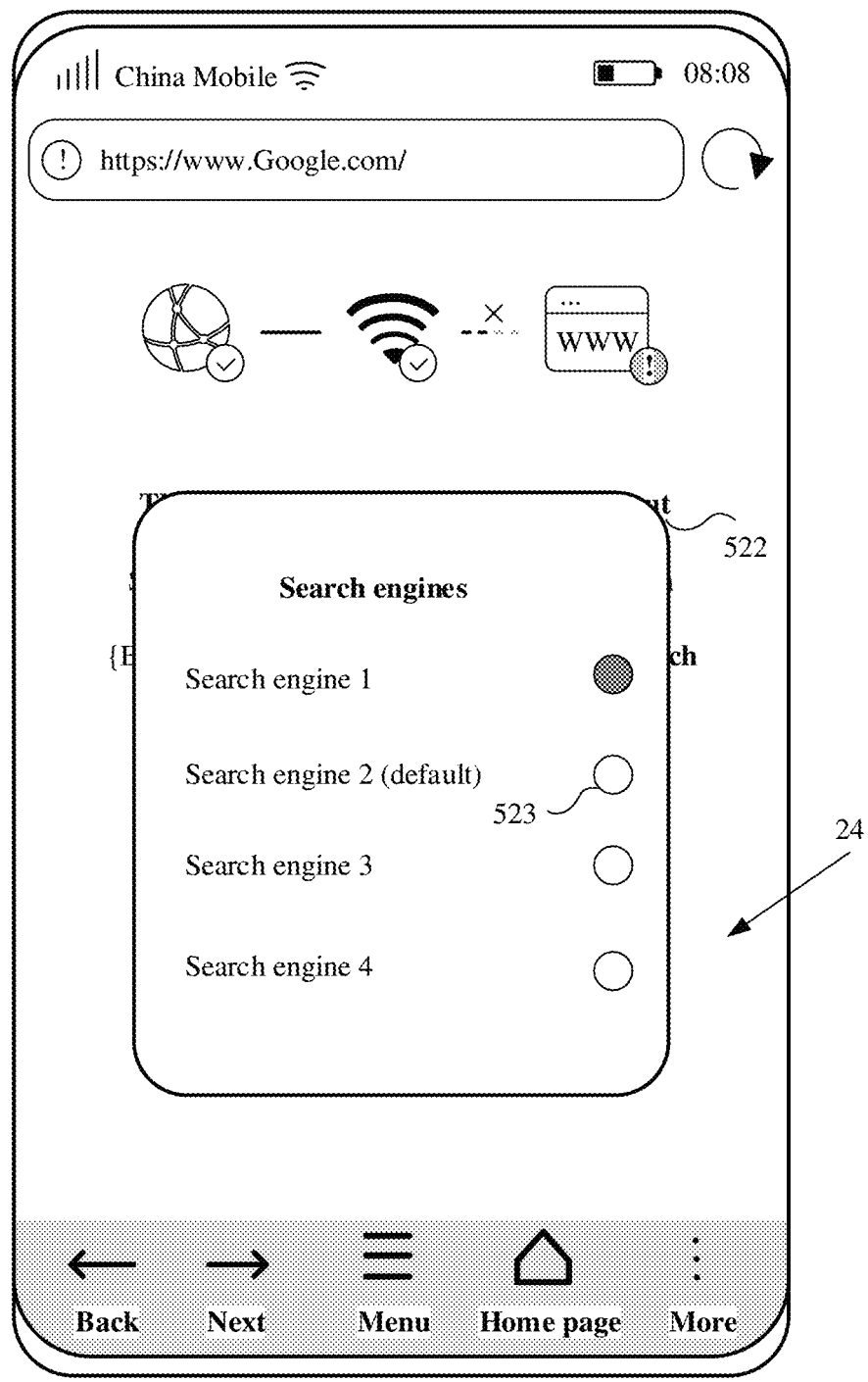

It may be understood that, under guidance of the error auxiliary copywriting 505 shown in FIG. 9B, the user may switch the search engine by using the button 520. In some embodiments, in response to an input operation on the button 520, the terminal device 100 may switch the search engine to a recommended search engine. The recommended search engine may be a default search engine of the Browser app, or may be an optimal search engine determined by the terminal device 100 based on a response speed of each search engine. The error prompt interface 24 may further include prompt information 521 shown in FIG. 9B, where the prompt information 521 may prompt the user that the button 520 is for switching to the recommended search engine. In some embodiments, as shown in FIG. 9C and FIG. 9D, in response to the input operation on the button 520, the terminal device 100 may display a search engine selection box 522. The search engine selection box 522 may include selection controls of at least two search engines, for example, a selection control 523 of a search engine 2. The selection control 523 may receive an input operation of the user, and in response to the input operation, the terminal device 100 switches the search engine of the search bar 301 to the search engine 2, and stops displaying the search engine selection box 522.

In an implementation, after switching the search engine, the terminal device 100 automatically searches the first keyword by using a switched search engine. In another implementation, the button area further includes a refresh button 524. After the search engine is switched, in response to a touch operation on the refresh button 524, the terminal device 100 searches the first keyword by using a switched search engine.

In some embodiments, the terminal device 100 receives the first input operation, and in response to the first input operation, the terminal device 100 accesses the first website address indicated by the first input operation. The terminal device 100 fails to access the first website address. When the terminal device 100 determines that an error cause of the webpage access exception includes that a response speed of a service server 200 indicated by the first website address is excessively slow, the terminal device 100 displays an error prompt interface 35 shown in FIG. 9E.

Figure 9E:
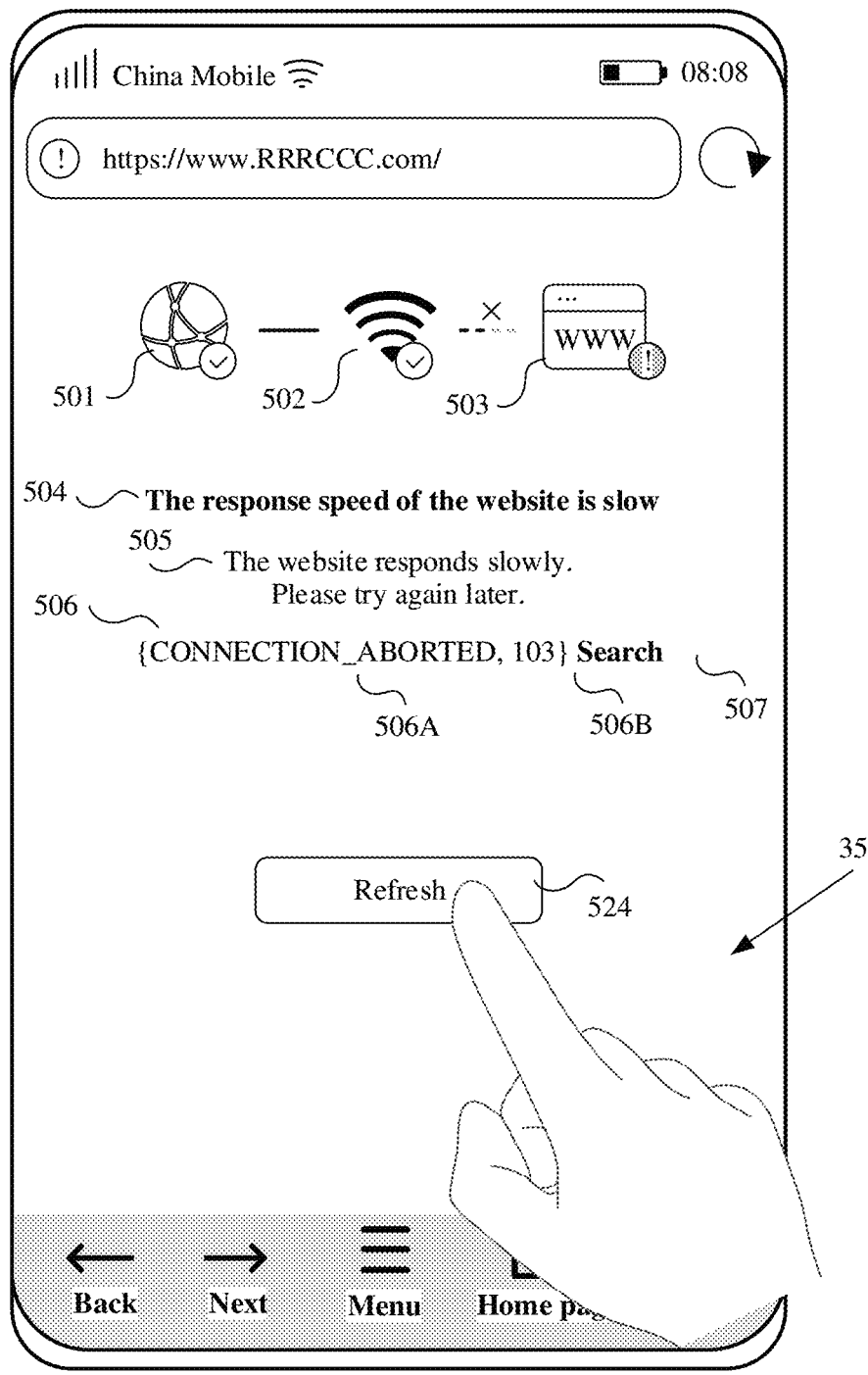

As shown in FIG. 9E, on the error prompt interface 35, different from that on the error prompt interface 23, an error description 504 in an error description area may be presented as that "The response speed of the website is slowly", an error auxiliary copywriting 505 may be presented as that "The website responds slowly. Please try again later", an error code 506 may be presented as "{CONNECTION-_ABORTED, 103}", and a button area may include a refresh button 524. 103 indicates that there is an unknown error on the side of the webpage.

It may be understood that, some service servers are heavily loaded, and an average response speed is slow. Consequently, there is a specific access failure rate of accessing the service servers. Under guidance of the error auxiliary copywriting 505 shown in FIG. 9E, the user may try to access the first website address again by using the refresh button 524.

As shown in related descriptions in FIG. 9A to FIG. 9E, the error cause corresponding to the webpage icon may include one or more of the following: A website address is incorrect, a search engine is unavailable, and a website responds slowly. When the error cause is that a website address is incorrect, a first button in the button area may be used to trigger the terminal device to access a second website address, where the second website address is a correct website address determined based on the website address of the first webpage. When the error cause is that a search engine is unavailable, the first button in the button area may be used to trigger the terminal device to switch the search engine. When the error cause is that a website responds slowly, the first button in the button area may be used to trigger the terminal device to access the first webpage again.

In this embodiment of this application, when the terminal device 100 determines that there may be a network connectivity problem, the terminal device 100 may guide the user to perform a network connectivity test.

For example, FIG. 10A to FIG. 10E show some error prompt interfaces related to the network connectivity test.

It should be noted that when the terminal device 100 is connected to the network, there may still be a network connectivity problem. For example, the terminal device 100 is connected to the network through a Wi-Fi network, and the terminal device 100 may receive a Wi-Fi signal with good signal quality sent by a Wi-Fi access point device (for example, a router), and a Wi-Fi icon in a status bar on a display interface of the terminal device 100 displays a full-strength Wi-Fi signal. However, when the Wi-Fi access point device has a problem like a broadband fault, a setting error, and/or a device fault, the terminal device 100 has a network connectivity problem, that is, the terminal device 100 cannot access a webpage/website address through the current Wi-Fi network. This is not limited to the access point device, and the network connectivity problem may be caused by another cause, which is not specifically limited herein.

In some embodiments, the terminal device 100 receives a first input operation, and in response to the first input operation, the terminal device 100 accesses a first website address indicated by the first input operation. The terminal device 100 fails to access the first website address. When the terminal device 100 determines that a browser is normal, a network-related setting is normal, and there is an uncertain error cause between the network and the webpage, the terminal device 100 may display an error prompt interface 25 shown in FIG. 10A.

Figure 10A:
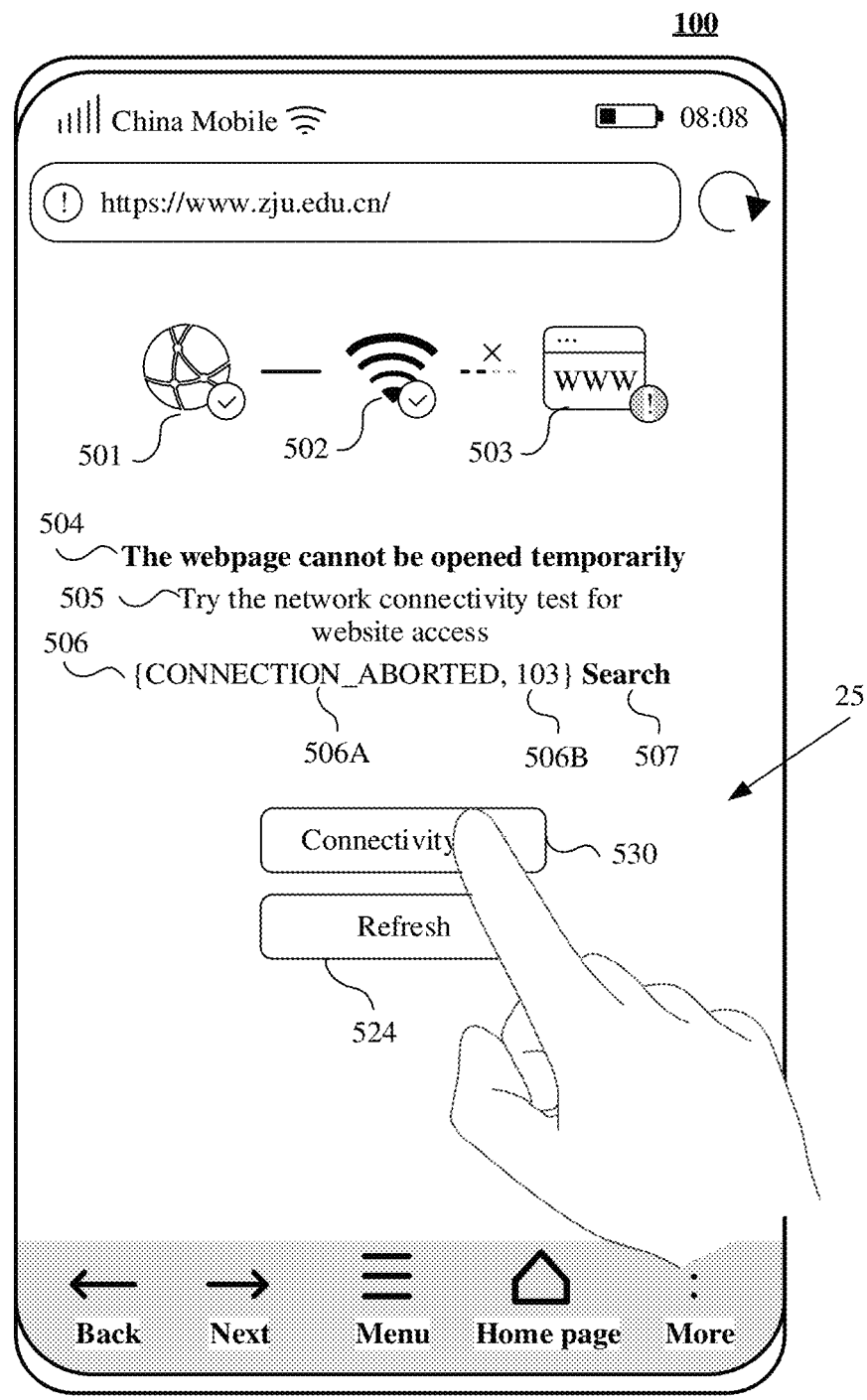
FIG. 10A to FIG. 10E show user interfaces of webpage access exceptions according to an embodiment of this application.

As shown in FIG. 10A, on the error prompt interface 25, different from that on the error prompt interface 23, an error description 504 in an error description area may be presented as that "The webpage cannot be opened temporarily", an error auxiliary copywriting 505 may be presented as that "Try a network connectivity test for website access", and an error code 506 may be presented as "{CONNECTION-_ABORTED, 103}"; and a button area may include a connectivity test button 530.

It may be understood that, under guidance of the error auxiliary copywriting 505, the user may test network connectivity by using the connectivity test button 530, to further determine an error cause of a webpage access exception. The connectivity test button 530 may receive an input operation of the user, and in response to the input operation, the terminal device 100 accesses a preset website address of a preset XX website. The preset website address and the first website address are different website addresses.

Figure 10B:
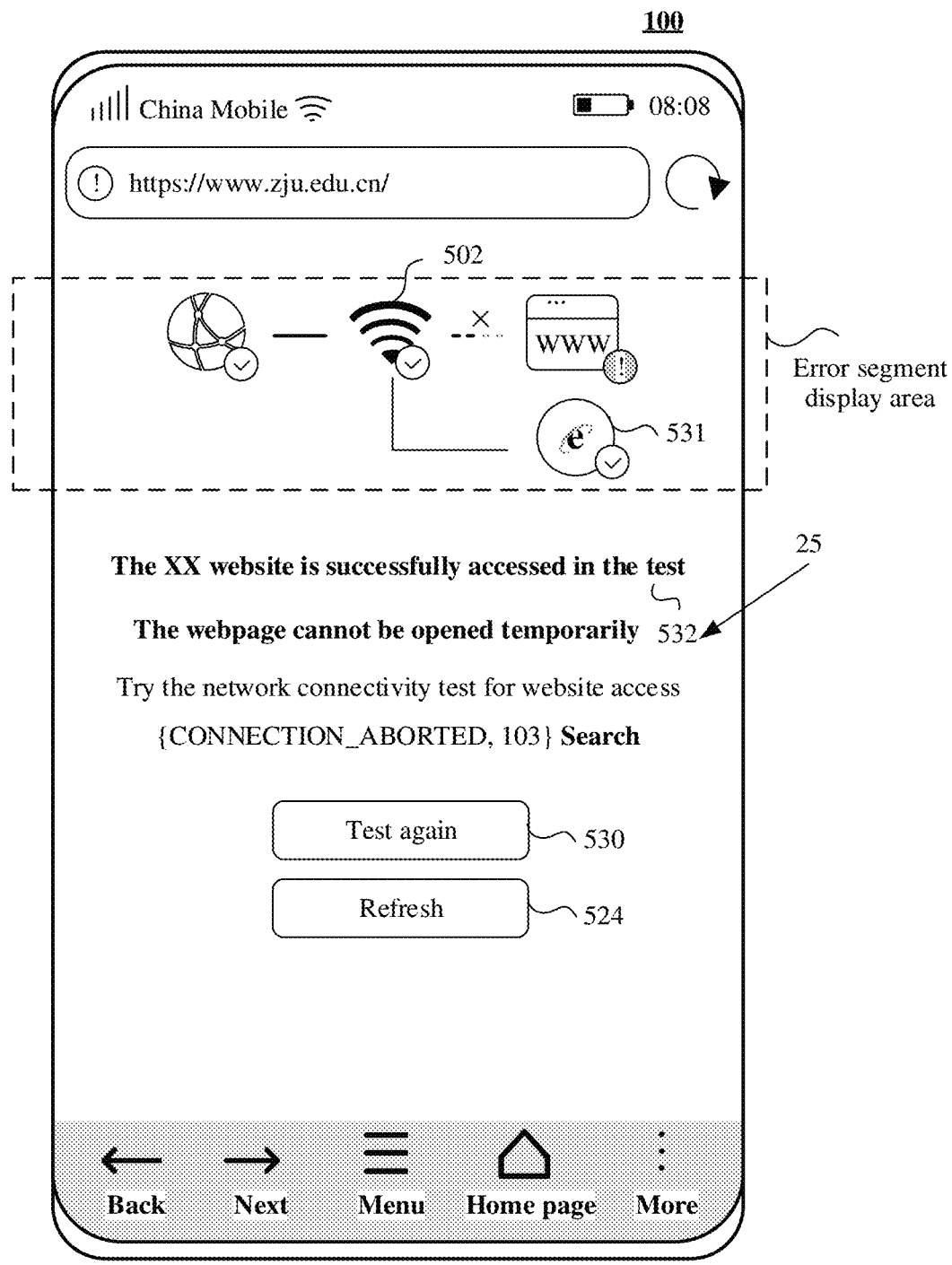

As shown in FIG. 10B, when successfully accessing the preset website address (a connection may be established to a service server indicated by the preset website address, and a webpage resource sent by the service server is obtained), the terminal device 100 displays a test website identifier 531 and prompt information 532 in an error segment area, where an indication icon of the test website identifier 531 indicates that the website is successfully accessed in the test, a connection relationship between the test website identifier 531 and a Network icon 502 is presented as a normal state, and the prompt information 532 prompts that the XX website is successfully accessed in the test. Through the network connectivity test, it is verified that the terminal device 100 can access another website. Therefore, a webpage access exception caused by the network connectivity is excluded. The user may refresh a page by using a refresh button 524 on the error prompt interface 25, that is, try to access the first website address again. In some embodiments, when the preset website address is successfully accessed, a displayed text of a connectivity test button 530 changes to "Test again". The user may test the network connectivity of the terminal device 100 again by using the connectivity test button 530. In this embodiment of this application, the test website identifier may be presented in a form of icon and/or character.

Figure 10C:
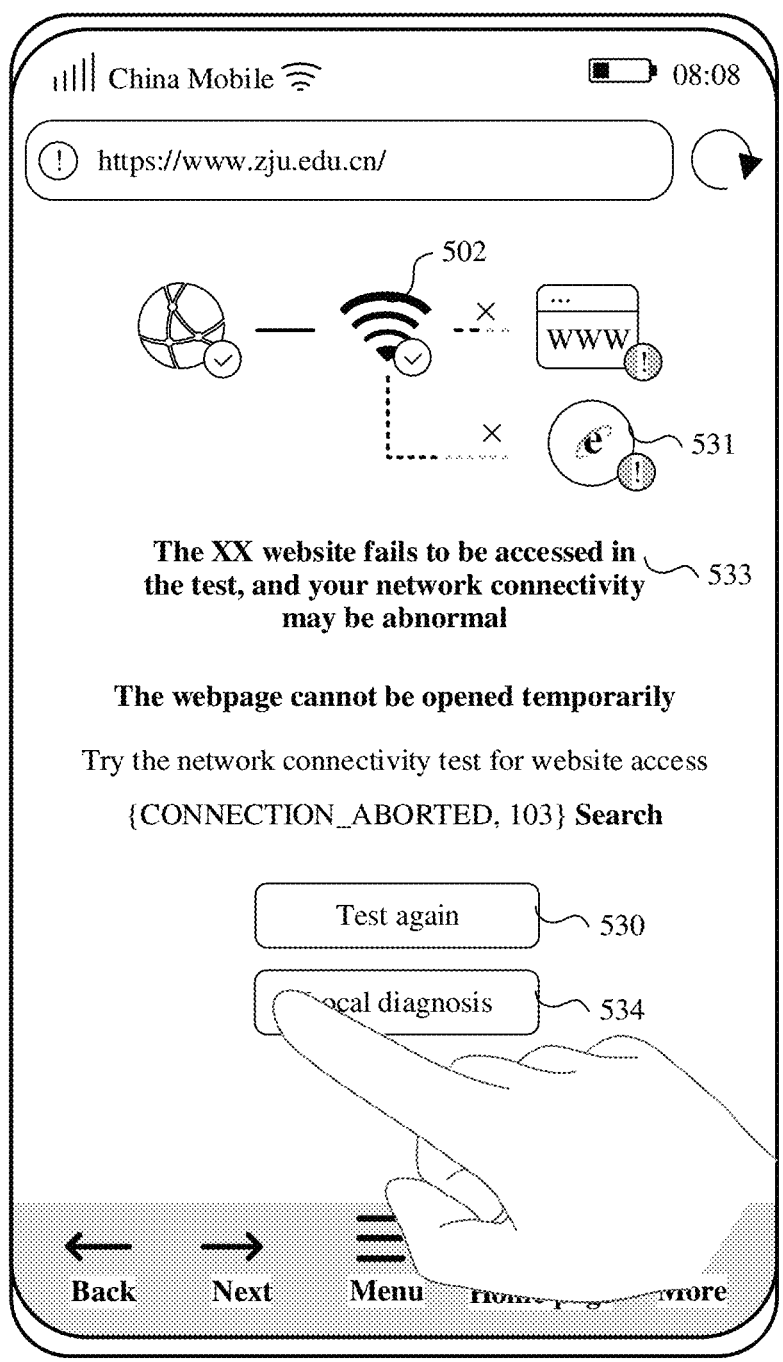
Figure 10D:
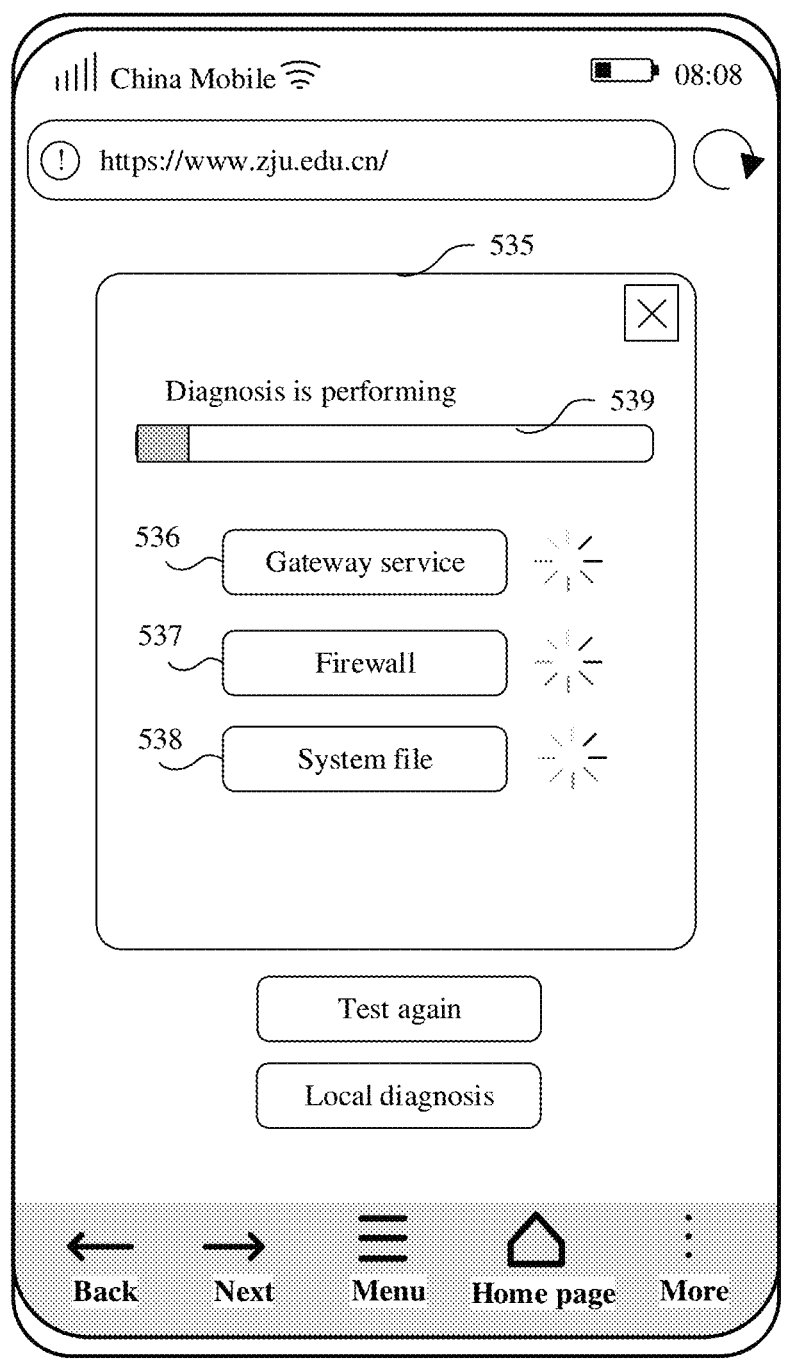

As shown in FIG. 10C, when the preset website address fails to be accessed, the terminal device 100 displays a test website identifier 531 and prompt information 533, where an indication icon of the test website identifier 531 indicates that the website fails to be accessed in the test, a connection relationship between the test website identifier 531 and a Network icon 502 is presented as an abnormal state, and the prompt information 533 prompts that "The XX website fails to be accessed in the test, and your network connectivity may be abnormal". Through the network connectivity test, it is verified that the terminal device 100 cannot access another website. Therefore, a webpage access exception may be caused by the network connectivity.

First prompt information in embodiments of this application may be the prompt information 532, and second prompt information may be the prompt information 533.

Figure 10E:
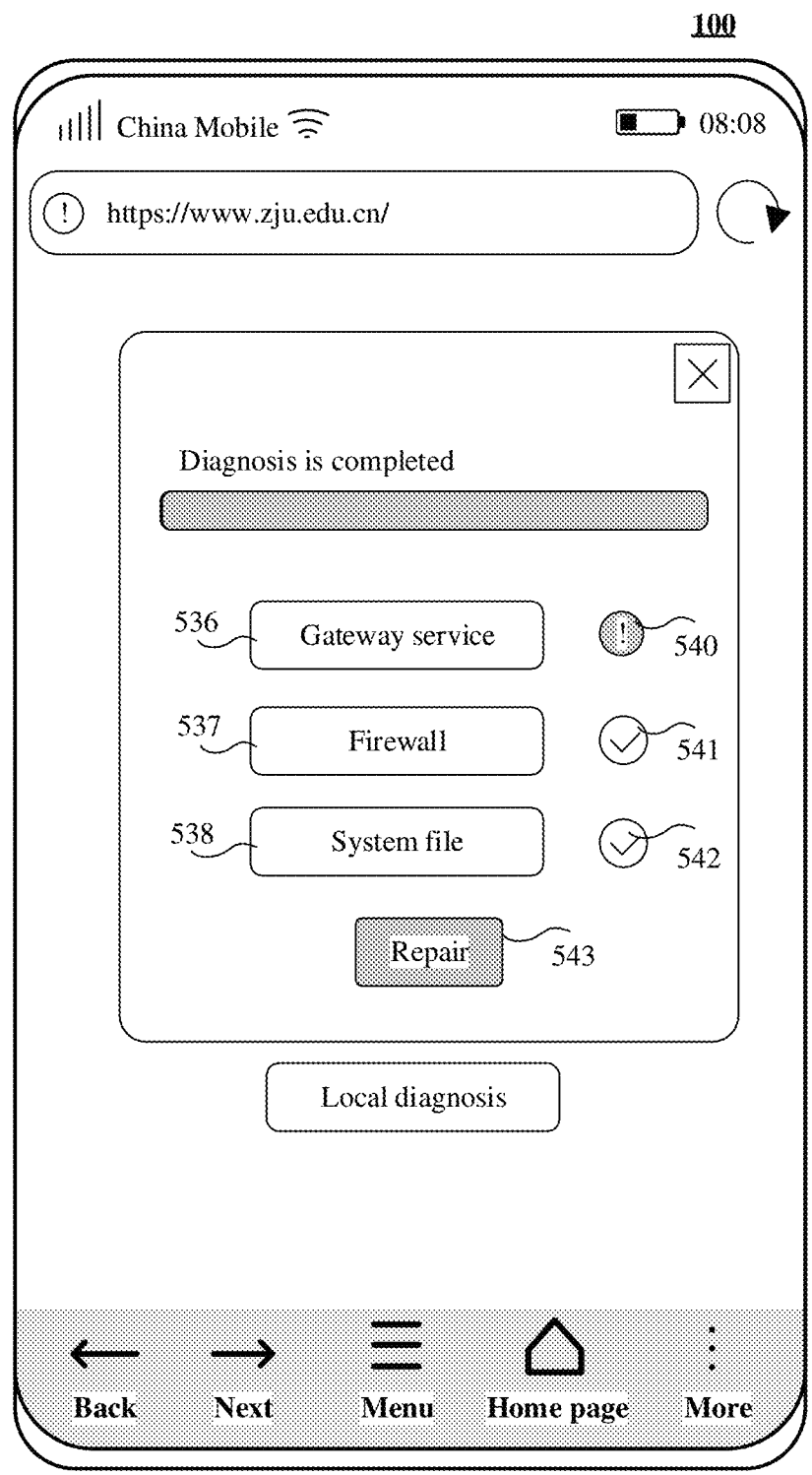

In some embodiments, as shown in FIG. 10C, when the preset website address fails to be accessed, a displayed text of a connectivity test button 530 changes to "Test again". The user may test the network connectivity of the terminal device 100 again by using the connectivity test button 530. In some embodiments, when failing to access the preset website address, the terminal device 100 may further display a local diagnosis button 534 shown in FIG. 10C. The local diagnosis button 534 may receive an input operation of the user, and in response to the input operation, the terminal device 100 displays a diagnosis box 535 shown in FIG. 10D. The diagnosis box 535 includes at least one module that may cause a webpage access exception, for example, a gateway service 536, a firewall 537, and a system file 538. The diagnosis box 535 may further include a diagnosis progress bar 539 for the at least one module. After diagnosis for a module in the diagnosis box 535 is completed, the terminal device 100 may display a diagnosis result of the module in the diagnosis box 535. For example, as shown in FIG. 10E, a diagnosis result 540 of the gateway service 536 shows that the gateway service is abnormal, a diagnosis result 541 of the firewall 537 shows that the firewall is normal, and a diagnosis result 542 of the system file 538 shows that the system file is normal. After the terminal device 100 completes diagnosis for all the at least one module, if there is a module (for example, a gateway service) whose diagnosis result is abnormal in the at least one module, the terminal device 100 displays a repair button 543 in the diagnosis box 535. The repair button 543 may receive an input operation of the user, and in response to the input operation, the terminal device 100 repairs the module whose diagnosis result is abnormal. It may be understood that, after repair is completed, the user may refresh the page, and try to access the first website address again.

It may be understood that, when the terminal device 100 obtains, through diagnosis, that the browser is normal, and the device is connected to the network, and infers that there may be a network connectivity problem or an error on the side of webpage, an abnormal state of a Webpage icon 503 and an abnormal state of a connection relationship between the icon and a Network icon 502 indicate that a webpage error may exist, and the abnormal state of the connection relationship between the Webpage icon 503 and the Network icon 502 may also indicate that a network connectivity problem may exist. In this embodiment of this application, for ease of description and segment display of the error segment area, the network connectivity problem may belong to a webpage error. In addition, when inferring that there may be a network connectivity problem, the terminal device 100 may guide the user to perform the network connectivity test.

Figure 11:
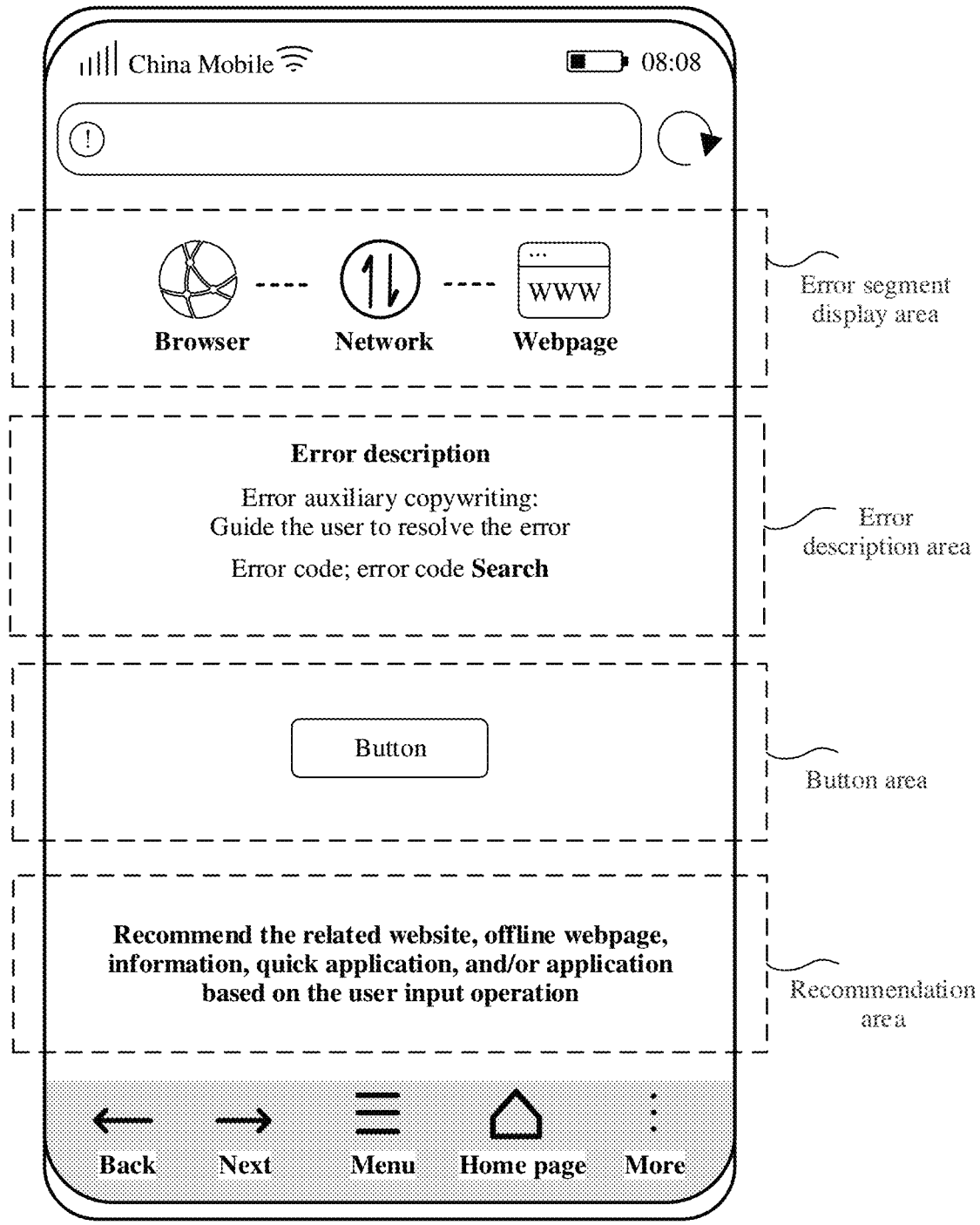
FIG. 11 shows an error prompt interface including recommended content according to an embodiment of this application.

In some embodiments, as shown in FIG. 11, the error prompt interface displayed by the terminal device 100 may further include a recommendation area. The recommendation area is used to display recommended content associated with a website address or a keyword indicated by the first input operation of the user. The recommended content may be a website address link, a search result, a website, an offline webpage, information, a quick application, and/or an application.

For example, FIG. 12A to FIG. 12G show some error prompt interfaces including the recommended content.

In some embodiments, when failing to access a first website address, the terminal device 100 may further display, in the recommendation area of the error prompt interface, at least one website address associated with the first website address.

Figure 12A:
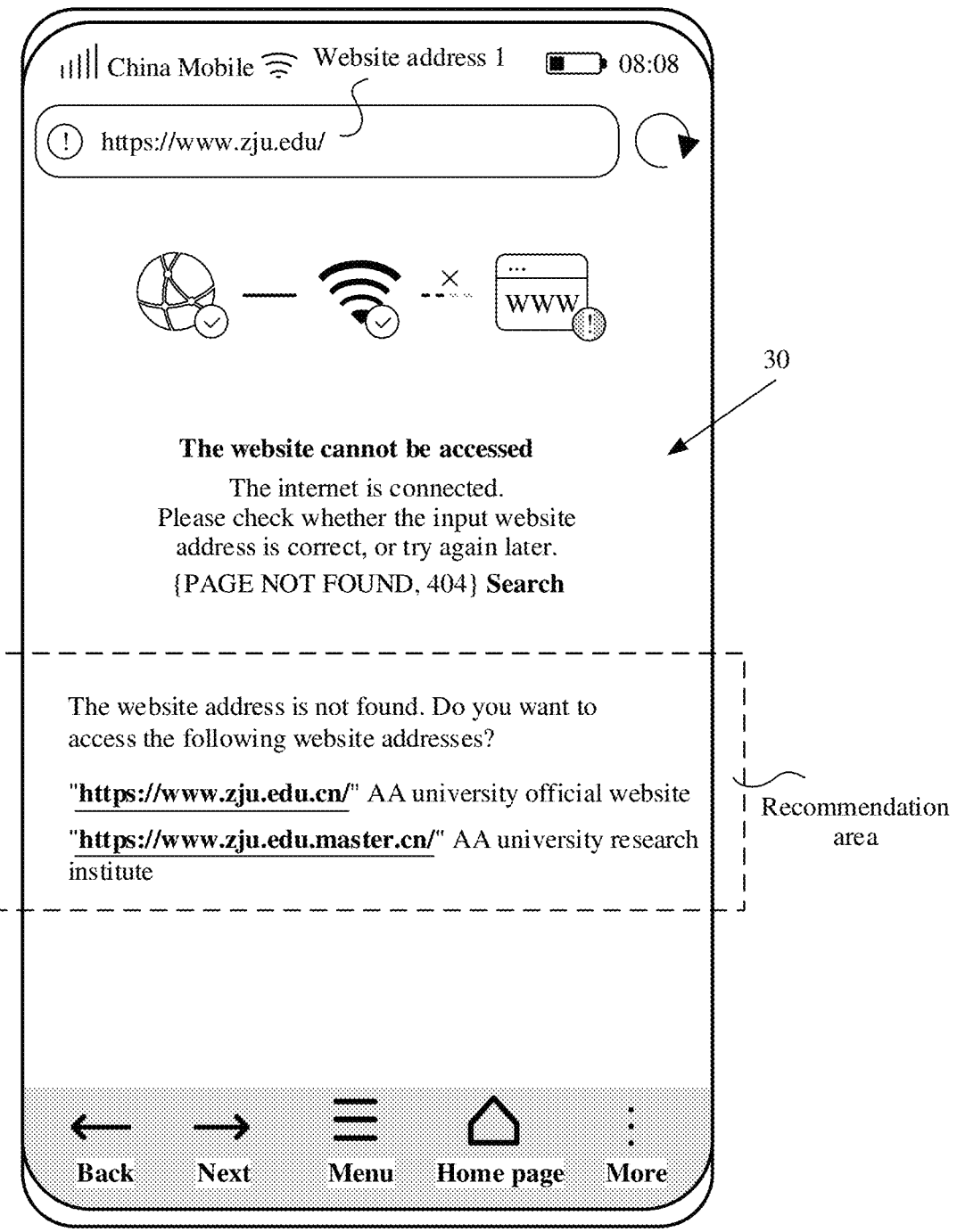
FIG. 12A to FIG. 12G show user interfaces of webpage access exceptions according to an embodiment of this application.

In some embodiments, the first website address indicated by a first input operation is an incorrect website address. When the terminal device 100 fails to access the first website address, and determines that an error cause of a webpage access exception includes that the website address is incorrect, the terminal device 100 obtains the at least one website address associated with the first website address, and displays the at least one website address in a recommendation area of an error prompt interface 30. The at least one website address may be a website address cached locally by the terminal device 100, or may be a website address obtained by requesting from a recommendation server 400, or may be a website address obtained by searching online by using a current search engine of the browser. For example, as shown in FIG. 12A, the first website address is an incorrect website address "https://www.zju.edu/", and two website addresses that are most associated with the website address and that are obtained by the terminal device 100 are "https://www.zju.edu.cn/" and "https://www.zju.edu.master.cn/".

Figure 12B:
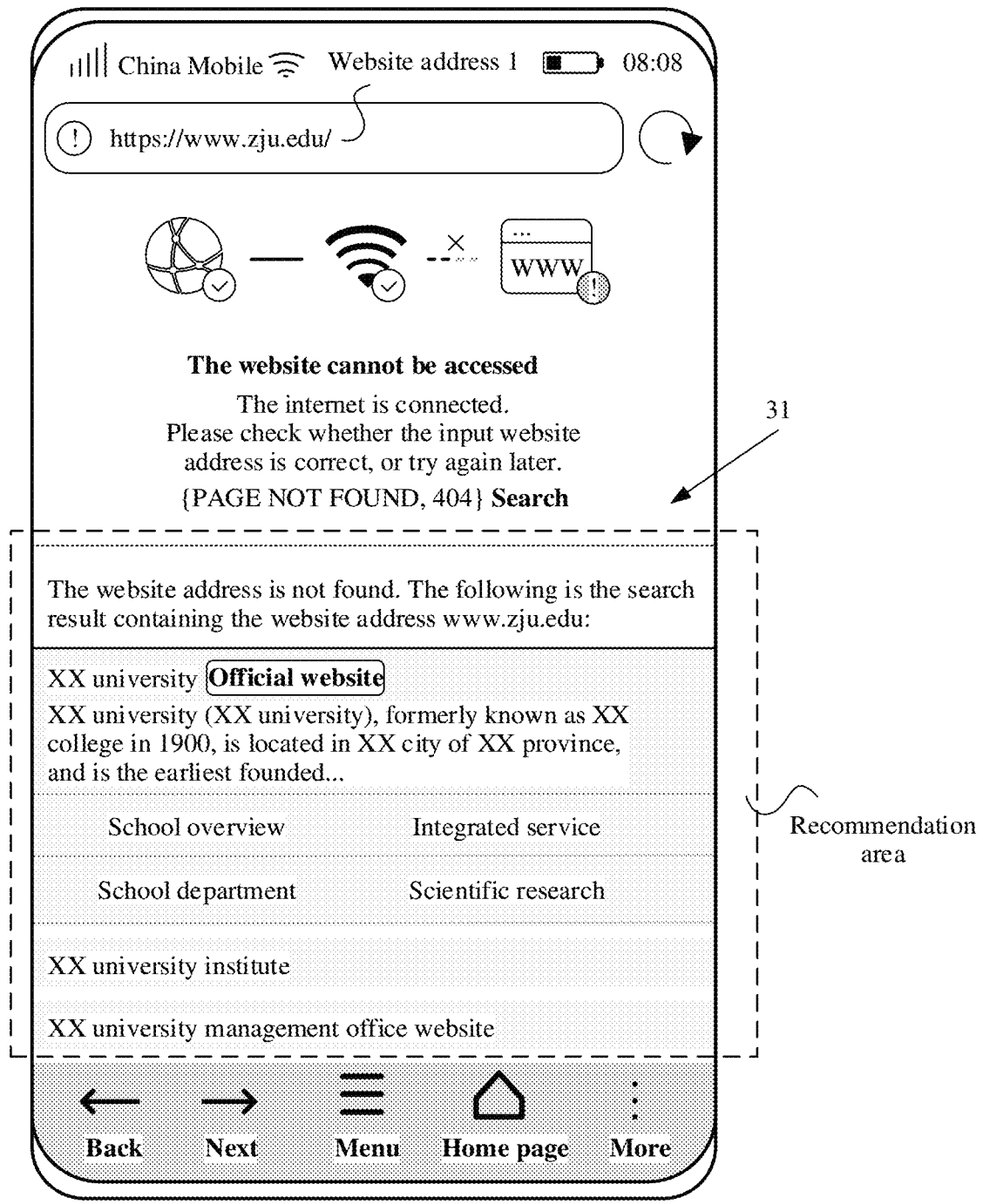

In some embodiments, when failing to access the first website address, the terminal device 100 uses the first website address as a keyword, to obtain at least one search result of the first website address, and displays the at least one search result in a recommendation area of an error prompt interface 31. The at least one search result may be a search result obtained by requesting from the recommendation server 400, or may be a search result obtained by searching online by using the current search engine of the browser. For example, as shown in FIG. 12B, the first website address is a website address "https://www.zju.edu/". After failing to access the first website address, the terminal device 100 obtains a search result including "www.zju.edu", and displays the search result in the recommendation area of the error prompt interface 30.

Figure 12C:
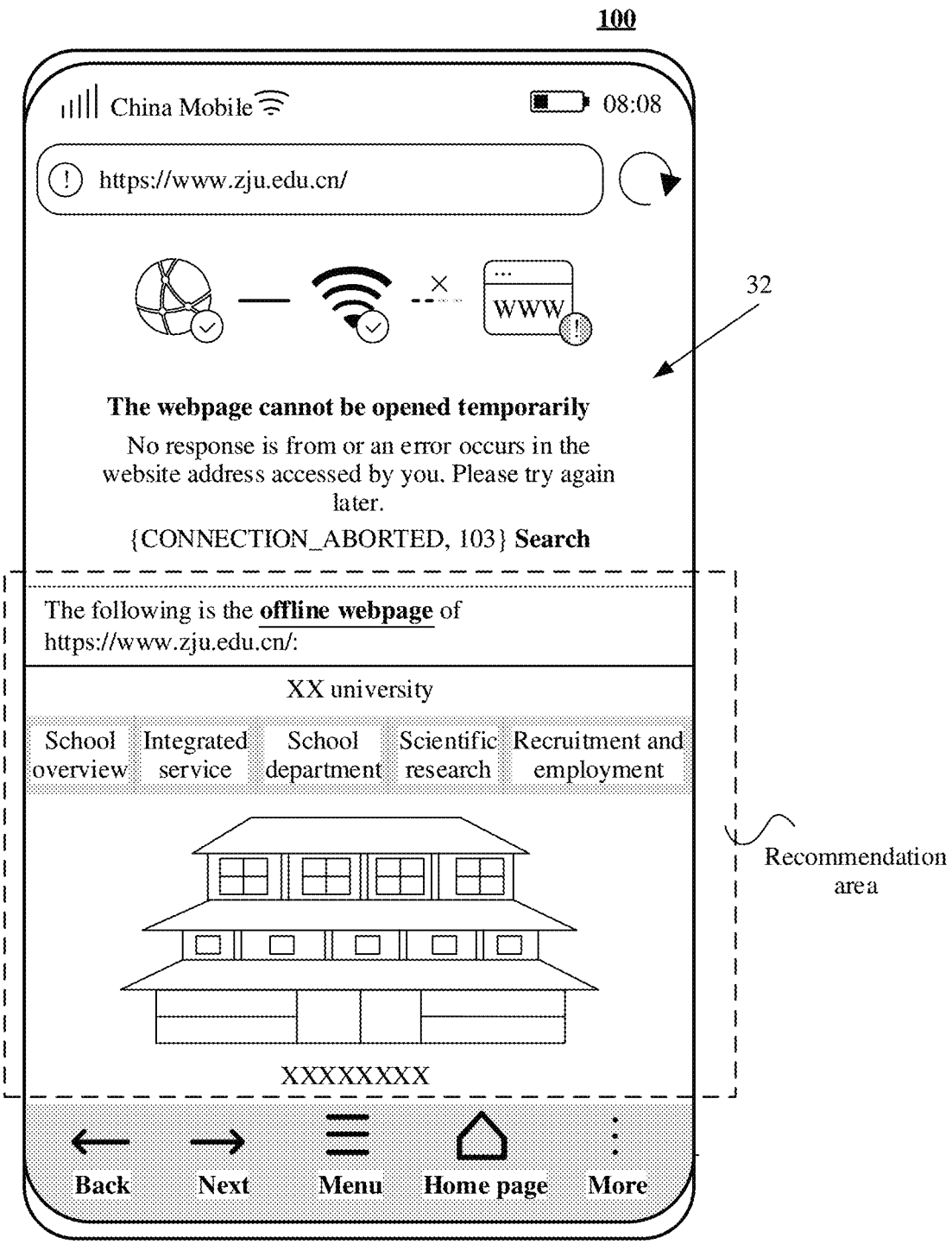

In some embodiments, when failing to access the first website address, the terminal device 100 obtains an offline webpage of the first website address, and the terminal device 100 displays a part or all of the offline webpage in a recommendation area of an error prompt interface 32. The offline webpage of the first website address may be an offline webpage cached locally by the terminal device 100, or may be an offline webpage obtained by requesting from the recommendation server 400. For example, as shown in FIG. 12C, the first website address is a correct website address "https://www.zju.edu.cn/", the terminal device 100 locally stores an offline webpage corresponding to the website address, and the terminal device 100 displays a part of content of the offline webpage in the recommendation area of the error prompt interface 30. In an implementation, when the terminal device 100 displays the part of content of the offline webpage in the recommendation area, the recommendation area may receive an upward sliding operation of the user, and in response to the sliding operation, the terminal device 100 may display more content of the offline webpage.

It may be understood that the terminal device 100 can obtain the recommended content online by using the Browser app or the recommendation server 400 only when the network of the terminal device 100 is normal.

Figure 12D:
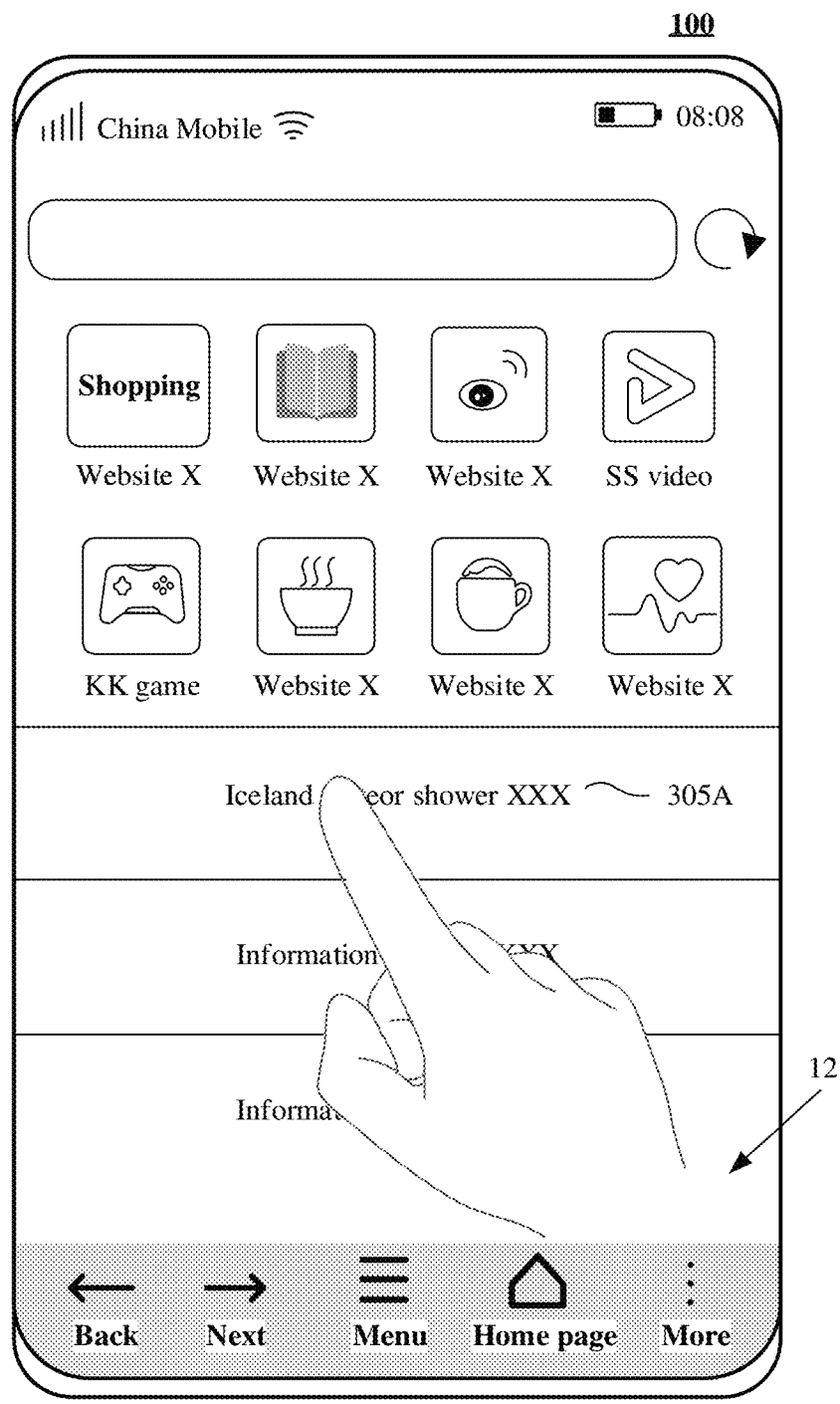

In some embodiments, the first input operation is tapping an Information link 305A shown in FIG. 12D. When failing to access the first website address indicated by the Information link 305A, the terminal device 100 uses a title of the Information link 305A as a keyword, to obtain at least one piece of information related to the title, and displays a corresponding information link in a recommendation area of an error prompt interface 33 shown in FIG. 12E. The at least one piece of information may be information obtained by searching online by using a current search engine of the browser, or may be information obtained by requesting from the recommendation server 400.

Figure 12E:
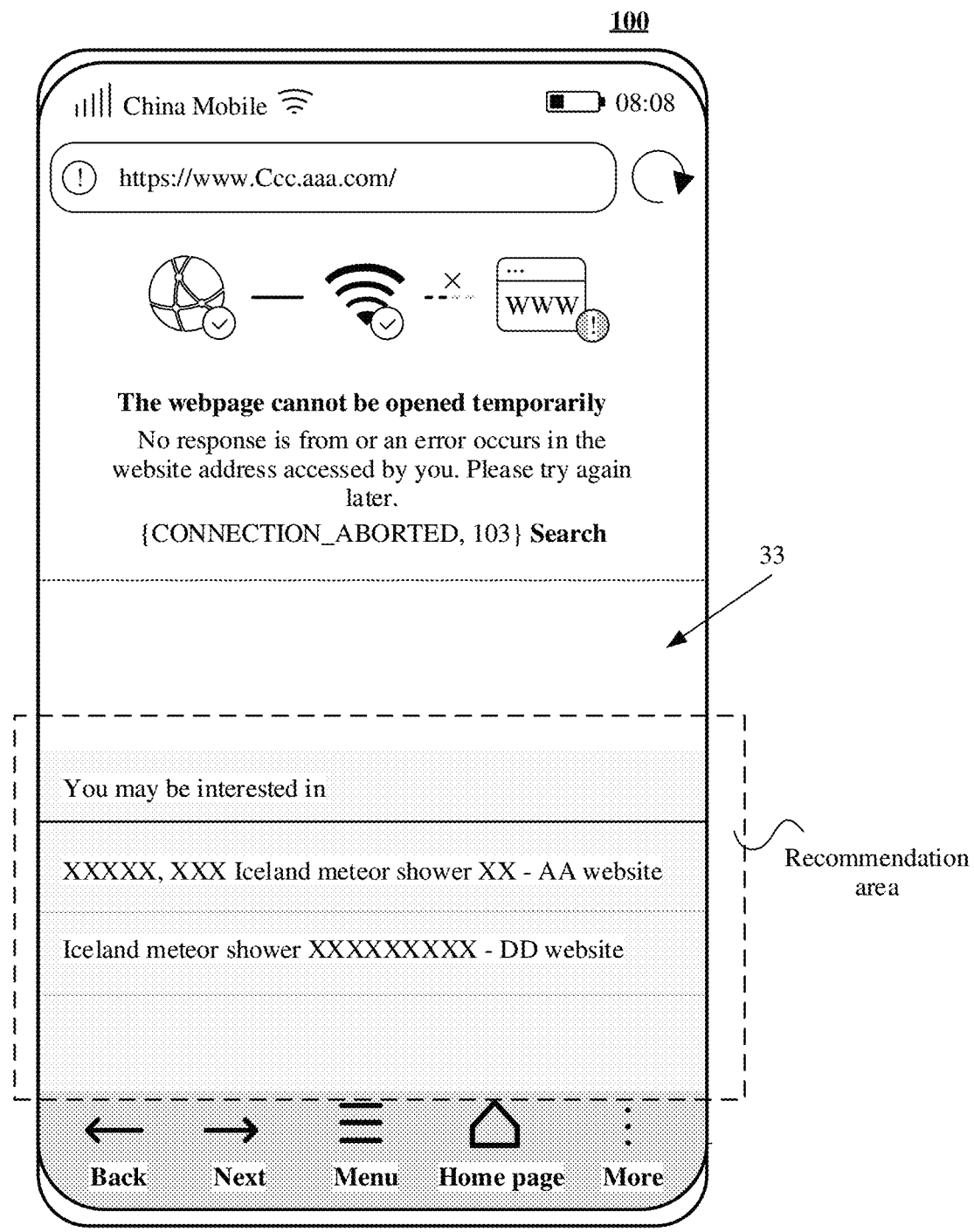
Figure 12F:
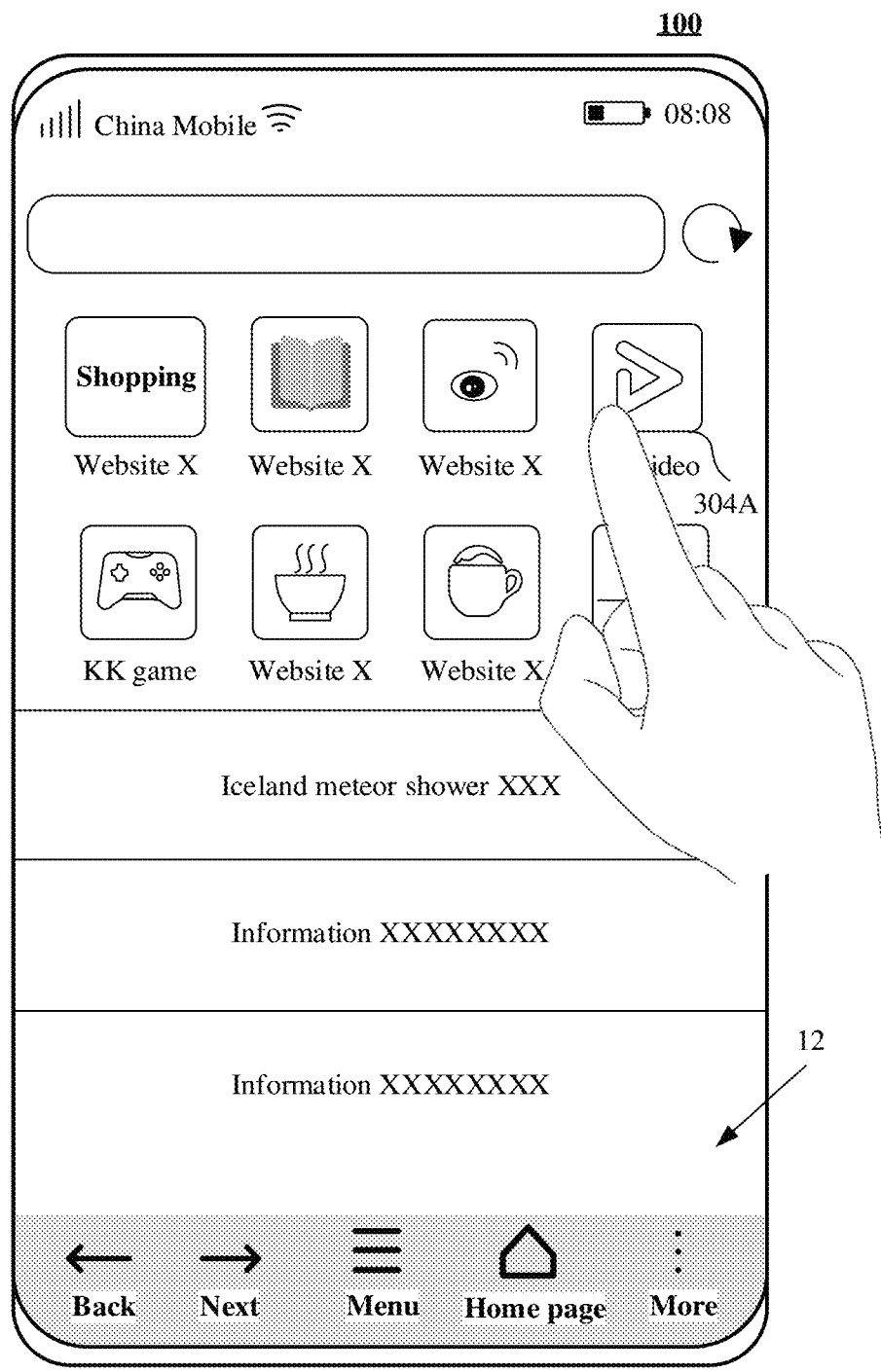

In some embodiments, the first input operation is tapping an icon 304A of an SS video website shown in FIG. 12F. When failing to access the first website address of the SS video website indicated by the icon 304A, the terminal device 100 displays, in a recommendation area of an error prompt interface 34 shown in FIG. 12G, an icon of the at least one installed video application or a video-type quick application.

The following describes, by using an example, a software system of the terminal device 100 in embodiments of this application.

A layered architecture, an event-driven architecture, a microkernel architecture, a micro service architecture, or a cloud architecture may be used for a software system of the terminal device 100. In embodiments of the present embodiment, an Android system with a layered architecture is used as an example to describe a software structure of the terminal device 100.

Figure 13:
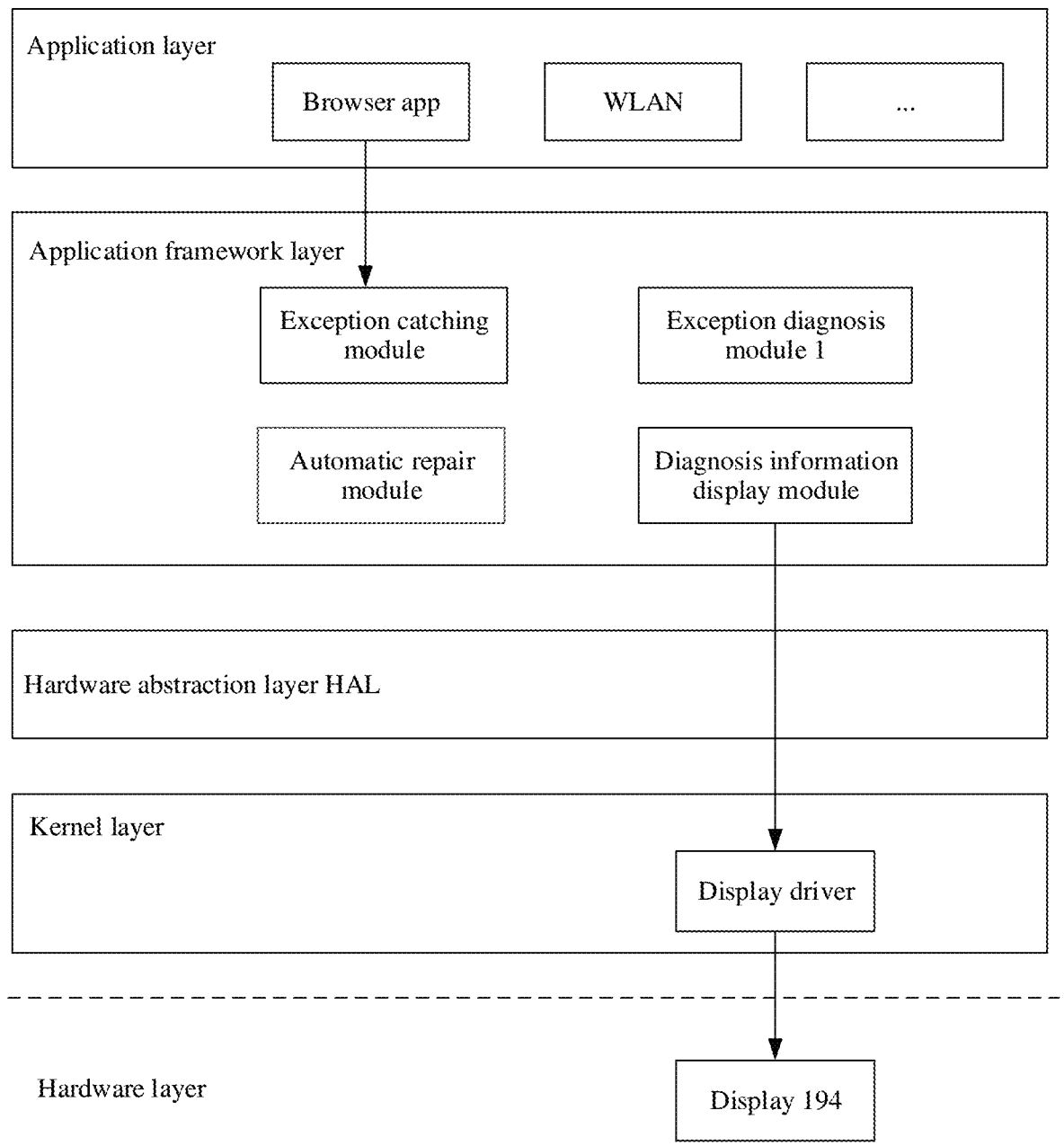
FIG. 13 is a schematic diagram of a software system according to an embodiment of this application.

For example, FIG. 13 is a block diagram of a software structure of a terminal device 100 according to an embodiment of this application.

In a layered architecture, software is divided into several layers, and each layer has a clear role and task. The layers communicate with each other through a software interface. In some embodiments, the Android system is divided into four layers: an application layer, an application framework layer, an Android runtime (Android runtime) and a system library, and a kernel layer (kernel) from top to bottom.

The application layer may include a series of application packages.

As shown in FIG. 13, the application packages may include a Browser app and WLAN, and may further include applications such as Camera, Gallery, Calendar, Phone, Map, Navigation, Bluetooth, Music, Video, and Messages.

The application framework layer provides an application programming interface (application programming interface, API) and a programming framework for an application at the application layer. The application framework layer includes some predefined functions.

The application framework layer may include an exception catching module, an exception diagnosis module 1, and a diagnosis result display module. The exception catching module is configured to collect related information (such as setting information and a domain name corresponding to a website address) of a webpage access exception. The exception diagnosis module 1 is configured to: diagnose an error cause of the webpage access exception based on the related information of the webpage access exception, generate a diagnosis result, and obtain recommended content of an access target (a website address and/or a keyword). The diagnosis result display module is configured to determine, based on the diagnosis result and the recommended content, display content in each area (for example, an error segment display area, an error description area, a button area, or a recommendation area) of an error prompt interface. In some embodiments, the application framework layer may further include an automatic repair module, configured to automatically repair an error cause on the side of the terminal device 100, and trigger a webpage access procedure again.

The Android runtime includes a kernel library and a virtual machine. The Android runtime is responsible for scheduling and management of the Android system.

The kernel library includes two parts: a function that needs to be invoked in Java language and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The kernel layer is a layer between hardware and software. The kernel layer may include a display driver, a sensor driver, and a touch IC driver, and may further include a camera driver, an audio driver, and the like. The HAL layer and the kernel layer (kernel) may perform a corresponding operation in response to a function invoked by the application framework layer.

In some embodiments of this application, the terminal device 100 receives a first input operation used to access a first website address, the first input operation may further indicate a first keyword, and related information of the first input operation is sent to the kernel layer. The kernel layer processes the input operation into an original input event. The application framework layer obtains the original input event from the kernel layer, and identifies that the input event is used to access, by using a preset app (for example, the Browser app), a webpage indicated by the first website address. The application framework layer sends the event to the Browser app, and the Browser app triggers a procedure of accessing the first website address. When determining that the first website address fails to be accessed (when access for the webpage indicated by the first website address is abnormal), the Browser app invokes an exception catching module through an interface at the application framework layer, to collect the related information of the webpage access exception, and send the collected related information of the webpage access exception to the exception diagnosis module 1. The exception diagnosis module 1 diagnoses an error cause of the webpage access exception based on the related information of the webpage access exception, and sends a local diagnosis result to the diagnosis result display module. The diagnosis result display module may determine, based on the local diagnosis result, the display content in each area (for example, the error segment display area, the error description area, or the button area) of the error prompt interface, and invoke the display driver at the kernel layer to drive the display 194 to display the error prompt interface.

In some embodiments, when the error cause of the webpage access exception obtained by the exception diagnosis module 1 through diagnosis is that the setting information on the side of the terminal device 100 is incorrect, the setting information can be automatically corrected, and the procedure of accessing the first website address is automatically triggered again.

In some embodiments, when the exception diagnosis module 1 cannot obtain the error cause of the webpage access exception through diagnosis, and the terminal device 100 may establish a communication connection to a diagnosis server 300, an exception diagnosis module 2 of the diagnosis server 300 may be requested to diagnose the error cause of the webpage access exception; and after obtaining a cloud diagnosis result obtained through diagnosis performed by the exception diagnosis module 2, the exception diagnosis module 1 sends the cloud diagnosis result to the diagnosis result display module. The diagnosis result display module may also determine, based on the cloud diagnosis result, display content in each area of the error prompt interface.

In some embodiments, the exception diagnosis module 1 may further request a recommendation server 400 to recommend related content of the first website address and/or the first keyword indicated by the first input operation, and send the recommended content of the recommendation server 400 to the diagnosis result display module. The diagnosis result display module may determine that the recommendation area of the error prompt interface includes the recommended content.

In some embodiments, some or all of the exception catching module, the exception diagnosis module 1, the diagnosis result display module, and the automatic repair module may alternatively be integrated into the Browser app at the application layer. This is not specifically limited herein.

In this embodiment of this application, the error cause obtained through local diagnosis or cloud diagnosis may be referred to as a first error cause.

The following describes a method for processing a web page access exception provided in an embodiment of this application. The method for processing a webpage access exception is applied to a communication system 10, and the communication system 10 includes a terminal device 100, a diagnosis server 300, and a recommendation server 400. The terminal device 100 may include an exception catching module, an exception diagnosis module 1, and a diagnosis result display module. The diagnosis server 300 may include an exception diagnosis module 2.

Figure 14A:
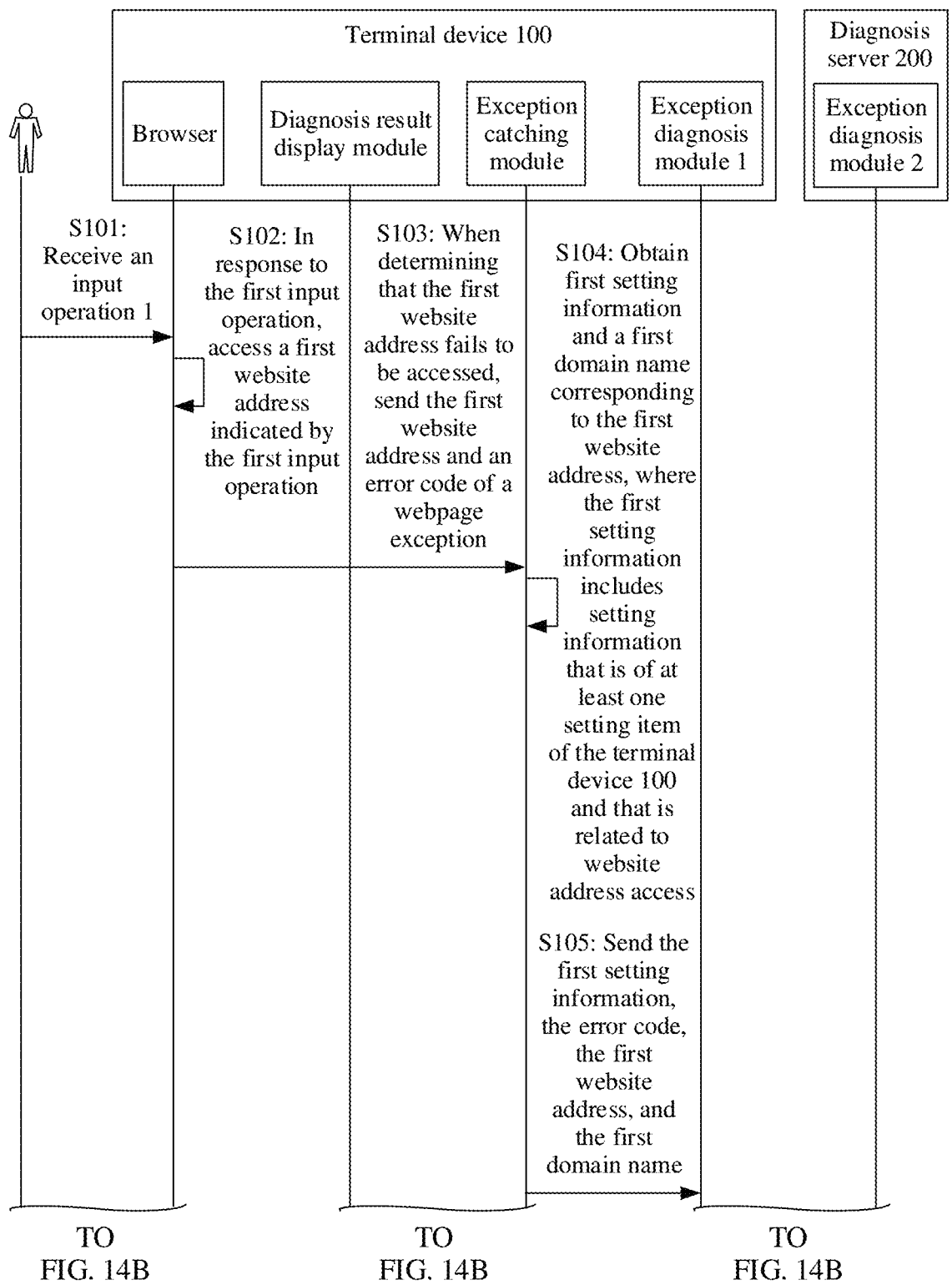
FIG. 14A to FIG. 14C are a flowchart of a method for processing a webpage access exception according to an embodiment of this application.
Figure 14B:
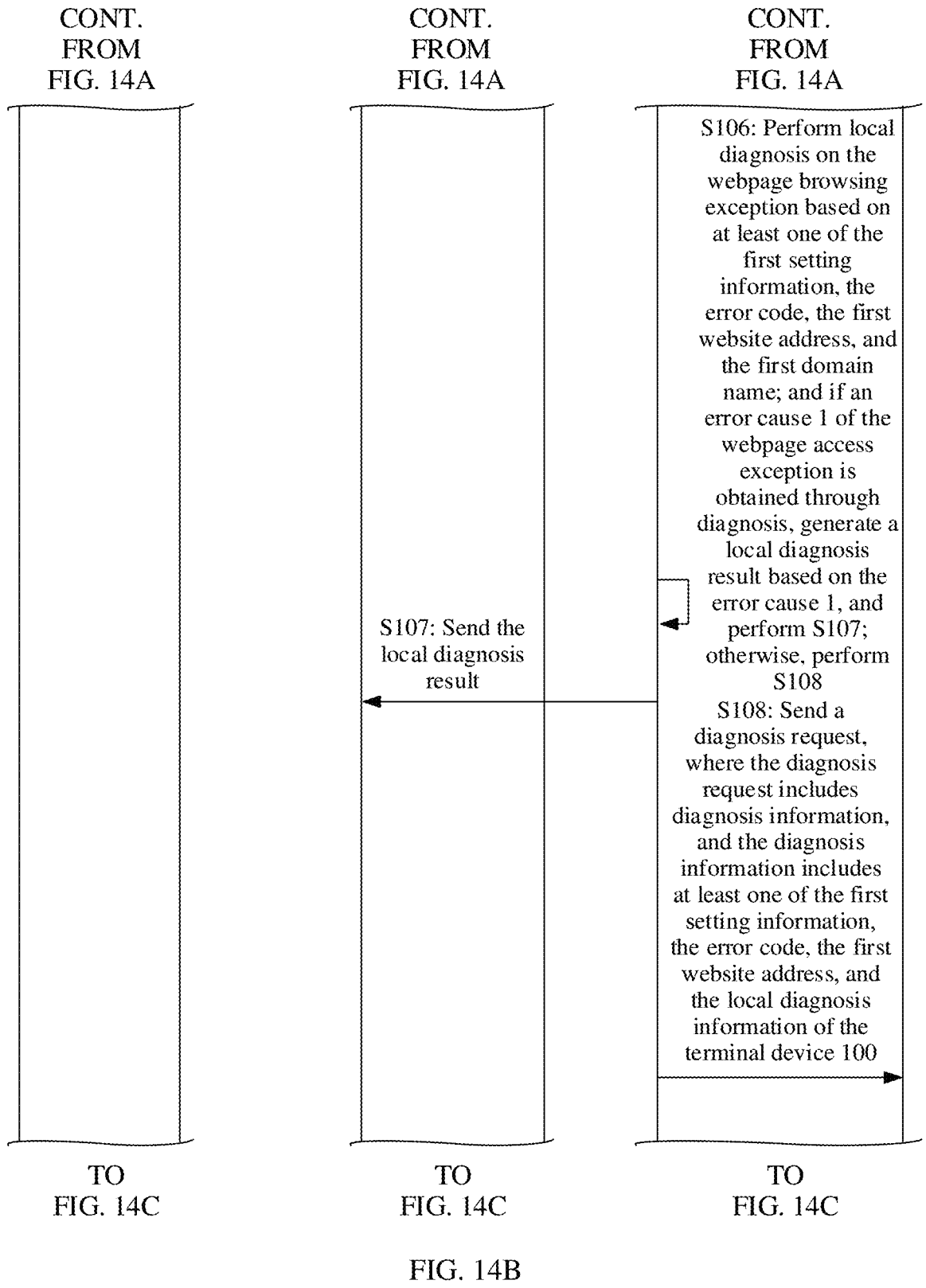
Figure 14C:
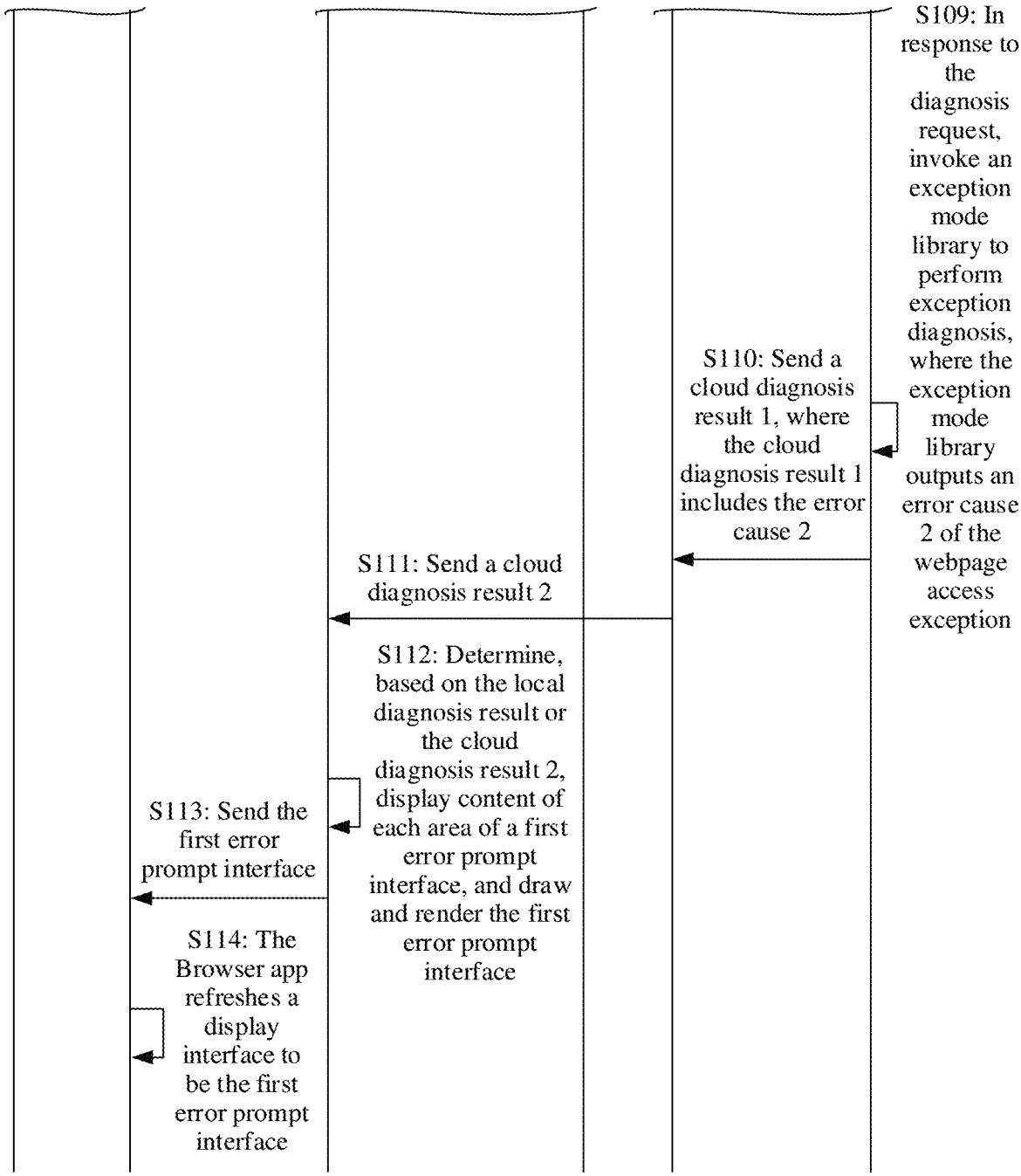

For example, FIG. 14A to FIG. 14C are a schematic flowchart of the method for processing a webpage access exception. The method for processing a webpage access exception includes but is not limited to step S101 to step S114.

S101: A Browser app on the terminal device 100 receives a first input operation of a user, where the first input operation indicates a first website address.

In some embodiments, the first input operation may include one or more of the following: inputting the first website address in a website address search bar, inputting a first keyword in a keyword search bar, tapping a text link, tapping an image link, and the like. The first input operation indicates the first website address that the user intends to access and/or the first keyword that the user intends to search. When the first input operation is tapping the text link or tapping the image link, the first keyword indicated by the first input operation may be a title of the text link or the image link, or may be the link (the website address is used as the keyword). For details, refer to descriptions of the first input operation in the related embodiment in FIG. 5B. Details are not described herein again.

S102: In response to the first input operation, the Browser app accesses the first website address indicated by the first input operation.

Specifically, for a specific implementation in which the Browser app accesses the first website address indicated by the first input operation, refer to the related embodiment of step 3 to step 5 shown in FIG. 4. In this embodiment of this application, the Browser app accesses the first website address, that is, accesses a webpage indicated by the first website address. It may be understood that an error in any phase of step 3 to step 5 may cause the Browser app to fail to access the first website address, that is, the webpage access exception occurs on the webpage indicated by the first website address.

S103: When determining that the first website address fails to be accessed, the Browser app sends the first website address and an error code of the webpage access exception to the exception catching module.

In this embodiment of this application, when determining that the website address fails to be accessed, the terminal device 100 obtains the error code. The error code may be locally generated by the terminal device 100, or may be fed back by a service server 200 indicated by the first website address.

S104: The exception catching module obtains first setting information and a first domain name corresponding to the first website address, where the first setting information includes setting information that is of at least one setting item of the terminal device 100 and that is related to website address access.

In some embodiments, settings that are of the terminal device 100 and that are related to website address access may include network settings, firewall settings, browser settings, and the like. The network settings may specifically include a WLAN on/off setting, a mobile data on/off setting, an airplane mode on/off setting, a WLAN⁺ on/off setting, and the like. The airplane mode on/off setting is used as an example. Setting information of the airplane mode on/off setting may be on or off. It may be understood that when the setting information of the airplane mode on/off setting is on, the terminal device 100 cannot be connected to the network, and cannot successfully access the first website address. The firewall settings may specifically include a setting of a security level of the firewall, a setting of a firewall policy, a setting of an access blocking list, and the like. It may be understood that, if the security level of the firewall is set excessively high and the firewall policy is set incorrectly, many secure websites cannot be accessed. If the currently accessed first website address is set into the access blocking list, the first website address cannot be accessed. After the Browser app is infected by a virus, a browser-related setting is maliciously modified and damaged. As a result, the Browser app cannot browse webpages. This is not limited to the network settings, firewall settings, and browser settings, and the setting related to website address access may further include other setting information, which is not specifically limited herein.

In this embodiment of this application, the terminal device 100 collects, by using the exception catching module, related information of website address access, and can further determine an error cause of the webpage access exception based on the collected related information. This is not limited to the setting information. The related information of website address access may further include other types of information, which is not specifically limited herein.

In this embodiment of this application, the exception catching module parses the first website address, to extract the first domain name in the first website address, where the first domain name indicates the to-be-accessed service server 200.

S105: The exception catching module sends the first setting information, the error code, the first website address, and the first domain name to the exception diagnosis module 1.

In some embodiments, the exception catching module does not need to extract the first domain name, and the exception diagnosis module 1 may extract the first domain name in the first website address.

S106: The exception diagnosis module 1 performs local diagnosis on the webpage access exception based on at least one of the first setting information, the error code, the first website address, and the first domain name; and if an error cause 1 of the webpage access exception is obtained through the diagnosis, generates a local diagnosis result based on the error cause 1, and performs S107; otherwise, performs S108.

In some embodiments, if the first website address is an incorrect website address, and the exception catching module cannot successfully extract the first domain name corresponding to the first website address in step S104, in step S105, the exception catching module may send indication information 1 to the exception diagnosis module 1, where the indication information 1 indicates that the domain name fails to be extracted. In step S106, the exception diagnosis module 1 may determine, based on the indication information 1, that the error cause 1 of the webpage access exception is that the website address is incorrect.

In some embodiments, as shown in FIG. 15, step 106 may specifically include S106A to S106E.

S106A: Obtain an error cause indicated by the error code, and detect whether the error cause is a preset second-level error cause; and if the error cause is the preset second-level error cause, determine that the error cause 1 may include the error cause indicated by the error code, and perform S106F; or if the error cause is not the preset second-level error cause, perform a next step.

S106B: Detect whether there is a first setting item whose setting information is incorrect in the first setting information; and if there is the first setting item whose setting information is incorrect in the first setting information, determine that the error cause 1 may include that the first setting item is incorrectly set, and perform S106F; or if there is no first setting item whose setting information is incorrect in the first setting information, perform a next step.

In this embodiment of this application, that the setting information of the first setting item is incorrect means that the setting information of the first setting item can cause the Browser app to fail to access a correct website address.

For example, the error causes corresponding to the error prompt interfaces shown in FIG. 8A to FIG. 8E include that the setting information is incorrect. As shown in FIG. 8A, the on-off setting of the airplane mode in the first setting information is on, and the exception diagnosis module 1 determines that the error cause 1 of the webpage access exception includes that the airplane mode is not turned off. As shown in FIG. 8C, the on-off setting of the mobile data in the first setting information is off, and the exception diagnosis module 1 determines that the error cause 1 of the webpage access exception includes that the mobile data is not turned on. As shown in FIG. 8E, both the on-off setting of Wi-Fi and the on-off setting of the mobile data in the first setting information are off, and the exception diagnosis module 1 determines that the error cause 1 of the webpage access exception includes that the mobile data and Wi-Fi are not turned on.

S106C: Detect whether network connectivity is abnormal; and if the network connectivity is abnormal, determine that the error cause 1 may include that the network connectivity is abnormal, and perform S106F; or if the network connectivity is not abnormal, perform a next step.

In this embodiment of this application, whether the network connectivity is abnormal is diagnosed, that is, the terminal device 100 verifies whether at least one preset website address can be accessed. The at least one preset website address may be a preset fixed website address, or may be a website address that is most frequently accessed by the Browser app successfully. It can be understood that, that the network connectivity is normal also indicates that the Browser app is normal, the network is normal, and the DNS resolution is normal.

It may be understood that, in step S106C, when failing to access the first website address, the terminal device 100 automatically detects the network connectivity problem. For example, if it is determined that no setting information in the first setting information is set incorrectly and the network connectivity is normal, the error prompt interface displayed by the terminal device 100 may directly include the error segment display area and/or the prompt information 532 shown in FIG. 10C; or if it is determined that no setting information in the first setting information is set incorrectly and the network connectivity is abnormal, the error prompt interface displayed by the terminal device 100 may directly include the error segment display area and/or the prompt information 533 shown in FIG. 10C. It may be understood that, in this embodiment, the user does not need to manually test the network connectivity problem. The indication icon of the test website identifier 531 in the error segment display area shown in FIG. 10B and FIG. 10C indicates that the website is successfully accessed in the test, the connection relationship between the test website identifier 531 and the Network icon 502 is presented as a normal state, the prompt information 532 prompts that the XX website is successfully accessed in the test, and the prompt information 533 prompts that the XX website fails to be accessed in the test.

In this embodiment of this application, S106C is optional. In some embodiments, in step S106, the terminal device 100 does not need to automatically detect the network connectivity. If it is determined, based on the diagnosis result, that the network connectivity may be abnormal, a button area of a first error prompt interface displayed by the terminal device 100 may include the connectivity test button 530 shown in FIG. 10A, and an error auxiliary copywriting 505 on the first error prompt interface may include that "Try the network connectivity test for website access". The user may perform the network connectivity test by using the connectivity test button 530. For details, refer to related embodiments in FIG. 10A to FIG. 10C, and details are not described herein again.

S106D: If the first domain name is a domain name of a search engine 1, detect whether the search engine 1 is a preset search engine; and if the search engine 1 is the preset search engine, determine that the error cause 1 may include that the search engine 1 is unavailable, and perform S106F; or if the search engine 1 is not the preset search engine, perform a next step.

In an implementation, the preset search engine is a search engine whose service server is located outside a preset area.

For example, the service server of the preset search engine is a foreign server. It may be understood that, if the service server of the search engine outside the preset area is excessively far away from the user, the service server cannot respond to an access request of the terminal device 100 within preset time, that is, the access times out, and consequently, the website address fails to be accessed.

For example, the preset search engine includes the Google search engine, and the first domain name is a domain name of the Google search engine. As shown in FIG. 9B, when it is determined that the first domain name accessed by the Browser app is the domain name of the Google search engine, it is determined that the error cause 1 may include that the search engine is unavailable.

S106E: Detect whether the website indicated by the first domain name can be accessed; and if the website cannot be accessed, determine that the error cause 1 may include that the website cannot be accessed, and perform S106F; or if the website can be accessed, perform a next step.

It may be understood that the first domain name indicates the service server 200 corresponding to a to-be-accessed website. If both the first setting information and the network connectivity are normal, but the first domain name cannot be accessed, it indicates that an error may occur in the service server 200.

S106F: When it is determined that the error cause 1 of the webpage access exception is obtained through local diagnosis, generate the local diagnosis result, and perform S107; or when it is determined that the error cause of the webpage access exception cannot be obtained through local diagnosis, perform S108.

In some embodiments, after performing all detections in steps S106A to S106E, the terminal device 100 comprehensively determines the error cause of the webpage access exception based on detection results of all the detections.

For example, in step S106A, the error code is 106, and the error code indicates that "A network is not connected", that "A network is not connected" is not the preset second-level error cause, and a second-level error cause corresponding to that "A network is not connected" may include that "The mobile data is not turned on", "The airplane mode is not turned off", "Wi-Fi is not turned on", and the like. In step S106B, the terminal device 100 detects that the airplane mode is not turned off. In step S106C, the terminal device 100 detects that the network connectivity is abnormal. In step S106E, the terminal device 100 detects that the website cannot be accessed. The terminal device 100 determines that a specific error cause of the webpage exception is the second-level error cause corresponding to that "A network is not connected". Therefore, based on the error code and the detection results of all the detections, the terminal device 100 determines that the error cause of the webpage exception is specifically that "The airplane mode is not turned off".

In some embodiments, after the terminal device 100 performs step S106A, if the error cause indicated by the error code is not the preset second-level error cause, the terminal device 100 sequentially performs S106B to S106E. If an error cause is detected, and the error cause is the second-level error cause corresponding to the error code, it is determined that the error cause is the error cause 1 of the webpage exception.

In some embodiments, the error prompt interface may include one or more of an error segment display area, an error description area, and a button area. Specifically, for the error segment display area, the error description area, and the button area, refer to related descriptions in FIG. 6. Details are not described herein again. The local diagnosis result further includes at least one piece of information in the following information: a display status of an indication icon of each icon and a display status of a connection relationship between icons in the error segment display area, an error description, an error auxiliary copywriting, and an error code in the error description area, and button information in the button area, where the at least one piece of information is determined based on the error cause 1. In an implementation, the terminal device 100 stores a correspondence between various error causes and the at least one piece of information, and the exception diagnosis module 1 may determine the at least one piece of information based on the locally stored correspondence.

It should be noted that an execution sequence of all the detections in step S106A to step S106E is not specifically limited in embodiments of this application. Before step S106F, it is not limited to detecting the first setting information, the network connectivity, the search engine, and access feasibility of the first domain name, and the exception diagnosis module 1 may further verify another possible error cause, which is not specifically limited herein.

In some embodiments, as shown in FIG. 15, in step S106B, after detecting the incorrect setting information, the terminal device 100 performs S106G.

S106G: If there is the first setting item whose setting information is incorrect, an automatic repair module is invoked to correct the setting of the first setting item and the Browser app is triggered to access again the first website address indicated by the first input operation; and if the access succeeds, the Browser app displays the webpage corresponding to the first website address; or if the access fails, the exception diagnosis module 1 performs a next step.

It may be understood that, if there is the incorrect setting information, the terminal device 100 may automatically correct the incorrect setting information, and access the first website address again. If the access succeeds, the Browser app may directly display the webpage corresponding to the first website address, and there is no need to display an error prompt interface; or if the access fails, terminal device 100 continues to perform a subsequent procedure, that is, terminal device 100 diagnoses the error cause of the webpage access exception, and displays the corresponding error prompt interface.

S107: The exception diagnosis module 1 sends the local diagnosis result to the exception catching module.

In an implementation, that the exception diagnosis module 1 sends the local diagnosis result to the diagnosis result display module specifically includes: The exception diagnosis module 1 sends the local diagnosis result to the exception catching module, and the exception catching module sends the local diagnosis result to the diagnosis result display module.

S108: The exception diagnosis module 1 sends a diagnosis request to the diagnosis server 300, where the diagnosis request includes diagnosis information, the diagnosis information includes at least one of the first setting information, the error code, the first website address, and the local detection result of the terminal device 100, and the diagnosis request is used to request the diagnosis server 300 to determine, based on the diagnosis information, the error cause of the webpage access exception.

It may be understood that, when the network of the terminal device 100 is normal, the exception diagnosis module 1 may perform information exchange with the diagnosis server 300 by using a communication module of the terminal device 100, for example, send the diagnosis request.

In some embodiments, the local diagnosis information may include the local detection results in step S106A to step S106D. In an implementation, the local diagnosis information may further include an automatic repair result in step S10F. For example, the detection result in step S106A may be that there is the first setting item whose setting information is incorrect in the first setting information; the detection result in step S106B may be that the network connectivity is not abnormal; the detection result in step S106C may be that website access is normal; and an automatic repair result in step S106E is that repair fails, that is, after the first setting item is corrected, the first website address fails to be accessed again.

It should be noted that the diagnosis information is not limited to the first setting information, the error code, the first website address, and the local detection result, and the diagnosis information may further include other information that is related to the website address access and that is collected by the terminal device 100. This is not specifically limited herein.

S109: In response to the diagnosis request, the exception diagnosis module 2 of the diagnosis server 300 invokes an exception mode library to perform exception diagnosis, where the exception mode library outputs an error cause 2 of the webpage access exception.

In some embodiments, the exception mode library is a diagnosis model generated through neural network training, an input of the exception mode library may be the diagnosis information sent by the terminal device 100, and an output of the exception mode library may include one of a plurality of preset error causes of the webpage access exception. In an implementation, the output of the exception mode library further includes that "The error cause is not identified".

For example, the error cause of the webpage access exception may include that "The response speed of the website is slow". The input of some training data in the exception mode library includes a website address of a website 1, and the output is that "The response speed of the website is slow". If the diagnosis information input by the terminal device 100 to the diagnosis server 300 includes the website address of the website 1, and other information in the diagnosis information is not abnormal, the error cause output by a trained exception mode library is that "The response speed of the website is slow".

S110: The diagnosis server 300 sends a cloud diagnosis result 1 to the exception diagnosis module 1 of the terminal device 100, where the cloud diagnosis result 1 includes the error cause 2.

S111: The exception diagnosis module 1 sends a cloud diagnosis result 2 to the diagnosis result display module.

In some embodiments, the cloud diagnosis result 1 is the same as the cloud diagnosis result 2. The cloud diagnosis result 2 further includes at least one piece of information in the following information: a display status of an indication icon of each icon and a display status of a connection relationship between icons in the error segment display area, an error description, an error auxiliary copywriting, and an error code in the error description area, and a button identifier in the button area, where the at least one piece of information is determined by the exception diagnosis module 2 of the diagnosis server 300 based on the error cause 2. In an implementation, the diagnosis server 300 stores a correspondence between various error causes and the at least one piece of information, and the diagnosis server 300 determines the at least one piece of information based on the correspondence.

In some embodiments, the cloud diagnosis result 1 does not include the at least one piece of information, the cloud diagnosis result 2 includes the at least one piece of information, and the at least one piece of information is determined by the exception diagnosis module 1 of the terminal device 100 based on the error cause 2.

In some embodiments, that the exception diagnosis module 1 sends the cloud diagnosis result to the diagnosis result display module specifically includes: The exception diagnosis module 1 sends the cloud diagnosis result to the exception catching module, and the exception catching module sends the cloud diagnosis result to the diagnosis result display module.

S112: The diagnosis result display module determines, based on the local diagnosis result or the cloud diagnosis result 2, display content of each area of the first error prompt interface, and draws and renders the first error prompt interface, where each area of the first error prompt interface includes one or more of an error segment display area, an error description area, and a button area.

In this embodiment of this application, a first error cause may be the error cause 1 obtained through local diagnosis or the error cause 2 obtained through cloud diagnosis. The first error prompt interface may be any error prompt interface in the user interfaces shown in FIG. 6, FIG. 8A to FIG. 8I, FIG. 9A to FIG. 9E, FIG. 10A, FIG. 11, and FIG. 12A to FIG. 12G.

S113: The diagnosis result display module sends the first error prompt interface to the Browser app.

S114: The Browser app refreshes a display interface to be the first error prompt interface.

In some embodiments, if the network is normal, and the terminal device 100 can access the diagnosis server 300, the exception diagnosis module 1 may perform no local diagnosis, and the terminal device 100 performs step S108 to step S111 after step S105, that is, only the diagnosis server 300 diagnoses the error cause of the webpage access exception.

For example, the error prompt interfaces shown in FIG. 8A to FIG. 8I may be determined based on the local diagnosis results of the terminal device 100. For example, the first error prompt interface is the error prompt interface 17 shown in FIG. 8A. Specifically, in step S106A, after detecting that the on/off setting of the airplane mode in the first setting information is on, the terminal device 100 determines that the error cause of the webpage access exception is that "The airplane mode is not turned off". Based on a correspondence between various error causes and display content of each area of the error prompt interface, and the error cause "The airplane mode is not turned off", the terminal device 100 may determine the display status of the indication icon of each icon, and the display status of the connection relationship between the icons in the error segment display area of the error prompt interface 17, the error description 504, the error auxiliary copywriting 505, and the error code 506 in the error description area, and the button in the button area of the error prompt interface 17. The terminal device 100 displays, based on the display content of each area of the error prompt interface 17, the error prompt interface 17 shown in FIG. 8A.

For example, the first website address is the website address of the website 1, and the error prompt interface 35 shown in FIG. 9E may be determined based on the cloud diagnosis result of the diagnosis server 300. Specifically, in step S106, the terminal device 100 does not obtain the error cause of the webpage access exception through local diagnosis; the terminal device 100 sends the diagnosis request to the diagnosis server 300, and the diagnosis server 300 inputs the diagnosis information of the diagnosis request into the exception mode library, where the output of the exception mode library is that "The response speed of the website is slow"; after receiving the error cause sent by the diagnosis server 300, the terminal device 100 determines the display content of each area of the error prompt interface 35 based on the error cause; and the terminal device 100 displays, based on the display content of the areas, the error prompt interface 35 shown in FIG. 9E.

It should be noted that, in the method for processing a webpage access exception provided in this embodiment of this application, in addition to the error cause determined through local diagnosis or cloud diagnosis, there may be another error cause that is not obtained through diagnosis. For example, the terminal device 100 determines, through diagnosis, that the error cause is a network error. This does not indicate that there is definitely no error on the side of the webpage. The terminal device 100 determines, through diagnosis, that the error cause is a webpage error. This does not indicate that there is definitely no error on the side of the network. According to the method for processing a webpage access exception provided in this embodiment of this application, at least one error cause that is most likely to exist and that is of the webpage access exception may be presented to the user through local diagnosis or cloud diagnosis.

In this embodiment of this application, the terminal device 100 may obtain an error cause obtained through local diagnosis or an error cause obtained through cloud diagnosis, to obtain, based on the error cause, the display content of each area (for example, the error segment display area, the error description area, or the button area) of the first error prompt interface. Based on the display status and/or connection relationship of each icon in the error segment display area, that an error of the webpage access exception occurs at a specific phase of website address access may be intuitively indicated to the user. Based on the error description and the error code in the error description area, the user can learn the specific error cause of the webpage access exception. The error auxiliary copywriting can guide the user to further understand, avoid, and/or resolve the error cause. The button in the button area may receive an input operation of the user, to further determine, avoid, and/or resolve the error cause of the webpage access exception.

Figure 16A:
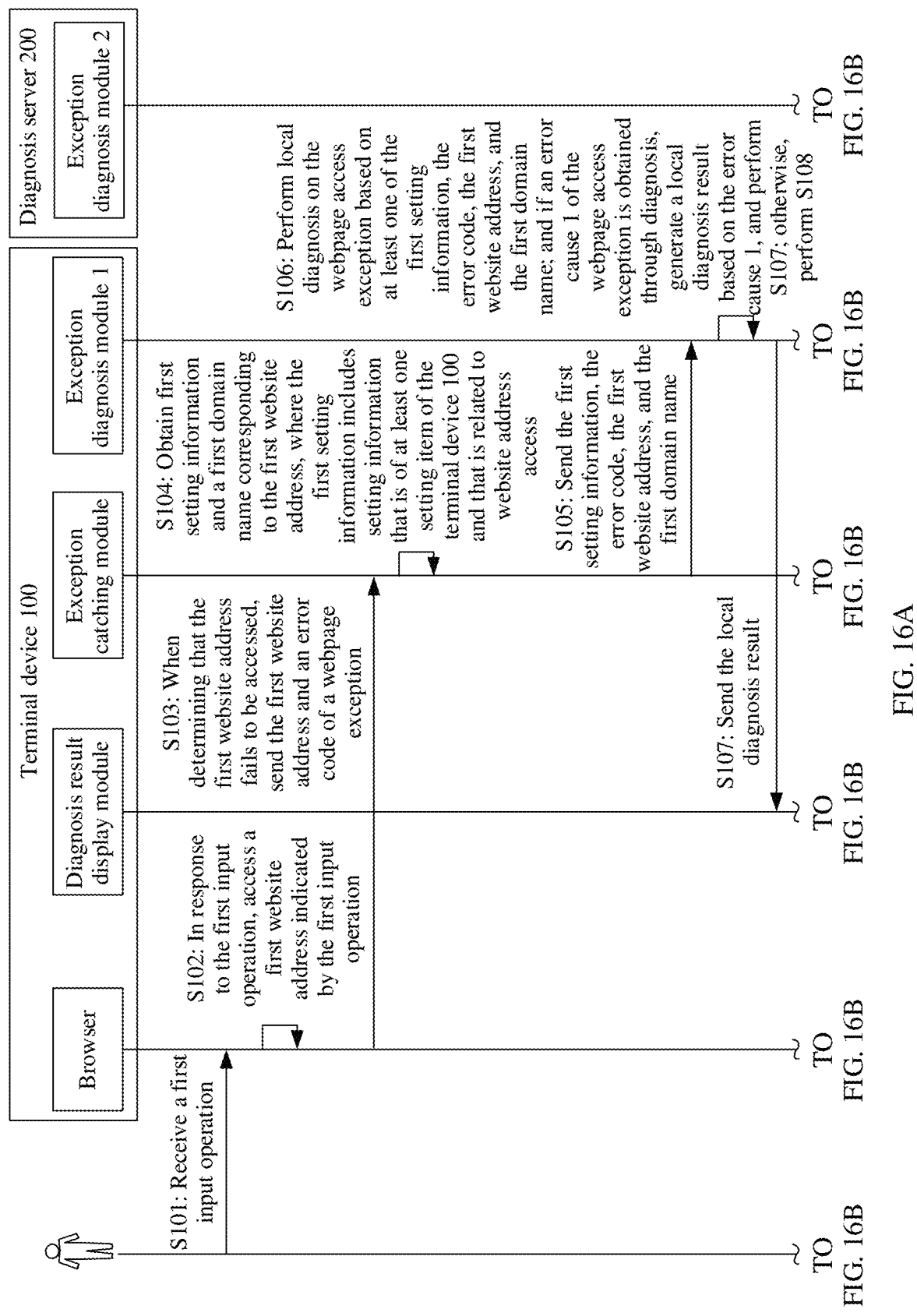
FIG. 16A to FIG. 16C are a flowchart of another method for processing a webpage access exception according to an embodiment of this application.
Figure 16B:
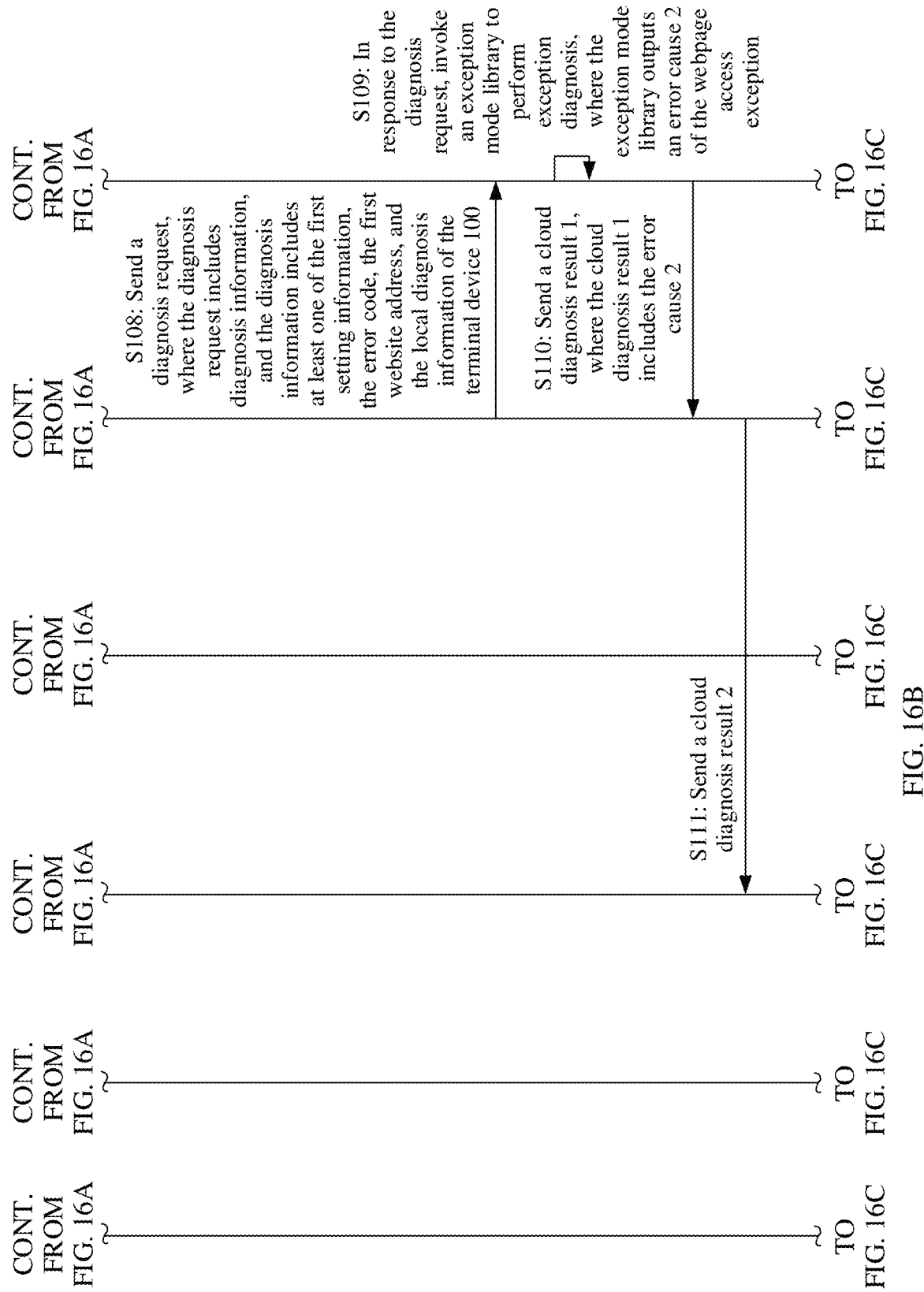
Figure 16C:
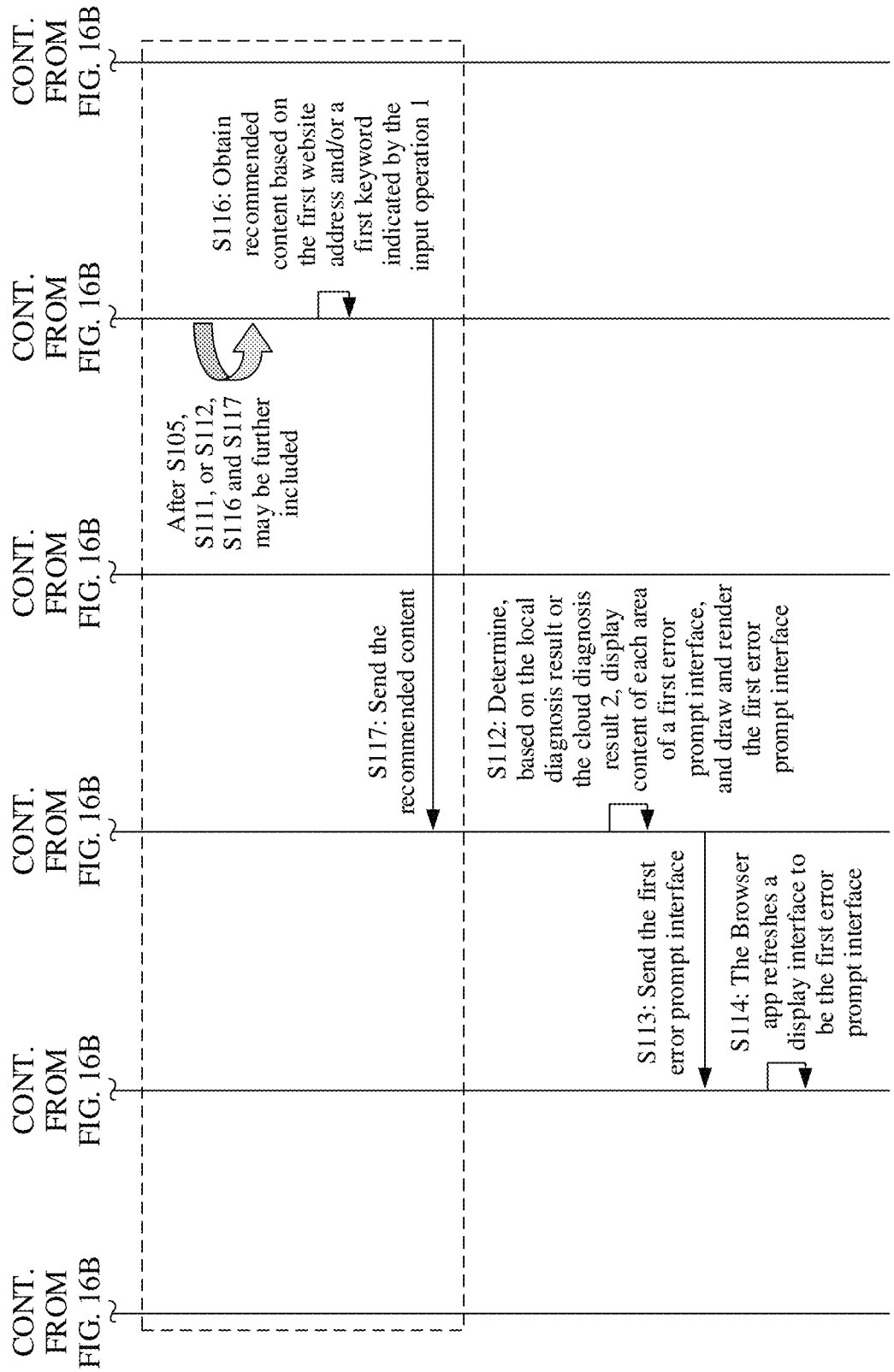

In this embodiment of this application, the terminal device 100 may further display, on the error prompt interface, recommended content related to an access target of the user, to provide more choices for the user. For example, as shown in the method for processing a webpage access exception shown in FIG. 16A to FIG. 16C, after step S105, S110, or S111, step S116 and step S117 may be further included.

In some embodiments, the recommended content may include one or more of the following: at least one website address associated with the first website address, an offline webpage of the first website address, at least one search result of the first website address, at least one piece of information associated with the first keyword, at least one application associated with the first keyword, at least one website associated with the first keyword, and at least one search result of the first keyword.

S116: The exception diagnosis module 1 obtains the recommended content based on the first website address and/or the first keyword indicated by the first input operation.

S117: The exception diagnosis module 1 sends the recommended content to the diagnosis result display module.

In this embodiment of this application, step S113 may specifically include: The diagnosis result display module determines the display content of each area of the first error prompt interface based on the local diagnosis result or the cloud diagnosis result and the recommended content, where each area of the first error prompt interface includes a recommendation area, and the recommendation area is used to display the recommended content.

Figures 2, 17A:
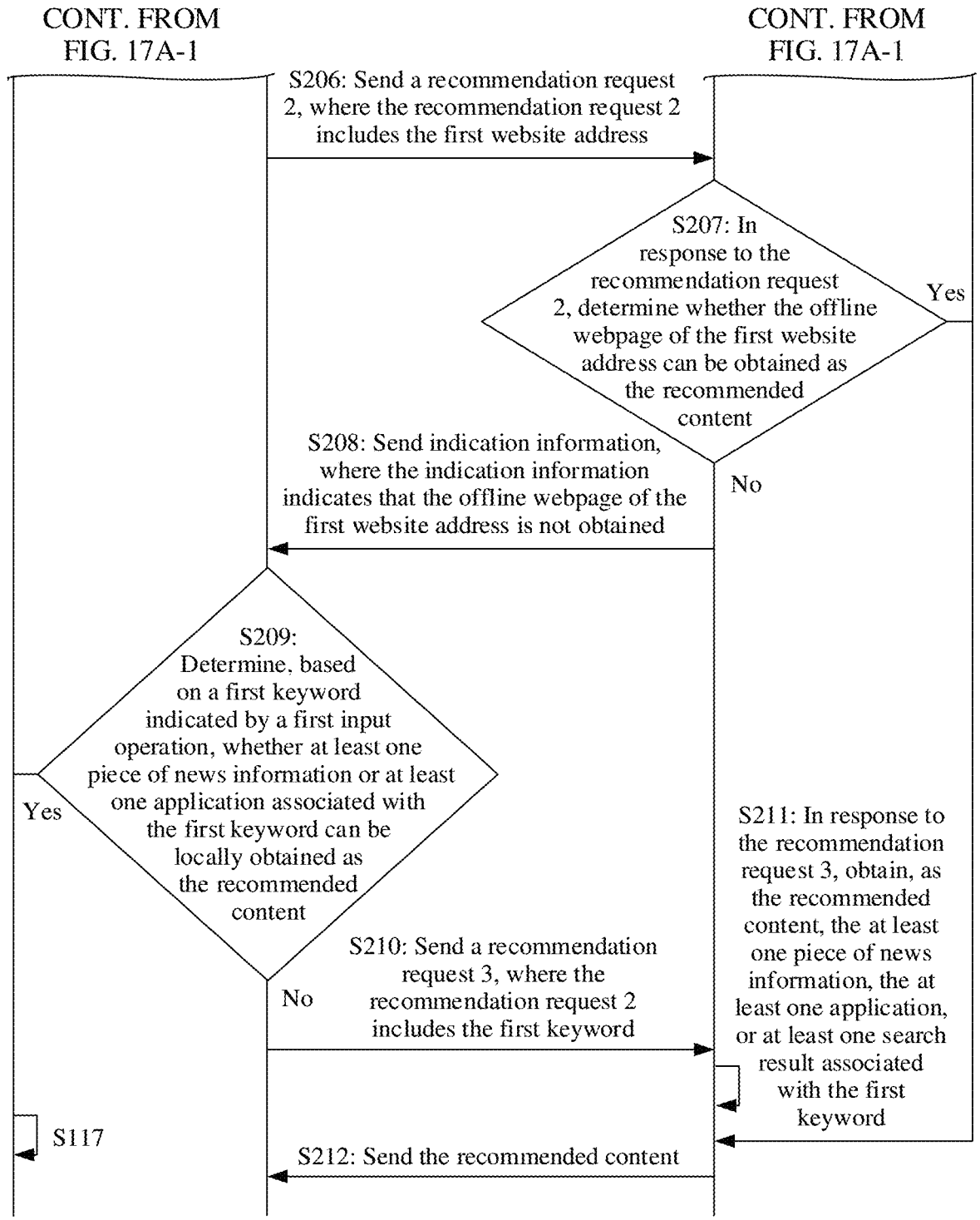

In some embodiments, as shown in FIG. 17A-1 and FIG. 17A-2, step S116 may specifically include steps S201 to S208.

S201: If it is determined, based on the local diagnosis result or the cloud diagnosis result 1, that the error cause of the webpage access exception includes that "The website address is incorrect", the exception diagnosis module 1 determines whether the at least one website address associated with the first website address can be locally obtained as the recommended content; and if the at least one website address associated with the first website address can be locally obtained as the recommended content, performs S117; otherwise, performs S202.

In some embodiments, the first website address is an incorrect website address, and the exception diagnosis module 1 determines whether a local website address cache library includes a website address 4 associated with the first website address, where the website address 4 is a website address to which a prefix or a suffix is added on the basis of the domain name of the first website address; and if the local website address cache library includes the website address 4 associated with the first website address, the website address 4 is used as the recommended content.

It should be noted that the domain name includes a string of characters and a domain name suffix. The domain name suffix is a symbol used to represent a domain name type. Domain names with different suffixes have different meanings. Domain name suffixes are classified into two types: country code top-level domain name suffixes (for example, ".cn" for China, ".us" for the United States, and ".ru" for Russia) and international top-level domain name suffixes (for example, ".com" for commercial companies, ".edu" for educational institutions, and ".org" for organizations).

In some embodiments, the first website address is matched with a website address in the local website address cache library, and N website addresses with highest matching degrees are used as the recommended content, where N is a preset positive integer. In some embodiments, the first website address is matched with a website address in the local website address cache library, and first N website addresses whose matching degrees are higher than a preset value are used as the recommended content.

For example, the first website address is an incorrect website address, and the website indicated by the first website address is an invalid website. For example, the content displayed on the error prompt interface 30 shown in FIG. 12A is determined based on the error cause "the website address is incorrect", the error description in the error description area of the error prompt interface 30 is presented as that "The website cannot be accessed", and the error auxiliary copywriting is presented as that "The internet is connected. Please check whether the input website address is correct, or try again later". The terminal device

100 displays, in the recommendation area of the error prompt interface 30, two website addresses associated with the first website address.

S202: The exception diagnosis module 1 sends a recommendation request 1 to the recommendation server 400, where the recommendation request 1 includes the first website address, and the recommendation request 1 is used to request to recommend the at least one website address associated with the first website address.

In this embodiment of this application, when the network of the terminal device 100 is normal, the exception diagnosis module 1 may perform information exchange with the recommendation server 400 by using the communication module of the terminal device 100, for example, send the recommendation request 1. The recommendation server 400 and the diagnosis server 300 may be a same server, or may be different servers, which is not specifically limited herein.

S203: In response to the recommendation request 1, the recommendation server 400 determines whether the at least one website address associated with the first website address can be obtained as the recommended content; and if the at least one website address associated with the first website address can be obtained as the recommended content, performs S212; otherwise, performs S204.

In some embodiments, the recommendation server 400 may obtain a recommendation database, where the recommendation database includes a cloud website address recommendation database, and the recommendation server 400 search in the cloud website address recommendation database to determine whether there is the at least one website address associated with the first website address. For details, refer to the related embodiment in which the exception diagnosis module 1 obtains, from the local website address cache library, the website address associated with the first website address, and details are not described herein again. In some embodiments, the recommendation server 400 may search, online from another server, the website address associated with the first website address.

S204: Use the first website address as a keyword, obtain the at least one search result of the first website address as the recommended content, and perform S212.

For example, as shown on the error prompt interface 31 shown in FIG. 12B, three search results of the first website address are displayed in the recommendation area of the error prompt interface 31.

In some embodiments, the terminal device 100 may alternatively directly request the recommendation server 400, to obtain at least one search result of the first website address as the recommended content, and the recommendation server 400 does not need to perform determination in step S203.

S205: If it is determined, based on the local diagnosis result or the cloud diagnosis result 1, that the error cause of the webpage access exception does not include that "The website address is incorrect", the exception diagnosis module 1 determines whether the offline webpage of the first website address can be locally obtained as the recommended content; and if the offline webpage of the first website address can be locally obtained as the recommended content, performs S117; otherwise, performs S206.

In some embodiments, the exception diagnosis module 1 determines whether there is the offline webpage of the first website address in the local offline webpage cache library; and if there is the offline webpage of the first website address in the local offline webpage cache library, the offline webpage is used as the recommended content.

In some embodiments, in step S201 and step S205, the terminal device 100 does not determine whether the local diagnosis result or the cloud diagnosis result 1 includes the error cause "the website address is incorrect". In other words, regardless of whether the local diagnosis result or the cloud diagnosis result 1 is obtained and whether the local diagnosis result or the cloud diagnosis result 1 includes the error cause "the website address is incorrect", the terminal device 100 performs S201 and S205 and subsequent procedures of S201 and S205 based on a preset sequence. In this case, a specific implementation of step S116 shown in FIG. 17A-1 and FIG. 17A-2 may be performed after step S105.

S206: The exception diagnosis module 1 sends a recommendation request 2 to the recommendation server 400, where the recommendation request 2 includes the first website address, and the recommendation request 2 is used to request to recommend the offline webpage of the first website address.

S207: In response to the recommendation request 2, the recommendation server 400 determines whether the offline webpage of the first website address can be obtained as the recommended content, and if the offline webpage of the first website address can be obtained as the recommended content, performs S212; otherwise, performs S208.

In some embodiments, the recommendation server 400 may obtain the recommendation database, where the recommendation database includes a cloud offline webpage recommendation database, and the recommendation server 400 search on the cloud offline webpage recommendation database to determine whether there is the offline webpage of the first website address. In some embodiments, the recommendation server 400 may search, online from another server, the offline webpage of the first website address.

For example, as shown on the error prompt interface 32 shown in FIG. 12C, the offline webpage of the first website address is displayed in the recommendation area of the error prompt interface 32.

S208: The recommendation server 400 sends indication information to the exception diagnosis module 1, where the indication information indicates that the offline webpage of the first website address is not obtained.

S209: After receiving the indication information, the exception diagnosis module 1 determines, based on the first keyword indicated by the first input operation, whether at least one piece of locally cached information or the at least one application associated with the first keyword can be obtained as the recommended content; and if the at least one piece of locally cached information or the at least one application associated with the first keyword can be obtained as the recommended content, performs S117; otherwise, performs S210.

S210: Send a recommendation request 3 to the recommendation server 400, where the recommendation request 3 includes the first keyword, and the recommendation request 3 is used to request the recommended content associated with the first keyword.

S211: In response to the recommendation request 3, the recommendation server 400 obtains, as the recommended content, the at least one piece of information, the at least one application, or the at least one search result that is associated with the first keyword.

In some embodiments, the recommendation server 400 may obtain the recommendation database. The recommendation database includes a cloud information recommendation library and a cloud application recommendation library. The recommendation server 400 searches in the cloud information recommendation library for whether there is the information associated with the first keyword, and searches in the cloud application recommendation library for whether there is the application associated with the first keyword. In some embodiments, the recommendation server 400 may search, online from another server, information, an application, or a search result associated with the first keyword, and use the information, the application, or the search result as the recommended content.

S212: The recommendation server 400 sends the recommended content to the exception diagnosis module 1 of the terminal device 100.

In some embodiments, if the first input operation is used to tap an information link, in step S209, based on the first keyword (for example, a title of the information link) indicated by the first input operation, the exception diagnosis module 1 determines whether the at least one piece of locally cached information associated with the first keyword can be obtained; and if the at least one piece of locally cached information associated with the first keyword can be obtained, performs S117; otherwise, sends the recommendation request 3 to the recommendation server 400, where the recommendation request 3 is used to request to recommend the at least one piece of information associated with the first keyword.

For example, as shown in FIG. 12D and FIG. 12E, the first input operation is tapping the Information link 305A on the browser home page 12. When failing to access the website address corresponding to the Information link 305A, the terminal device 100 displays the error prompt interface 33 shown in FIG. 12B, where information links of two pieces of information associated with the title of the Information link 305A are displayed in the recommendation area of the error prompt interface 33.

In some embodiments, if the first input operation is used to access a specified website, in step S209, based on the first keyword (the website name and/or type) indicated by the first input operation, the exception diagnosis module 1 determines whether at least one installed application associated with the first keyword can be obtained; and if the at least one installed application associated with the first keyword can be obtained, performs S117; otherwise, sends the recommendation request 3 to the recommendation server 400, where the recommendation request 3 is used to request to recommend the at least one application associated with the first keyword.

Figure 12G:
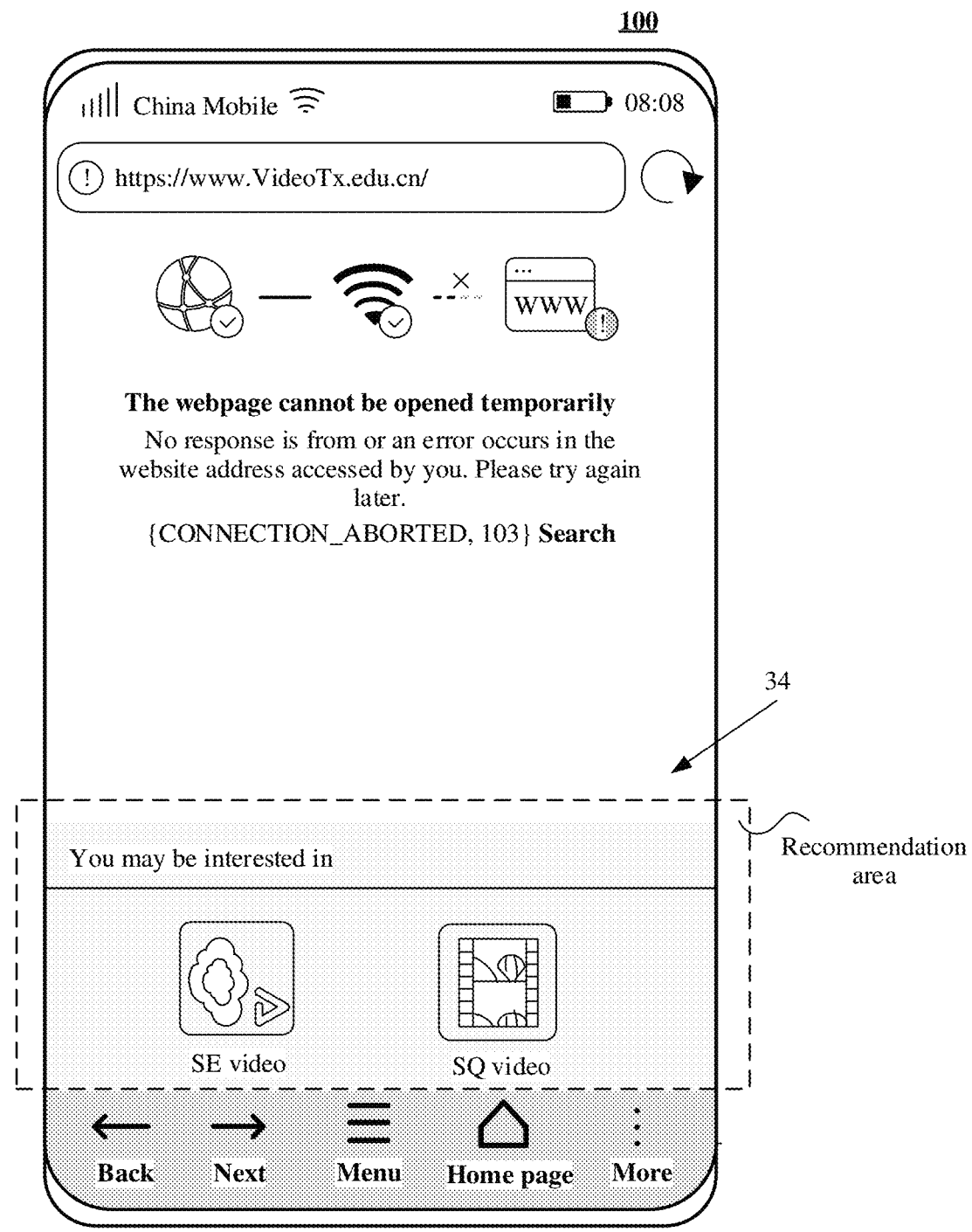

For example, as shown in FIG. 12F and FIG. 12G, the first input operation is tapping the icon 304A of the SS video website on the browser home page 12. When failing to access the website address corresponding to the icon 304A of the SS video website, the terminal device 100 displays the error prompt interface 34 shown in FIG. 12D, where icons of two video applications associated with the website type of the SS video website are displayed in the recommendation area of the error prompt interface 34.

Figure 17B:
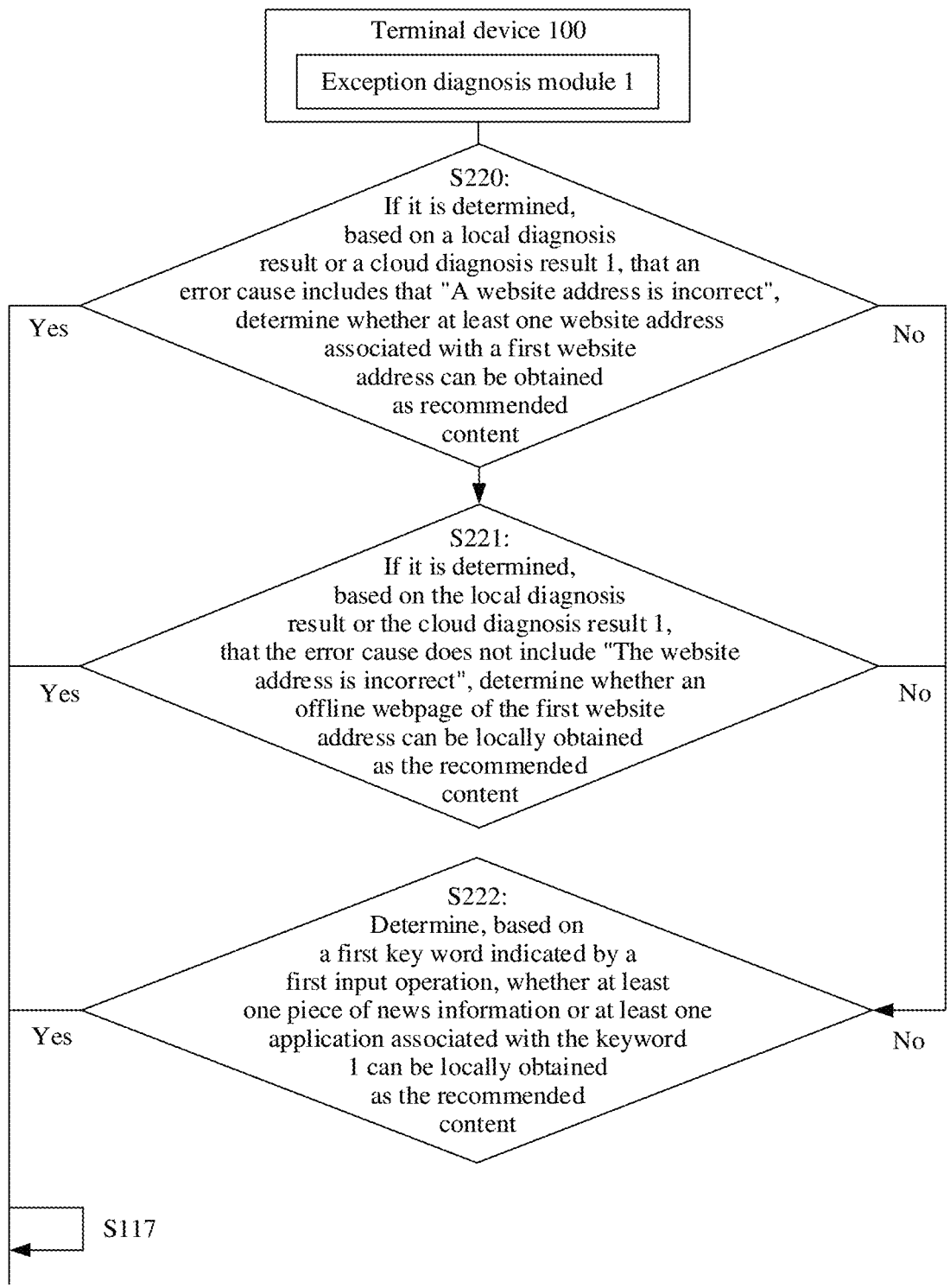

In some embodiments, as shown in FIG. 17B, if the terminal device 100 is not connected to the network, the terminal device 100 cannot establish a communication connection to the recommendation server 400, and step S116 may specifically include step S220 to step S222.

S220: If it is determined, based on the local diagnosis result or the cloud diagnosis result 1, that the error cause of the webpage access exception includes that "The website address is incorrect", the exception diagnosis module 1 determines whether the at least one website address associated with the first website address can be locally obtained as the recommended content; and if the at least one website address associated with the first website address can be locally obtained as the recommended content, performs S117; otherwise, performs S222.

S221: If it is determined, based on the local diagnosis result or the cloud diagnosis result 1, that the error cause of the webpage access exception does not include that "The website address is incorrect", the exception diagnosis module 1 determines whether the offline webpage of the first website address can be locally obtained as the recommended content; and if the offline webpage of the first website address can be locally obtained as the recommended content, performs S117; otherwise, performs S205.

S222: The exception diagnosis module 1 determines, based on the first keyword indicated by the first input operation, whether the at least one piece of information or the at least one application associated with the first keyword can be locally obtained as the recommended content; and if the at least one piece of information or the at least one application associated with the first keyword can be locally obtained as the recommended content, performs S117.

For specific implementations of step S220 to step S222, refer to related descriptions in the embodiment in FIG. 17A-1 and FIG. 17A-2. Details are not described herein again.

Figures 1, 17C:
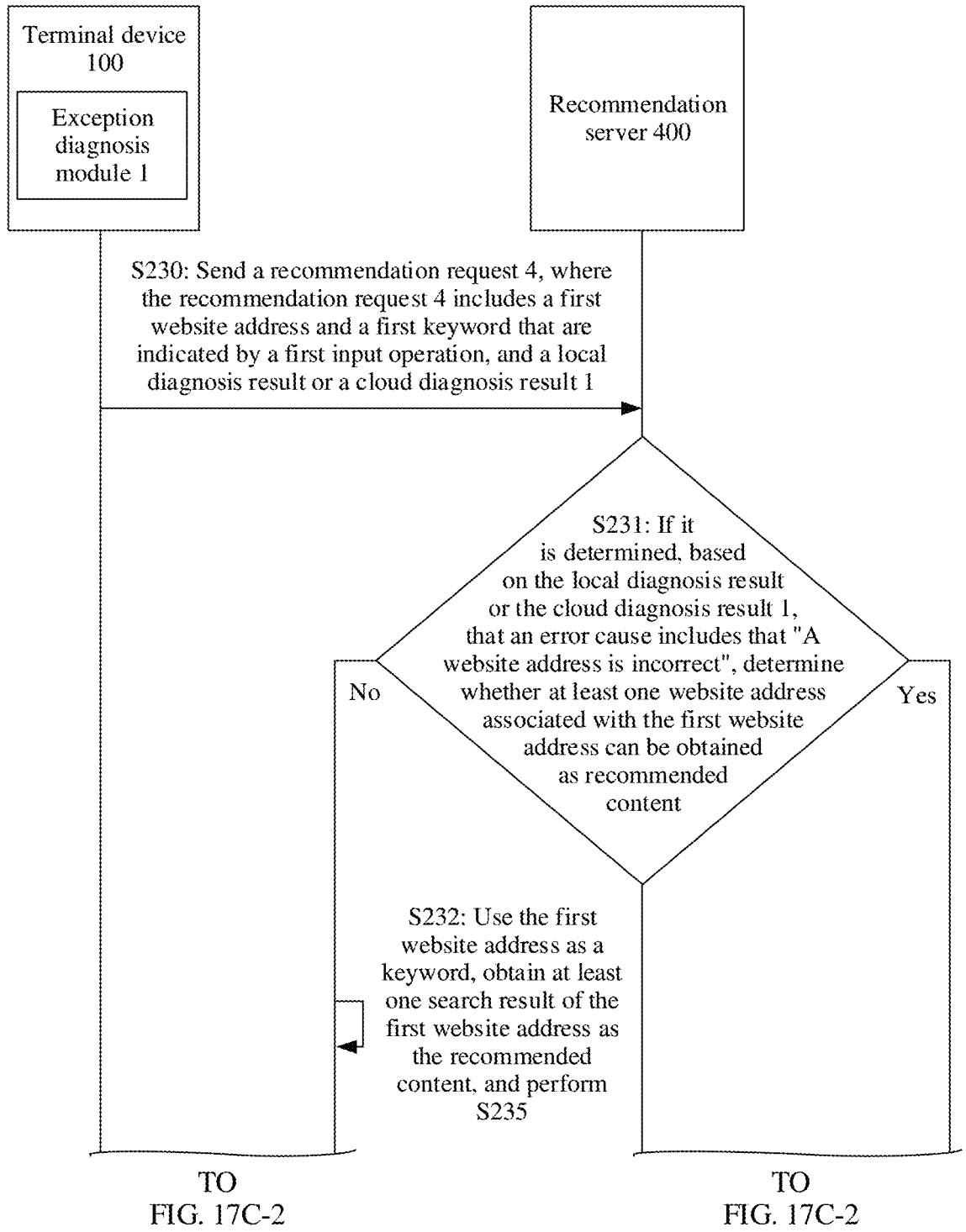
Figures 2, 17C:
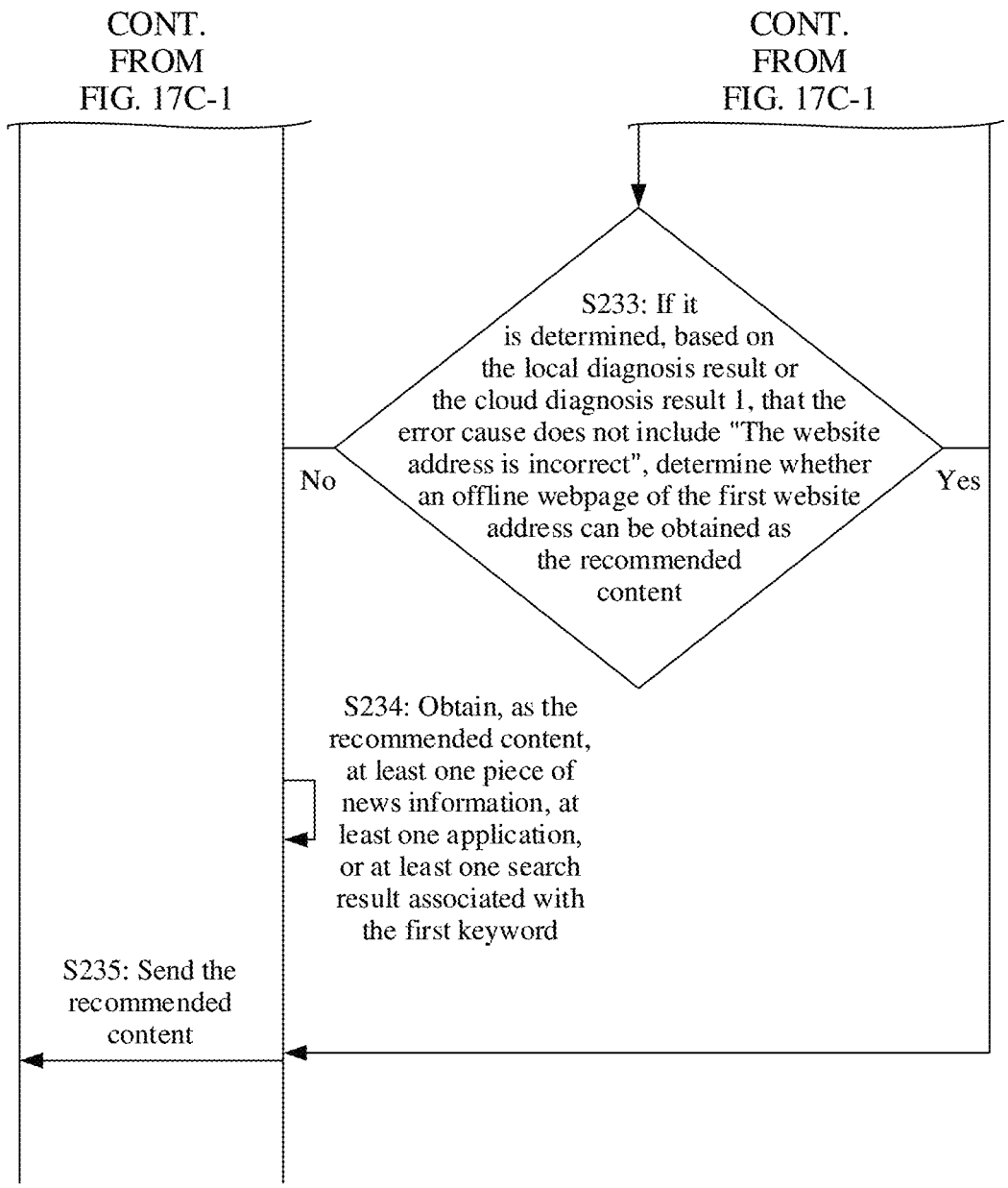

In some embodiments, as shown in FIG. 17C-1 and FIG. 17C-2, if the terminal device 100 is connected to the network, the terminal device 100 can establish a communication connection to the recommendation server, and step S116 may specifically include step S230 to step S235.

S230: Send a recommendation request 4 to the recommendation server 400, where the recommendation request 4 includes the first website address and/or the first keyword, and the local diagnosis result or the cloud diagnosis result 1.

S231: If it is determined, based on the local diagnosis result or the cloud diagnosis result 1, that the error cause of the webpage access exception includes that "The website address is incorrect", in response to the recommendation request 4, the recommendation server 400 determines whether the at least one website address associated with the first website address can be obtained as the recommended content; and if the at least one website address associated with the first website address can be obtained as the recommended content, performs S235; otherwise, performs S232.

S232: Use the first website address as a keyword, obtain the at least one search result of the first website address as the recommended content, and perform S235.

S233: If it is determined, based on the local diagnosis result or the cloud diagnosis result 1, that the error cause of the webpage access exception does not include that "The website address is incorrect", in response to the recommendation request 3, the recommendation server 400 determines whether the offline webpage of the first website address can be obtained as the recommended content; and if the offline webpage of the first website address can be obtained as the recommended content, performs S235; otherwise, performs S234.

S234: The recommendation server 400 obtains, as the recommended content, the at least one piece of information, the at least one application, or the at least one search result that is associated with the first keyword.

S235: The recommendation server 400 sends the recommended content to the exception diagnosis module 1 of the terminal device 100.

For specific implementations of step S231 to step S234, refer to related descriptions in the embodiment in FIG. 17A-1 and FIG. 17A-2. Details are not described herein again.

The implementations of this application may be randomly combined, to achieve different technical effects.

All or a part of the foregoing embodiments may be implemented by using software, hardware, firmware, or any combination thereof. When software is used to implement embodiments, all or a part of embodiments may be implemented in a form of computer program product. The computer program product includes one or more computer instructions. When the computer program instructions are loaded and executed on the computer, the procedure or functions according to this application are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state disk, SSD)), or the like.

A person of ordinary skill in the art may understand that all or some of the procedures of the methods in embodiments may be implemented by a computer program instructing relevant hardware. The program may be stored in the computer-readable storage medium. When the program runs, the procedures of the methods in embodiments are performed. The foregoing storage medium includes any medium that can store program code, such as a ROM, a random access memory RAM, a magnetic disk, or an optical disc.

In conclusion, the foregoing descriptions are merely embodiments of the technical solutions of the present application, but are not intended to limit the protection scope of the present application. Any modification, equivalent replacement, or improvement made according to the disclosure of the present application shall fall within the protection scope of the present application.

What is claimed is:

1. A method, comprising:
receiving, by a terminal device, a first input operation;
attempting to access, by the terminal device in response to receiving the first input operation, a first webpage indicated by the first input operation;
after failing to access the first webpage, determining, by the terminal device, that an error cause of a webpage access failure comprises a first error cause; and
displaying, by the terminal device, a first error prompt interface, wherein the first error prompt interface comprises an error segment display area, an error description area, and a first button, the error segment display area comprises a browser identifier, a network identifier, and a webpage identifier, wherein a display status of the browser identifier indicates whether the first error cause is an error cause corresponding to the browser identifier, a display status of the network identifier indicates whether the first error cause is an error cause corresponding to the network identifier, a display status of the webpage identifier indicates whether the first error cause is an error cause corresponding to the webpage identifier, wherein the error description area describes related information of the first error cause, and wherein the first button is configured to trigger the terminal device to perform a first operation corresponding to the first error cause.

2. The method according to claim 1, wherein the error description area comprises one or more of an error description, a response measure, or an error code that corresponds to the first error cause, and the response measure corresponding to the first error cause comprises performing the first operation.

3. The method according to claim 1, wherein the first input operation indicates a first website address or a first keyword of the first webpage, the first error prompt interface further comprises recommended content, the recommended content is determined based on related information of the first webpage, and the related information of the first webpage comprises the first website address or the first keyword; and
wherein before displaying, by the terminal device, the first error prompt interface, the method further comprises:
obtaining, by the terminal device, the recommended content.

4. The method according to claim 3, wherein the recommended content comprises one or more of the following: at least one website address associated with the first website address, an offline webpage of the first website address, at least one search result of the first website address, at least one piece of information associated with the first keyword, at least one application associated with the first keyword, at least one website associated with the first keyword, or at least one search result of the first keyword.

5. The method according to claim 4, wherein obtaining, by the terminal device, the recommended content comprises:
when the first error cause is that a website address is incorrect, determining whether the at least one website address associated with the first website address can be obtained as the recommended content; and when the at least one website address associated with the first website address cannot be obtained as the recommended content, obtaining the at least one search result of the first website address as the recommended content; or
when the first error cause is not that a website address is incorrect, determining whether the offline webpage of the first website address can be obtained as the recommended content; and when the offline webpage of the first website address cannot be obtained as the recommended content, obtaining, as the recommended content, the information, the application, the website, and the search result that are associated with the first keyword.

6. The method according to claim 3, wherein obtaining, by the terminal device, the recommended content comprises:
sending, by the terminal device, a recommendation request to a recommendation server, wherein the recommendation request carries the related information of the first webpage, and the recommendation request requests the recommendation server to obtain, as the recommended content, content associated with the related information of the first webpage; and
receiving the recommended content sent by the recommendation server.

7. The method according to claim 1, wherein a browser error corresponding to the browser identifier is a first-level error cause, a network error corresponding to the network identifier is a first-level error cause, and a webpage error corresponding to the webpage identifier is a first-level error cause, each first-level error cause comprises at least one second-level error cause, and the first error cause comprises at least one first-level error cause or at least one second-level error cause.

8. The method according to claim 7, wherein in a connection relationship between two adjacent identifiers in the browser identifier, the network identifier, and the webpage identifier, a display status of the connection relationship comprises a normal state, an abnormal state, and a null state, and the display status of the connection relationship indicates that the first error cause is an error cause corresponding to a specific identifier.

9. The method according to claim 8, wherein:
when the first error cause corresponds to the browser identifier, a display status of the browser identifier indicates the browser error, a connection relationship between the browser identifier and the network identifier is presented as a null state, and a connection relationship between the network identifier and the webpage identifier is presented as a null state;
when the first error cause corresponds to the network identifier, a display status of the network identifier indicates the network error, a connection relationship between the browser identifier and the network identifier is presented as an abnormal state, and a connection relationship between the network identifier and the webpage identifier is presented as a null state; or
when the first error cause corresponds to the webpage identifier, a display status of the webpage identifier indicates the webpage error, a connection relationship between the browser identifier and the network identifier is presented as a normal state, and a connection relationship between the network identifier and the webpage identifier is presented as an abnormal state.

10. The method according to claim 7, wherein when the first error cause is the webpage error, the first button is configured to trigger a network connectivity test, and the method further comprises:
attempting to access, by the terminal device, a preset website address in response to an input operation on the first button, wherein the preset website address is a different website address than a website address of the first webpage; and
performing the following:
when successfully accessing the preset website address, displaying, by the terminal device, first prompt information, wherein the first prompt information prompts that the network connectivity is normal or that the preset website address is successfully accessed; or
when failing to access the preset website address, displaying, by the terminal device, second prompt information, wherein the second prompt information prompts that the network connectivity is abnormal or that the preset website address fails to be accessed.

11. The method according to claim 10, wherein:
when successfully accessing the preset website address, the terminal device further displays a test website identifier, wherein a display status of the test website identifier is a normal state, and a connection relationship between the test website identifier and the network identifier is in a normal state; or
when failing to access the preset website address, the terminal device further displays a test website identifier, wherein a display status of the test website identifier is an abnormal state, and a connection relationship between the test website identifier and the network identifier is in an abnormal state.

12. The method according to claim 1, wherein:
when a network is normal, a display form of the network identifier is determined by a network currently used by the terminal device to transmit a data service; or
when the first error cause corresponds to the network identifier, a display form of the network identifier is determined by a network state indicated by the first error cause.

13. The method according to claim 12, wherein the error cause corresponding to the network identifier comprises one or more of the following: an airplane mode is not turned off, Wi-Fi is not turned on, a Wi-Fi network is abnormal, or mobile data is not turned on; and
wherein:
when the first error cause is that the airplane mode is not turned off, the display form of the network identifier is an identifier of the airplane mode;
when the first error cause is that Wi-Fi is not turned on or the Wi-Fi network is abnormal, the display form of the network identifier is an identifier of Wi-Fi; or
when the first error cause is that the mobile data is not turned on, the display form of the network identifier is an identifier of the mobile data.

14. The method according to claim 1, wherein:
when the first error cause is that airplane mode is not turned off, the first button is configured to trigger the terminal device to turn off the airplane mode;
when the first error cause is that mobile data is not turned on, the first button is configured to trigger the terminal device to turn on the mobile data;
when the first error cause is that Wi-Fi is not turned on, the first button is configured to trigger the terminal device to turn on Wi-Fi; or
when the first error cause is that a Wi-Fi network is abnormal, the first button is configured to trigger the terminal device to switch the network to the mobile data, switch a Wi-Fi signal source, turn on WLAN$^+$, or display a network setting interface.

15. The method according to claim 1, wherein an error cause corresponding to the webpage identifier comprises one or more of the following: a website address is incorrect, a search engine is unavailable, or a website responds slowly; and
wherein:
when the first error cause is that the website address is incorrect, the first button is configured to trigger the terminal device to access a second website address, and the second website address is a correct website address determined based on a website address of the first webpage;
when the first error cause is that the search engine is unavailable, the first button is configured to trigger the terminal device to switch the search engine; or
when the first error cause is that the website responds slowly, the first button is configured to trigger the terminal device to re-attempt to access the first webpage.

16. The method according to claim 1, wherein determining, by the terminal device, that the error cause of the webpage access failure comprises the first error cause comprises:
collecting, by the terminal device, related information of a webpage access, and obtaining a first domain name corresponding to a website address of the first webpage, wherein the related information of the webpage access comprises first setting information, and the first setting information comprises setting information of at least one setting item related to the webpage access;

performing local diagnosis on a webpage access exception based on one or more of the following: the related information of the webpage access, the website address of the first webpage, the first domain name, or an error code of the webpage access exception of the first webpage; and when an error cause of the webpage access exception is determined through the local diagnosis, determining display content of the first error prompt interface based on the error cause determined through the local diagnosis; or when an error cause of the webpage access exception is not determined through the local diagnosis, sending a diagnosis request to a diagnosis server, to enable the diagnosis server to invoke an exception mode library to perform cloud diagnosis, wherein an input of the exception mode library is diagnosis information carried in the diagnosis request, an output of the exception mode library is the error cause of the webpage access exception, and the diagnosis information comprises one or more of the following: the related information of the webpage access, the website address of the first webpage, the first domain name, the error code, or a detection result in a local diagnosis process.

17. The method according to claim 16, wherein performing local diagnosis on the webpage access exception based on one or more of the following: the related information of the webpage access, the website address of the first webpage, the first domain name, or the error code of the webpage access exception of the first webpage comprises one or more of the following detections:

detecting, by the terminal device, whether there is a first setting item whose setting information is incorrect in the first setting information; and when it is detected that there is the first setting item whose setting information is incorrect in the first setting information, determining that the first error cause comprises that the first setting item is incorrectly set, wherein that the first setting item is incorrectly set comprises that current setting information of the first setting item causes the webpage access failure;

detecting, by the terminal device, whether network connectivity is abnormal; and when it is detected that the network connectivity is abnormal, determining that the first error cause comprises that the network connectivity is abnormal;

detecting, by the terminal device, whether a search engine corresponding to the first domain name is a preset search engine; and when it is detected that the search engine corresponding to the first domain name is the preset search engine, determining that the first error cause comprises that the search engine is unavailable; and detecting, by the terminal device, whether a website indicated by the first domain name can be accessed; and when it is detected that the website indicated by the first domain name cannot be accessed, determining that the first error cause comprises that the website cannot be accessed.

18. An electronic device, comprising:
a transceiver;
at least one processor; and
at least one memory, wherein the at least one memory stores a computer program, and the processor is configured to invoke the computer program to perform the following:

receiving a first input operation;

attempting to access, in response to the first input operation, a first webpage indicated by the first input operation;

after failing to access the first webpage, determining that an error cause of a webpage access failure comprises a first error cause; and displaying a first error prompt interface, wherein the first error prompt interface comprises an error segment display area, an error description area, and a first button, the error segment display area comprises a browser identifier, a network identifier, and a webpage identifier, wherein a display status of the browser identifier indicates whether the first error cause is an error cause corresponding to the browser identifier, a display status of the network identifier indicates whether the first error cause is an error cause corresponding to the network identifier, a display status of the webpage identifier indicates whether the first error cause is an error cause corresponding to the webpage identifier, and wherein the error description area describes related information of the first error cause, and the first button is configured to trigger a terminal device to perform a first operation corresponding to the first error cause.

19. The electronic device according to claim 18, wherein the first input operation indicates a first website address or a first keyword of the first webpage, the first error prompt interface further comprises recommended content, the recommended content is determined based on related information of the first webpage, and the related information of the first webpage comprises the first website address or the first keyword; and wherein the at least one processor is configured to invoke the computer program to further perform the following:
before displaying the first error prompt interface, obtaining the recommended content.

20. A non-transitory computer-readable storage medium, comprising computer instructions, wherein when the computer instructions are run on an electronic device, the electronic device is enabled to perform the following steps:

receiving a first input operation;

attempting to access, in response to the first input operation, a first webpage indicated by the first input operation;

after failing to access the first webpage, determining that an error cause of a webpage access failure comprises a first error cause; and displaying a first error prompt interface, wherein the first error prompt interface comprises an error segment display area, an error description area, and a first button, the error segment display area comprises a browser identifier, a network identifier, and a webpage identifier, wherein a display status of the browser identifier indicates whether the first error cause is an error cause corresponding to the browser identifier, a display status of the network identifier indicates whether the first error cause is an error cause corresponding to the network identifier, a display status of the webpage identifier indicates whether the first error cause is an error cause corresponding to the webpage identifier, and wherein the error description area describes related information of the first error cause, and the first button is configured to trigger a terminal device to perform a first operation corresponding to the first error cause.

* * * * *